US011006477B2

(12) United States Patent
Kimura et al.

(10) Patent No.: US 11,006,477 B2
(45) Date of Patent: *May 11, 2021

(54) COMMUNICATION CONTROL DEVICE, RADIO COMMUNICATION DEVICE, COMMUNICATION CONTROL METHOD, AND RADIO COMMUNICATION METHOD

(71) Applicant: Sony Corporation, Tokyo (JP)

(72) Inventors: Ryota Kimura, Tokyo (JP); Ryo Sawai, Tokyo (JP); Hiromasa Uchiyama, Tokyo (JP); Sho Furuichi, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/656,602

(22) Filed: Oct. 18, 2019

(65) Prior Publication Data

US 2020/0053822 A1 Feb. 13, 2020

Related U.S. Application Data

(63) Continuation of application No. 16/148,460, filed on Oct. 1, 2018, now Pat. No. 10,499,450, which is a (Continued)

(30) Foreign Application Priority Data

Dec. 11, 2014 (JP) .............................. JP2014-250978

(51) Int. Cl.
*H04W 72/00* (2009.01)
*H04W 76/27* (2018.01)
(Continued)

(52) U.S. Cl.
CPC ............. *H04W 76/27* (2018.02); *H04L 5/003* (2013.01); *H04L 5/0007* (2013.01);
(Continued)

(58) Field of Classification Search
CPC ............. H04W 76/27; H04W 36/0055; H04W 72/044; H04W 52/30; H04W 72/0453;
(Continued)

(56) References Cited

U.S. PATENT DOCUMENTS 7,965,761 B2 * 6/2011 Shattil ................. H04L 27/2697
375/147
8,670,390 B2 * 3/2014 Shattil .................... H04B 7/026
370/329

(Continued)

FOREIGN PATENT DOCUMENTS

CN 103957532 A 7/2014
JP 2003-78419 A 3/2003
(Continued)

OTHER PUBLICATIONS

Office Action dated Jan. 18, 2018 in Singapore Patent Application No. 11201703 7580.
(Continued)

*Primary Examiner* — Marceau Milord
(74) *Attorney, Agent, or Firm* — Xsensus, LLP

(57) ABSTRACT

There is provided a control device including a communication unit configured to perform communication with a radio communication device of a radio communication system in which communication is possible using a plurality of access schemes including at least one of the access schemes of a multiple access scheme that uses orthogonal resources and a multiple access scheme that uses non-orthogonal resources, and a control unit configured to perform allocation of resources relating to the access schemes to be used by the radio communication device.

18 Claims, 42 Drawing Sheets

Related U.S. Application Data continuation of application No. 15/519,787, filed as application No. PCT/JP2015/005488 on Oct. 30, 2015, now Pat. No. 10,136,468.

(51) Int. Cl.
| | |
|---|---|
| *H04W 72/04* | (2009.01) |
| *H04W 36/00* | (2009.01) |
| *H04L 5/00* | (2006.01) |
| *H04W 52/30* | (2009.01) |
| *H04W 72/08* | (2009.01) |

(52) U.S. Cl.
CPC ... *H04W 36/0055* (2013.01); *H04W 36/0058* (2018.08); *H04W 36/0069* (2018.08); *H04W 52/30* (2013.01); *H04W 72/044* (2013.01); *H04W 72/0453* (2013.01); *H04W 36/0079* (2018.08); *H04W 72/048* (2013.01); *H04W 72/08* (2013.01)

(58) Field of Classification Search
CPC .. H04W 72/048; H04W 72/08; H04L 5/0007; H04L 5/003
USPC ..................... 455/452.1, 450, 509
See application file for complete search history.

(56) References Cited

U.S. PATENT DOCUMENTS

| | | | |
|---|---|---|---|
| 9,819,449 B2* | 11/2017 | Shattil | H04J 13/0003 |
| 9,844,072 B2 | 12/2017 | Chen et al. | |
| 9,955,462 B2 | 4/2018 | Chen et al. | |
| 10,136,468 B2* | 11/2018 | Kimura | H04W 76/27 |
| 10,142,082 B1* | 11/2018 | Shattil | H04L 27/2613 |
| 10,499,450 B2* | 12/2019 | Kimura | H04L 5/0007 |
| 2006/0039271 A1 | 2/2006 | Li et al. | |
| 2010/0203891 A1 | 8/2010 | Nagaraja et al. | |
| 2011/0110239 A1 | 5/2011 | Blanz et al. | |
| 2011/0188458 A1 | 8/2011 | Sebeni et al. | |
| 2012/0120860 A1 | 5/2012 | Chui et al. | |
| 2012/0188980 A1 | 7/2012 | Wang et al. | |
| 2013/0095829 A1 | 4/2013 | Bhattad et al. | |
| 2013/0163535 A1 | 6/2013 | Anderson et al. | |
| 2013/0176877 A1* | 7/2013 | Sadek | H04W 24/02 370/252 |
| 2014/0016488 A1 | 1/2014 | Xu et al. | |
| 2014/0029562 A1* | 1/2014 | Kishiyama | H04L 27/2691 370/329 |
| 2014/0029582 A1 | 1/2014 | Chin et al. | |
| 2014/0066119 A1 | 3/2014 | Tavildar et al. | |
| 2014/0146754 A1 | 5/2014 | Bayesteh et al. | |
| 2014/0241256 A1 | 8/2014 | Jiang et al. | |
| 2014/0301272 A1 | 10/2014 | Vajapeyam et al. | |
| 2014/0362779 A1 | 12/2014 | Venkatachari et al. | |
| 2015/0109927 A1 | 4/2015 | Ozturk et al. | |
| 2015/0171983 A1 | 6/2015 | Kusashima | |
| 2015/0271816 A1 | 9/2015 | Akkarakaran et al. | |
| 2016/0088604 A1* | 3/2016 | Patel | H04W 72/0493 370/336 |
| 2016/0094318 A1* | 3/2016 | Shattil | H04J 13/004 375/267 |
| 2017/0026458 A1* | 1/2017 | Kitazato | H04N 21/435 |
| 2017/0181175 A1 | 6/2017 | Kishiyama | |
| 2017/0215154 A1* | 7/2017 | Kim | H04W 52/34 |
| 2017/0318586 A1 | 11/2017 | Wang et al. | |

FOREIGN PATENT DOCUMENTS

| | | |
|---|---|---|
| JP | 2003-229835 A | 8/2003 |
| JP | 2008-526139 A | 7/2008 |
| JP | 2009-522916 A | 6/2009 |
| JP | 2010-517438 A | 5/2010 |
| JP | 2011-83015 A | 4/2011 |
| JP | 2012-138968 A | 7/2012 |
| JP | 2013-9289 A | 1/2013 |
| JP | 2013-102492 A | 5/2013 |
| JP | 2013-534798 A | 9/2013 |
| JP | 2013-247513 A | 12/2013 |
| JP | 2015-523790 A | 8/2015 |
| JP | 2016-514416 A | 5/2016 |
| WO | 2008/023613 A1 | 2/2008 |
| WO | 2013/176042 A1 | 11/2013 |
| WO | 2013/181483 A2 | 12/2013 |
| WO | 2014/104117 A1 | 7/2014 |
| WO | 2014/135126 A1 | 9/2014 |

OTHER PUBLICATIONS

International Search Report dated Feb. 15, 2016 in PCT/JP2015/005488 filed Oct. 30, 2015.
Anass Benjebbour, et al., "Concept and Practical Considerations of Non-orthogonal Multiple Access (NOMA) for Future Radio Access" 2013 International Symposium on Intelligent Signal Processing and Communication Systems, XP032541968, 2013, pp. 770-774.
Office Action dated Nov. 21, 2017 in Japanese Patent Application No. 2014-250978 (with English language translation).
Haruki Ota, "On Error Exponent of Rate-Splitting Multiple Accessing Scheme for Gaussian Multiple-Access Channel", Communication based on Rate Division Method, The Transactions of the Institute of Electronics, Information and Communication Engineers, vol. 186, No. 3, 2003, pp. 309-312 and cover page.
Chinese Office Action dated Jun. 16, 2020, issued in corresponding Chinese Patent Application No. 201580065587.7.
"LTE PDCCH Construction", a hot-headed blog, "Sina Blog", blog.sina.com.cn/s/blog 9626b4160102uwxl.html., Jul. 11, 2014.

* cited by examiner

COMMUNICATION CONTROL DEVICE, RADIO COMMUNICATION DEVICE, COMMUNICATION CONTROL METHOD, AND RADIO COMMUNICATION METHOD

CROSS-REFERENCE TO RELATED APPLICATIONS

This application is a continuation of U.S. application Ser. No. 16/148,460, filed Oct. 1, 2018, which is a Continuation of U.S. application Ser. No. 15/519,787, filed Apr. 17, 2017 (now U.S. Pat. No. 10,136,468), which is a National Stage Entry of International Patent Application No. PCT/IP2015/005488, filed Oct. 30, 2015, which claims the benefit of Japanese Priority Patent Application JP 2014-250978, filed Dec. 11, 2014, the entire contents of each are incorporated herein by reference.

TECHNICAL FIELD

The present disclosure relates to a communication control device, a radio communication device, a communication control method, and a radio communication method.

BACKGROUND ART

The radio communication environment has been facing the problem of radically increasing data traffic in recent years. For this reason, as one of radio access technologies (RATs) of the fifth mobile communication scheme (5G), a multiplexed/multiple access scheme that uses superposition coding (SPC) has gained attention. Thus, SPC and technologies based on the scheme have been developed.

For example, PTL 1 and PTL 2 mentioned below disclose a technology in which, when a digital modulation symbol that is a complex number is multiplexed using a method corresponding to SPC, amplitude or electric power which can enable the multiplexed symbol to be appropriately demodulated or decoded in a reception device is set.

In addition, PTL 3 mentioned below discloses a technology relating to highly improving a successive interference canceller (SIC) on a reception device side for receiving signals that are multiplexed using SPC or non-orthogonally multiplexed using another method.

CITATION LIST

Patent Literature

PTL 1: JP 2003-78419A
PTL 2: JP 2003-229835A
PTL 3: JP 2013-247513A

SUMMARY

Technical Problem

In the field of the present technology, however, further improvement in performance has been demanded. Thus, the present disclosure proposes a novel and improved communication control device, radio communication device, communication control method, and radio communication method which can realize communication in which orthogonal resources and non-orthogonal resources are selectively used.

Solution to Problem

According to an embodiment of the present disclosure, there is provided a communication control device including: a communication unit configured to perform communication with a radio communication device of a radio communication system in which communication is possible using a plurality of access schemes including at least one of the access schemes of a multiple access scheme that uses orthogonal resources and a multiple access scheme that uses non-orthogonal resources; and a control unit configured to perform allocation of resources relating to the access schemes to be used by the radio communication device.

According to an embodiment of the present disclosure, there is provided a radio communication device including: a radio communication unit configured to perform radio communication using one or more access schemes of at least either a multiple access scheme that uses orthogonal resources or a multiple access scheme that uses non-orthogonal resources; and a control unit configured to control the radio communication unit to perform radio communication using allocated resources for the access schemes to be used by the radio communication unit.

According to an embodiment of the present disclosure, there is provided a communication control method, including: performing communication with a radio communication device of a radio communication system in which communication is possible using a plurality of access schemes including at least one of the access schemes of a multiple access scheme that uses orthogonal resources and a multiple access scheme that uses non-orthogonal resources; and performing allocation of resources relating to the access schemes to be used by the radio communication device with a processor.

According to an embodiment of the present disclosure, there is provided a radio communication method including: performing radio communication using one or more access schemes of at least either a multiple access scheme that uses orthogonal resources or a multiple access scheme that uses non-orthogonal resources; and controlling, with a processor, the radio communication to be performed using allocated resources for the access schemes to be used during the radio communication.

Advantageous Effects of Invention

According to one or more of the present disclosure described above, communication in which orthogonal resources and non-orthogonal resources are selectively used can be realized. Note that the effects described above are not necessarily limited, and along with or instead of the effects, any effect that is desired to be introduced in the present specification or other effects that can be expected from the present specification may be exhibited.

DESCRIPTION OF EMBODIMENTS

Figure 1:
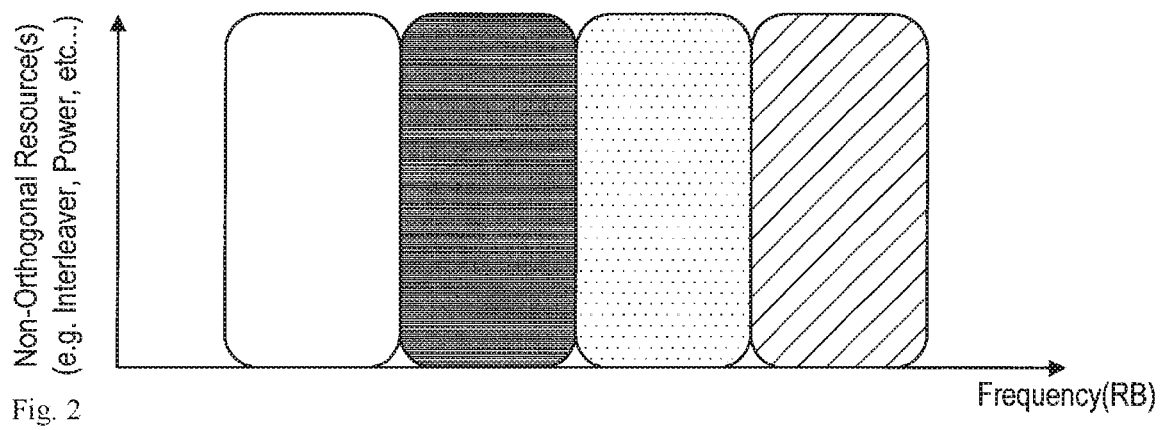
FIG. 1 is a diagram for describing an example of allocation of resources in an orthogonal multiple access scheme.

Hereinafter, preferred embodiments of the present disclosure will be described in detail with reference to the appended drawings. Note that, in this specification and the appended drawings, structural elements that have substantially the same function and, structure are denoted with the same reference numerals, and repeated explanation of these structural elements is omitted.

Also, in this specification and the appended drawings, elements having substantially the same function and structure may in some cases be distinguished by different letters appended to the same sign. For example, multiple elements having substantially the same function and structure are distinguished as base stations 200, 200B, 200C, and so on as appropriate. On the other hand, when not particularly distinguishing each of multiple elements having substantially the same function and structure, only the same sign will be given. For example, the base stations 200A, 200B, 200C will be simply designated as the base station 200 when not being particularly distinguished.

Figure 2:
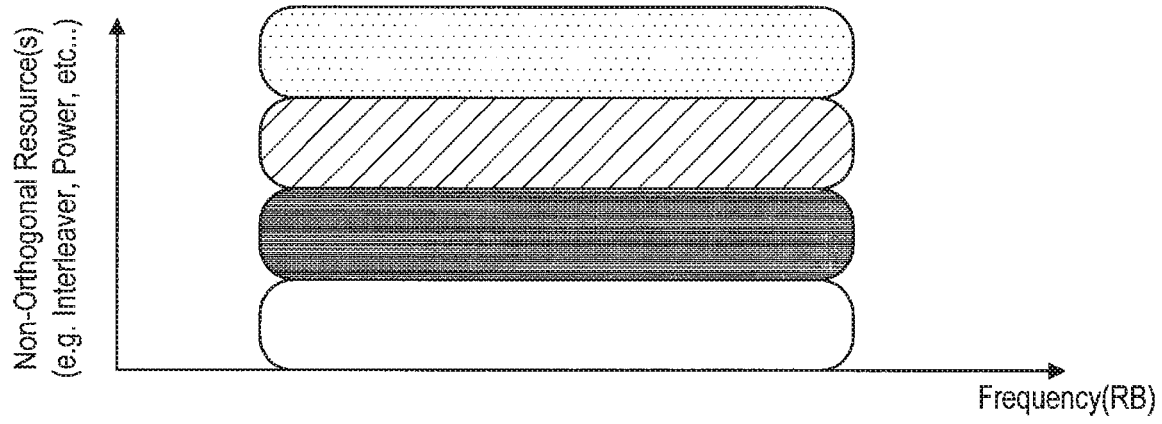
FIG. 2 is a diagram for describing an example of allocation of resources in a non-orthogonal multiple access scheme.

Note that description will be provided in the following order.
1. Introduction
2. Configuration examples
2.1. Communication system
2.2. Communication control device
2.3. Base station
2.4. Terminal device
3. Details of functions
3.1. Overview of an access setting allocation process
3.2. Transmitting function and receiving function
3.3. Details of an allocation process of an access setting
3.4. Notification of access setting information
3.5. Channel configuration
3.6. Capability information
4. Application examples
5. Conclusion 1. Introduction First, a technology relating to SPC will be described with reference to FIGS. 1 and 2. FIGS. 1 and 2 are illustrative diagrams for describing the technology relating to SPC.

As one of 5G radio access technologies (RATs), a non-orthogonal multiple access scheme has drawn attention as a successor to Long Term Evolution (LTE) and LTE-Advanced (LTE-A).

In orthogonal frequency division multiple access (OFDMA) or single-carrier FDMA (SC-FDMA) employed in LTE, resources are allocated not to overlap among user terminals within a cell. Note that resources in OFDMA or SC-FDMA refer to frequency resources or time resources for radio communication, and include various types such as subcarriers, subframes, resource blocks, and resource elements. Such a RAT in which resources are allocated not to overlap is also called an orthogonal multiple access scheme.

FIG. 1 is a diagram for describing an example of allocation of resources in the orthogonal multiple access scheme. In FIG. 1, the horizontal axis represents frequencies, and resources allocated to users are depicted in different colors according to the users. As illustrated in FIG. 1, in the orthogonal multiple access scheme, different resource blocks (RBs) can be allocated to the users in, for example, the frequency direction.

On the other hand, in the non-orthogonal multiple access scheme, at least an overlapping part of resources is allocated to user terminals within a cell. When the non-orthogonal multiple access scheme is employed, signals that are transmitted and received by user terminals within a cell can interfere with each other in a radio space. A reception side, however, can acquire information of each user through a predetermined decoding process. Thus, it is known theoretically that the non-orthogonal multiple access scheme can achieve a higher communication capacity (or cell communication capacity) than the orthogonal multiple access scheme when proper allocation of resources is executed.

FIG. 2 is a diagram for describing an example of allocation of resources in the non-orthogonal multiple access scheme. In FIG. 2, the horizontal axis represents frequencies, and resources allocated to users are depicted in different colors according to the users. As illustrated in FIG. 2, in the non-orthogonal multiple access scheme, resource blocks, for example, overlapping in the frequency direction can be allocated to users. Note that such allocation is performed in, for example, code division multiple access (CDMA) or interleave-division multiple access (IDMA).

As one RAT classified as the non-orthogonal multiple access scheme, a multiplexed/multiple access using SPC is exemplified. In SPC, a transmission side causes at least a part of frequency resources or time resources to overlap while allocating different electric power levels to signals to be multiplexed. A reception side receives and decodes a signal multiplexed on the same frequency resources or time resources using a mechanism such as an SIC or iterative detection.

Here, when efficient scheduling of a plurality of users is attempted using SPC, a constraint is assumed to be imposed on the relation of path loss between a base station and the plurality of users and the positional relation between the base station and the plurality of users, particularly in downlink. For example, when multiplexing respective signals of two users using SPC is considered, in order to efficiently operate an SIC on a reception device side, electric power of the respective two symbols multiplexed using SPC is supposed to be set according to the difference in their path loss. To maintain this setting, it is necessary to perform SPC multiplexing by intentionally applying a power difference to the users who have substantially the same path loss. In such a case, there is concern of unfairness between the users. Thus, in order to overcome such unfairness, more complicated scheduling is desirable.

In addition, when SPC and another non-orthogonal multiplexing scheme are employed, it is desirable to exchange information of non-orthogonal multiplexing scheme or scheduling that has been used between communication devices. Here, when a general method of physically disposing control channels and data channels, i.e., a method of disposing the channels by causing them to be orthogonal to each other in the frequency and time directions, is employed, there is a possibility of the channels having deteriorating efficiency. In addition, in order to simultaneously accommodate a device that is compatible with the non-orthogonal multiplexing scheme and a device that is not (so-called legacy device), it is desirable to provide a control channel that can be properly decoded to the legacy device.

In addition, in a general cellular system, selecting a multiplexing scheme to be used from a plurality of multiplexing schemes and switching one are not considered at the time of handover. On the other hand, when handover is executed in a system operated while selecting a multiplexing scheme to be used from a plurality of non-orthogonal multiplexing schemes, information of an orthogonal multiplexing scheme or non-orthogonal multiplexing scheme that is being employed or can be employed by a handover destination is used. Thus, it is desirable to provide the procedure of handover using such information in order to improve efficiency of the system that employs the plurality of non-orthogonal multiplexing schemes.

Therefore, a communication system according to an embodiment of the present disclosure has been created focusing on the above-described circumstances. The communication system according to an embodiment of the present disclosure can realize communication in which orthogonal resources and non-orthogonal resources can be selectively used. More specifically, the communication system according to the embodiment can communicate using a plurality of access schemes including at least one of the access schemes of a multiple access scheme that uses orthogonal resources and a multiple access scheme that uses non-orthogonal resources. In addition, the communication system according to the embodiment can properly perform allocation of an access scheme and resources that each radio communication device uses. Details of the embodiment will be described below.

2. Configuration Examples 2.1. Communication System

First, an overall configuration of the communication system according to the embodiment will be described with reference to FIGS. 3 to 5.

Figure 3:
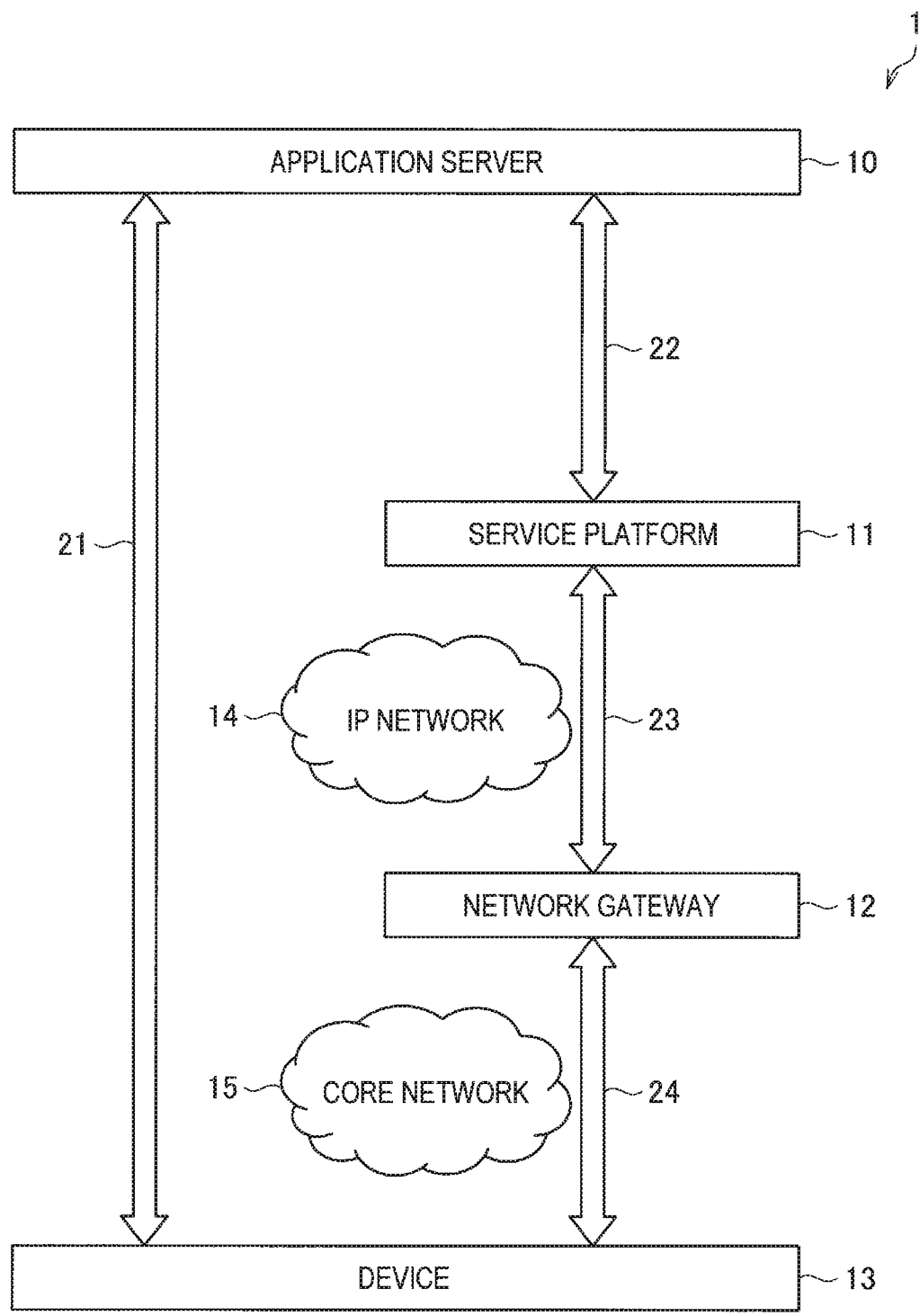
FIG. 3 is a diagram for describing an example of a configuration of a communication system according to an embodiment.

FIG. 3 is a diagram for describing an example of the configuration of the communication system according to the embodiment. As illustrated in FIG. 3, the communication system 1 includes an application server 10, a service platform 11, a network gateway 12, a device 13, an IP network 14, and a core network 15.

The application server 10 is a server which provides a service. The service platform 11 is a server which provides an environment that is the foundation of the service provided by the application server 10. The network gateway 12 is a device with a function of intermediating different networks. The device 13 is a radio communication device. The network gateway 12 is connected to the service platform 11 via the IP network 14. In addition, the device 13 is connected to the network gateway 12 via the core network 15.

The device 13 can include a terminal device, a base station, a network manager, or the like. The terminal device is, for example, a user terminal. The base station is, for example, a NodeB, an eNB, an access point, or the like. The network manager has a function of managing a network. Although the terminal device, the base station, and the network manager are expressed in the same layer as the device 13 in FIG. 3, they may belong to different layers. When they belong to different layers, it is desirable that the layer to which the base station and the network manager belong be closer to the core network 15 than the layer to which the terminal device belongs.

The terminal device that belongs to the device 13 uses the service provided by the application server 10 through a network. A logical session relating to use of the service can be understood as communication between the terminal device and the application server 10 denoted by reference numeral 21. On the other hand, physical sessions relating to the user of the service can be understood as communication performed with the variety of devices as denoted by reference numerals 22, 23, and 24. For example, the terminal device accesses the application server 10 via the base station, the core network 15, the network gateway 12, the IP network 14, and the service platform 11. Note that, the application server 10 may form the service platform 11 together with a plurality of other servers, for example, cloud systems. In this case, the service platform 11 may have a gateway function of connecting to the IP network 14. In addition, the service platform 11, the IP network 14, and the core network 15 can further include a router, a switch, a virtualization device which virtualizes a network such as a router or a switch, a virtualization control device which controls virtualization, a cable, and the like as physical devices.

Figure 4:
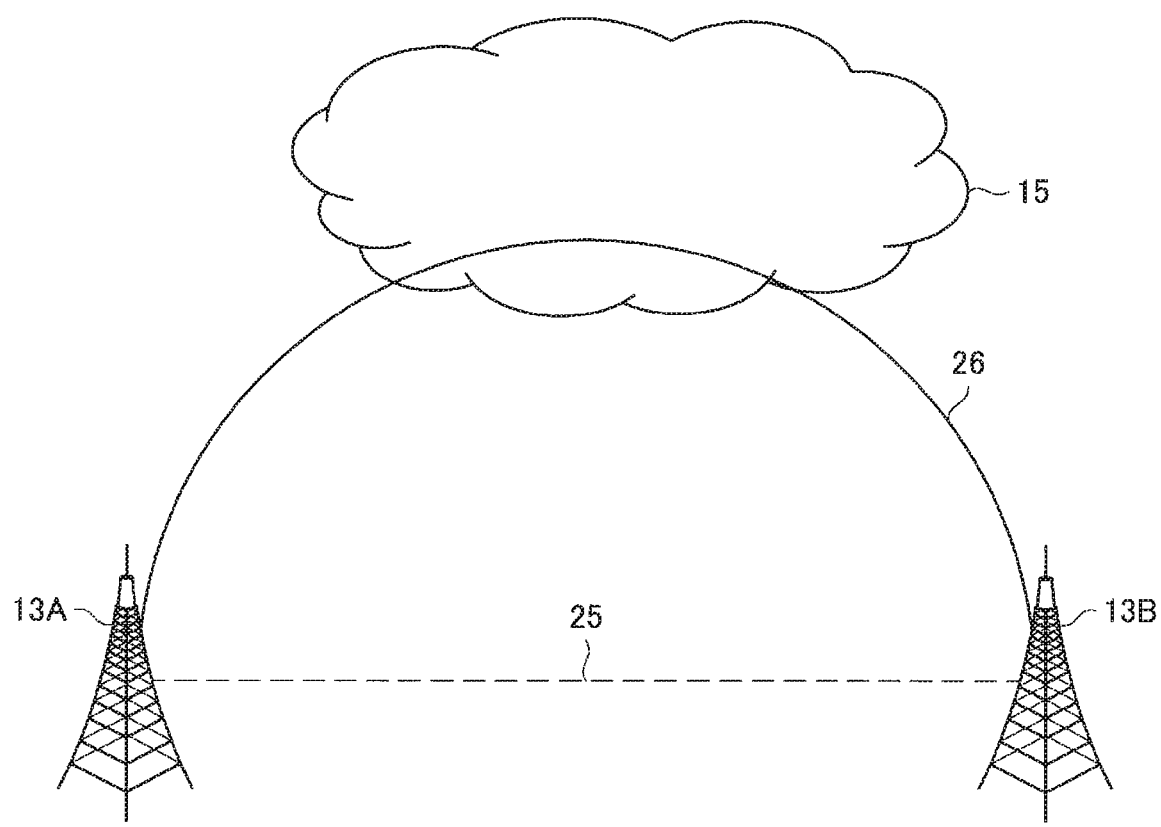
FIG. 4 is a diagram for describing a logical interface and a physical interface.

FIG. 4 is a diagram for describing a logical interface and a physical interface. As illustrated in FIG. 4, base stations 13A and 13B are connected to each other through a logical interface 25. This interface is not limited to being logically connected. For example, the base stations 13A and 13B can be physically connected to each other through a physical interface 26 which includes a plurality of entities such as the core network 15 as illustrated in FIG. 4. Note that the interfaces between the base stations denoted by reference numerals 25 and 26 are also referred to as X2 interfaces.

Figure 5:
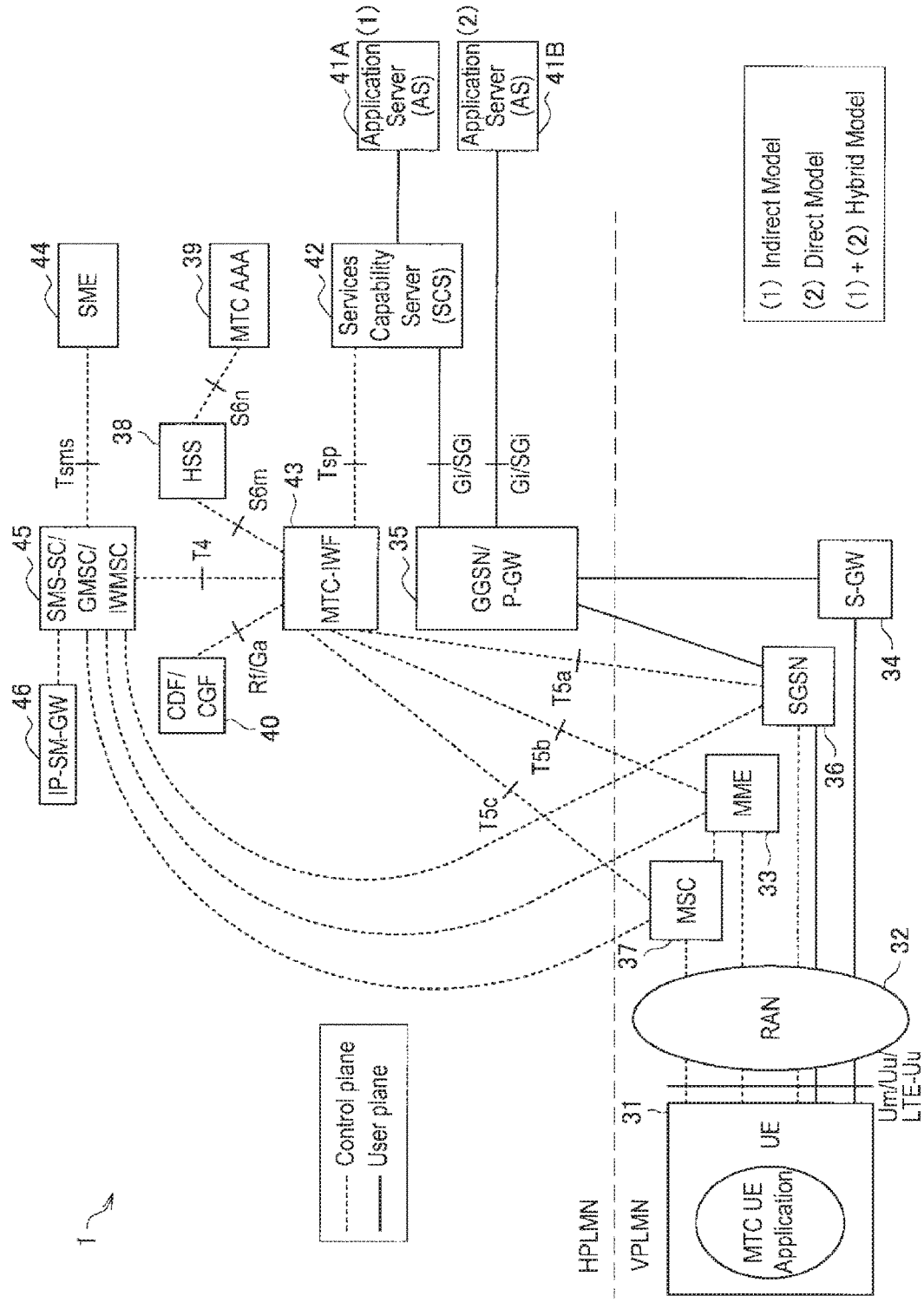
FIG. 5 is a diagram for describing an example of another configuration of the communication system according to the embodiment.

FIG. 5 is a diagram for describing an example of another configuration of the communication system according to the embodiment. In FIG. 5, a network configuration in Machine Type Communications (MTC) that is another example of a network configuration is illustrated. Note that the dashed lines in the drawing represent a control plane and the solid lines represent a user plane. In addition, the entities and paths in the drawing (control plane and user plane) are respectively logical entities and logical paths.

The network configuration illustrated in FIG. 5 is broadly divided into a home public land mobile network (HPLMN) and a visited public land mobile network (VPLMN), showing a configuration in which roaming of different communication service providers is used. The HPLMN is a network of the communication service provider to which a target communication device (for example, UE 31) originally belongs, and the VPLMN is a network of a roaming destination of the communication device. A public IP network may relay the HPLMN and the VPLMN. During roaming, data of the control plane is in particular relayed from the VPLMN to entities within the HPLMN as illustrated in FIG. 5. This is because it is necessary for control information of the target UE 31 to be managed on the communication service provider in the home ground. On the other hand, data of the user plane is relayed from the gateway on the VPLMN side to the gateway of the HPLMN side, and then relayed and transferred to an application server 41. Note that the data of the user plane may go through the public IP network or an entity of the service platform. In normal circumstances in which roaming does not occur, there is no interface between the HPLMN and the VPLMN.

Each of the entities included in the network configuration shown in FIG. 5 will be described in order below.

The user equipment (UE) 31 is an example of a terminal device 300, in which an "MTC UE Application" that is an application for MTC is installed. The UE 31 accesses an MME 33, an S-GW 34, an SGSN 36, and an MSC 37 via a radio access network (RAN) 32. In the present embodiment, the RAN 32, a plurality of access schemes including at least one of the access schemes of a multiple access scheme using orthogonal resources and a multiple access scheme using non-orthogonal resources can be used. A base station 200 resides in, for example, the RAN 32, and is connected to the UE 31.

The Mobility Management Entity (MME) 33 is an entity that mainly deals with the control plane, and manages mobility and security of the UE 31. When the UE 31 moves to an area of handover or the like using mobility, the MME 33 manages information of the movement, and exchanges the information with a superordinate entity of the core network or an entity of another operator.

The Serving Gateway (S-GW) 34 mainly deals with data of the user plane (IP data). The S-GW 34 is an entity that interconnects the RAN 32 and the core network, and is in charge of routing of data while coping with mobility of each UE.

A Packet Data Network Gateway (P-GW) 35 mainly deals with data of the user plane (IP data). The P-GW 35 is an entity that interconnects the core network and an external network. In addition, the P-GW 35 also performs policy control, charge control, and management of IP addresses of the core network and a RAN to be provided. The S-GW 34 and the P-GW 35 are logically different entities, but may be the same physically. The gateway GPRS support node (GGSN) 35 is an entity that interconnects the core network and an external network, like the P-GW 35.

The serving GPRS support node (SGSN) 36 is an entity that functions as both the MME 33 and the S-GW 34. The SGSN 36 is an entity residing according to the type of network (general packet radio services (GPRS)) or the type of RAN 32 (WCDMA (a registered trademark)/GMS)). Because it functions as both the MME 33 and the S-GW 34, the SGSN 36 deals with both the control plane and the user plane.

The mobile switching centre (MSC) 37 is an entity that is mainly used on a network of GSM (a registered trademark) and WCDMA, and is in charge of delivering circuit switch (CS) services such as voice calls, short message services (SMS), and the like. In order to support the CS services, the MSC 37 has a function of controlling installation and release of end-to-end connection, mobility of the UE 31, handover during calling, and the like.

A Home Subscriber Server (HSS) 38 is a subscriber information database relating to contractors and users (for example, the UE 31) with which an operator has entered into a contract. The HSS 38 manages information; for example, authentication information, current residence, and the like. When the UE 31 performs roaming, being present in a roaming destination is also managed'by the HSS 38.

MTC-Authentication, Authorization, and Accounting (AAA) 39 is an entity which provides authentication, authorization, and accounting functions. The MTC-AAA 39 deals with functions and control with respect to each subscriber or UE 31 using the subscriber information retained in the HSS 38.

A Charging Data Function (CDF) 40 and a Charging Gateway Function (CGF) 40 are entities for transmitting and receiving billing data with respect to a billing processing domain (Billing Center/Billing Domain) of the operator.

The application server 41 is a server for providing services. A Services Capability Server (SCS) 42 is an entity for properly selecting a service that the application server 41 can provide. For example, a case in which, before the application server 41 provides a certain service, it is necessary for a target UE 31 to monitor or sense the service is assumed. In this case, when the SCS 42 request a trigger thereof from the UE 31, the application server 41 can start providing a service smoothly. The SCS 42 is not necessary for all application servers 41. There may be, for example, an application server 41A that is accompanied with the SCS 42 and an application server 41B that is not, as illustrated in FIG. 5. Note that the application server 41A that is accompanied with the SCS 42 is also called an indirect model, and the application server 41B that is not accompanied with the SCS 42 is also called a direct model. In addition, a network configuration which includes both of them is also called a hybrid model.

An MTC-Interworking Function (IWF) 43 is an entity which is connected to one or more SCSs 42. The MTC-IWF 43 has a function of determining or authorizing whether an application (service) provided via the SCS 42 can be provided on a network of a corresponding operator. In addition, the MTC-IWF also plays roles of receiving a request for a trigger for a user transferred from the SCS 42 and replying to the SCS 42 with the result of the trigger.

A Short Message Entity (SME) 44 is an entity which performs transmission or reception of short messages.

A Short Message Service Switching Centre (SMS-SC) 45, an SMS-Gateway Mobile Switching Centre (SMS-GMSC) 45, and an SMS-Interworking Mobile Switching Centre (SMS-IWMSC) 45 are entities which control exchange of short messages on the HPLMN. The SMS-SC 45, SMS-GMSC 45, and SMS-IWMSC 45 are in charge of notifying relevant entities of a setting when there is no user who transmits or receives a short message, or success of transmission or reception of a short message.

An IP Short Message Gateway (IP-SM-GW) 46 is an entity that has a function of taking in SMSs of an external IP Network (a service, a service provider/or the like), in addition to SMSs provided by an operator for improving convenience of SMSs.

The overall configuration of the communication system 1 according to the present embodiment has been described above. Next, basic configuration examples of the respective devices that the communication system 1 includes will be described.

2.2 Communication Control Device

The communication system 1 according to the present embodiment includes a communication control device which controls communication performed within the communication system 1 coordinately. The communication control device can be realized as, for example, the application server 10, the service platform 11, or the network manager 16. The communication control device may be realized as a logical entity, or may be integrally formed with a base station.

Figure 6:
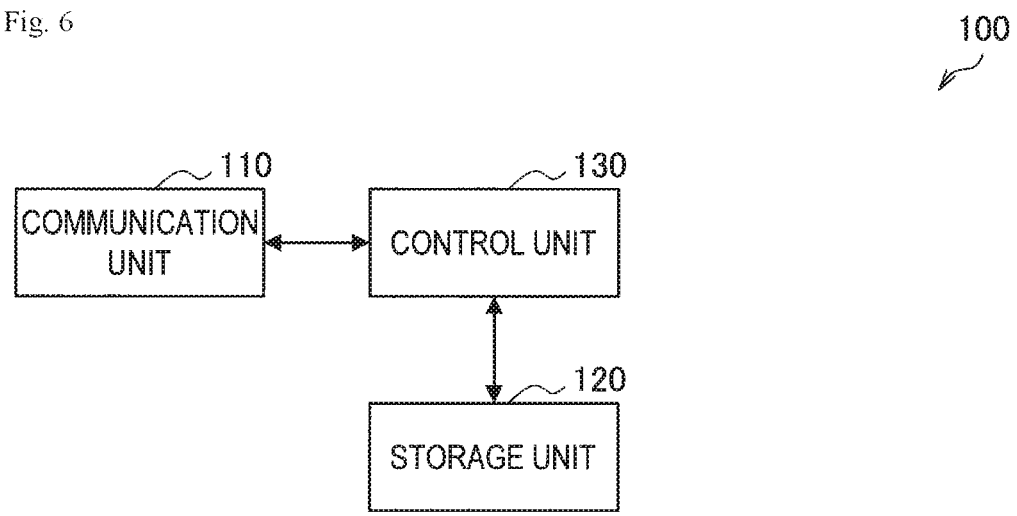
FIG. 6 is a block diagram illustrating an example of a logical configuration of a communication control device according to the embodiment.

FIG. 6 is a block diagram illustrating an example of a logical configuration of a communication control device 100 according to the present embodiment. As illustrated in FIG. 6, the communication control device 100 includes a communication unit 110, a storage unit 120, and a control unit 130.

(1) Communication Unit 110

The communication unit 110 is a communication interface which intermediates communication of the communication control device 100 with another device. The communication unit 110 may be a wired communication interface or a wireless communication interface. The communication unit 110 according to the present embodiment communicates with a communicable radio communication device of the communication system 1 using a plurality of access schemes including at least one of the access schemes of a multiple access scheme that uses orthogonal resources and a multiple access scheme that uses non-orthogonal resources. As the radio communication device with which the communication unit 110 communicates, for example, one or more terminal devices which belong to the device 13 and one or more base stations are exemplified.

In the present embodiment, orthogonal resources or non-orthogonal resources are used for multiplexing difference users or signals. As orthogonal resources, for example, time (a subframe, a slot, a radio frame, and the like), a frequency (a component carrier, a subcarrier, a subchannel, a resource block, and the like), a code (a spread code, a randomized code, and the like), and the like are exemplified. In addition, as non-orthogonal resources, a space (a spatial stream, a spatial layer, a spatial code book, an antenna, an antenna port, and the like), electric power (power and the like), an interleaver (a bit interleaver, a symbol interleaver, and the like), a data rate, a code (a sparse code, a spread codebook, and the like), and the like are exemplified. Although such resources are referred to simply as resources in the present specification, they may be referred to as other various names. For example, the resources may be referred to as radio access resources (RAR), radio resources (RR), access resources (AR), radio access axes (RAA), radio access components (RAC), or radio access blocks (RAB).

The communication unit 110 directly or indirectly communicates with the base station 200 and the terminal device 300. For example, the communication unit 110 may transmit access setting information to be described below to the base station 200 or the terminal device 300. The communication unit 110 receives capability information from the base station 200 or the terminal device 300. In addition, the communication unit 110 may transfer the received capability information to another device such as another communication control device 100 or the like. The capability information is information indicating with which access scheme each device is compatible or incompatible, and with which resources each device is compatible or incompatible. That is to say, the capability information includes information indicating compatibility with non-orthogonal resources. In addition, the capability information includes information indicating compatibility with orthogonal resources.

In addition, the communication unit 110 transmits information indicating a result of allocation by the control unit 130 to be described below to the base station 200 or the terminal device 300. The information indicating a result of allocation by the control unit 130 includes information indicating at least any of allocated access scheme or resources. The information indicating the result of allocation is also referred to as access setting information below.

(2) Storage Unit 120

The storage unit 120 stores a program and data for operating the communication control device 100 using a storage medium such as a hard disk or a, semiconductor memory. The data stored by the storage unit 120 can include, for example, capability information of each device within the communication system 1 (for example, the base station 200, the terminal device 300, and the like).

(3) Control Unit 130

The control unit 130 controls overall operations of the communication control device 100. The control unit 130 has a function of controlling communication performed within the communication system 1 coordinately.

For example, the control unit 130 has a function of allocating resources relating to an access scheme that a radio communication device within the communication system 1 uses. Resources to be allocated by the control unit 130 include at least one of a space area, an electric power area, an interleaver area, a data rate area, and a sparse code area. In addition, resources to be allocated may include a time area or a frequency area. For example, the control unit 130 first allocates an access scheme to be used by each radio communication device. Then, the control unit 130 allocates a space area, an electric power area, an interleaver area, a data rate area, or a sparse code area to be used in the allocated access scheme to the radio communication device. For example, the control unit 130 performs allocation based on capability information of each device within the communication system 1. In addition, the control unit 130 may perform allocation further based on status information of the base station 200 within the communication system 1. The status information is information indicating which access scheme the base station 200 itself is currently using. A combination of an access scheme and resources will also be referred to as an access setting and allocation of an access scheme and resources will also be referred to as allocation of an access setting below. The control unit 130 may allocate different access settings or may allocate a shared access setting to one or more base stations 200 or one or more terminal devices 300.

The control unit 130 can perform various processes using the capability information or the status information. For example, the control unit 130 can use the capability information and the status information in the procedure of handover or the procedure of admission control. For example, the control unit 130 may change an access setting to be allocated to the base station 200 or the terminal device 300 in the procedure of handover or the procedure of admission control.

2.3. Base Station

Figure 7:
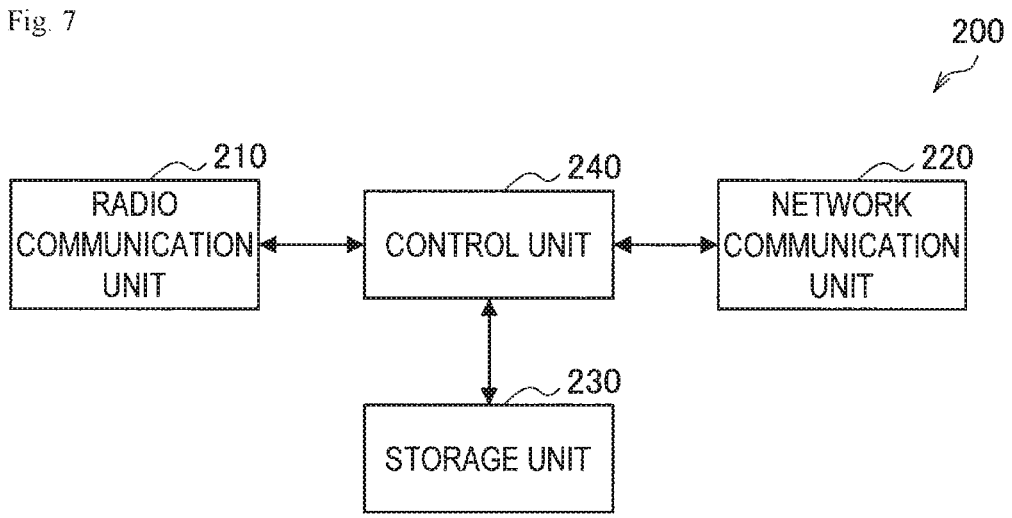
FIG. 7 is a block diagram illustrating an example of a logical configuration of a base station according to the embodiment.

FIG. 7 is a block diagram illustrating an example of a logical configuration of the base station 200 according to the present embodiment. As illustrated in FIG. 7, the base station 200 includes a radio communication unit 210, a network communication unit 220, a storage unit 230, and a control unit 240.

(1) Radio Communication Unit 210

The radio communication unit 210 is a communication interface which intermediates communication of the base station 200 with another device. The radio communication unit 210 according to the present embodiment performs radio communication with one or more terminal devices 300 that access the base station 200 using a plurality of access schemes including at least one of the access schemes of a multiple access scheme that uses orthogonal resources and a multiple access scheme that uses non-orthogonal resources. For example, the radio communication unit 210 performs radio communication with the terminal device 300 using an access setting allocated by the communication control device 100. For example, the radio communication unit 210 receives capability information from the terminal device 300. In addition, the radio communication unit 210 transmits access setting information received from the communication control device 100 using the network communication unit 220 to the terminal device 300.

(2) Network Communication Unit 220

The network communication unit 220 is a communication interface for connecting the base station 200 to the core network 15. The network communication unit 220 may be a wired communication interface or a wireless communication interface. The network communication unit 220 transmits and receives data traffic and exchanges control messages to and from various control nodes on the core network 15. The network communication unit 220 can communicate with another base station 200 or communication control device 100 within the communication system 1.

For example, the network communication unit 220 may transfer capability information received from the terminal device 300 using the radio communication unit 210 to another device such as another base station 200 or communication control device 100. In addition, the network communication unit 220 may transmit status information indicating which access scheme the base station 200 itself is currently using to another base station 200 or communication control device 100. In addition, the network communication unit 220 receives access setting information indicating an access setting allocated by the communication control device 100 from the communication control device 100.

(3) Storage Unit 230

The storage unit 230 stores a program and data for operating the base station 200 using a storage medium such as a hard disk or a semiconductor memory. The data stored by the storage unit 230 can include access setting information and capability information or one or more terminal devices 300 that accesses the base station 200.

(4) Control Unit 240

The control unit 240 controls overall operations of the base station 200. The control unit 240 according to the present embodiment has a function of controlling the radio communication unit 210 to perform radio communication using resources allocated with regard to an access scheme that the radio communication unit 210 uses. For example, the control unit 240 sets the radio communication unit 210 to use the access scheme allocated by the communication control device 100. Then, the control unit 240 sets the radio communication unit 210 to perform radio communication using the space area, the electric power area, the interleaver area, the data rate area, or the sparse code area allocated by the communication control device 100 with respect to the access scheme to be used by the radio communication unit 210.

The control unit 240 can perform various processes using capability information or status information. For example, the control unit 240 can use capability information or status information in the procedure of handover or the procedure of admission control. For example, the control unit 240 may apply a change in an access setting instructed by the communication control device 100 to the procedure of handover or the procedure of admission control. At this time, the control unit 240 may perform change possibility determination for determining whether to apply or reject the change of the instructed access setting. In addition, the control unit 240 may determine whether to approve or reject acceptance of handover of the terminal device 300 according to the result of the change possibility determination on the access setting.

2.4. Terminal Device

Figure 8:
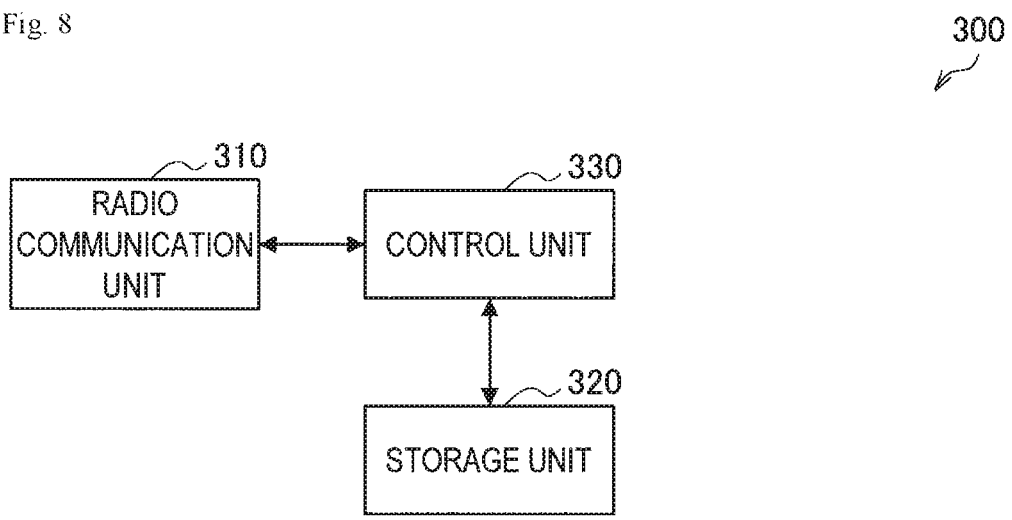
FIG. 8 is a block diagram illustrating an example of a logical configuration of a terminal device according to the embodiment.

FIG. 8 is a block diagram illustrating an example of a logical configuration of the terminal device 300 according to the present embodiment. As illustrated in FIG. 8, the terminal device 300 has a radio communication unit 310, a storage unit 320, and a control unit 330.

(1) Radio Communication Unit 310

The radio communication unit 310 is a radio communication interface which intermediates radio communication of the terminal device 300 with another device. The radio communication unit 310 according to the present embodiment performs radio communication using one or more access schemes of at least either a multiple access scheme that uses orthogonal resources or a multiple access scheme that uses non-orthogonal resources. For example, the radio communication unit 310 performs radio communication with the base station 200 using an access setting allocated by the communication control device 100. For example, the radio communication unit 310 transmits its capability information to the base station 200.

(2) Storage Unit 320

The storage unit 320 stores a program and data for operating the terminal device 300 using a storage medium such as a hard disk or a semiconductor memory. The data stored by the storage unit 320 can include access setting information.

(3) Control Unit 330

The control unit 330 controls overall operations of the terminal device 300. The control unit 330 according, to the present embodiment has a function of controlling the radio communication unit 310 to perform radio communication using resources allocated with regard to an access scheme that the radio communication unit 310 uses. For example, the control unit 330 sets the radio communication unit 310 to use the access scheme allocated by the communication control device 100. Then, the control unit 330 sets the radio communication unit 310 to perform radio communication using the space area, the electric power area, the interleaver area, the data rate area, or the sparse code area allocated by the communication control device 100 with respect to the access scheme to be used by the radio communication unit 310.

The basic configuration example of each of the devices included in the communication system 1 has been described above. Next, the functions of the devices will be described in detail.

3. Details of Functions 3.1. Overview of an Access Setting Allocation Process

Figure 9:
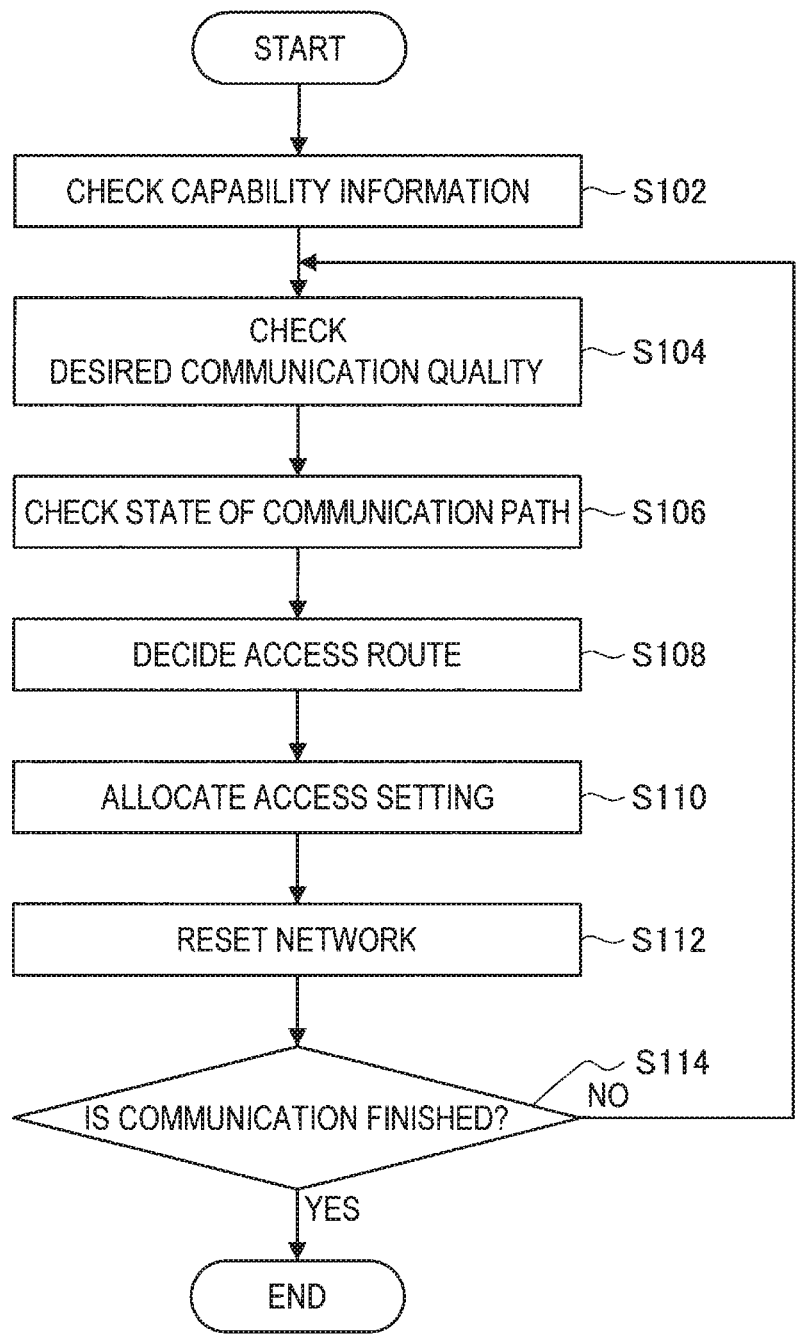
FIG. 9 is a flowchart showing an example of the flow of an allocation process of an access setting executed in the communication control device according to the embodiment.

FIG. 9 is a flowchart showing an example of the flow of an allocation process of an access setting executed in the communication control device 100 according to the present embodiment.

As shown in FIG. 9, first, the control unit 130 ascertains capability information of each of the devices included in the communication system 1 in Step S102. For example, the communication unit 110 receives capability information from one or more base stations 200 and one or more terminal devices 300 included in the communication system 1. Then, the control unit 130 checks with which access scheme each device is compatible or incompatible and with which resources each device is compatible or incompatible with reference to capability information.

Next, in Step S104, the control unit 130 checks desired communication quality. For example, the control unit 130 checks demanded or necessary communication quality of such as a throughput, a data rate, or an amount of delay. For this reason, the base station 200 or the terminal device 300 transmits information indicating demanded communication quality to the communication control device 100.

Next, in Step S106, the control unit 130 checks a state of a communication path (radio propagation path). For example, the control unit 130 may check a state of path loss, a state of fading between each transmission and reception antenna pairs in the configuration of a plurality of antennas relating to multi-input multi-output (MIMO), a signal-to-interference-plus-noise power ratio (SINR), or the like. In addition, the control unit 130 may check a signal-to-noise ratio (SNR), the number of spatial layers transferrable on a radio propagation path between transmission and reception devices (which corresponds to the rank of a MIMO channel matrix), a proper precoding matrix, a proper modulation and demodulation scheme/error-correction coding rate, and the like.

Next, the control unit 130 decides an access route in Step S108.

Then, in Step S110, the control unit 130 performs allocation of an access setting. For example, the control unit 130 performs the access setting based on the processing result of the above-described Steps S102 to S108. Note that the control unit 130 may allocate a shared access setting to one or more terminal devices 300 that access one or more cells formed by the base station 200. At this time, the control unit 130 may also allocate an access setting shared by each cell, or allocate an access setting shared by each base station 200. In these cases, the terminal devices 300 within the cells or under the base stations 200 can use the same access setting within the same cells or under the same base stations 200, or at least some of them can use the same access setting. In addition, the control unit 130 may allocate an access setting to each terminal device 300. In this case, the control unit 130 can allocate a proper access setting to each terminal device 300. The cells or the base stations 200 perform scheduling or the like taking access settings used by each terminal device 300 into consideration.

Next, in Step S112, the control unit 130 performs a resetting of a network. For example, the control unit 130 transmits access setting information indicating the allocation result of the above-described Step S110 to each of devices within the communication system 1. Accordingly, communication according to the access setting information is started between the devices within the communication system 1.

Next, in Step S114, the control unit 130 determines whether or not communication of each device has ended. When it is determined that the communication continues (No in S114), the process returns to Step S104 again, and the above-described processes are repeated. The above-described processes may be periodically repeated at a predetermined interval. Accordingly, the control unit 130 can allocate access settings again according to passage of time. On the other hand, when it is determined to have ended (Yes in Step S114), the process ends.

Next, an operation processing example of the entire communication system 1 corresponding to the allocation process of an access setting by the communication control device 100 shown in FIG. 9 will be described.

Figure 10:
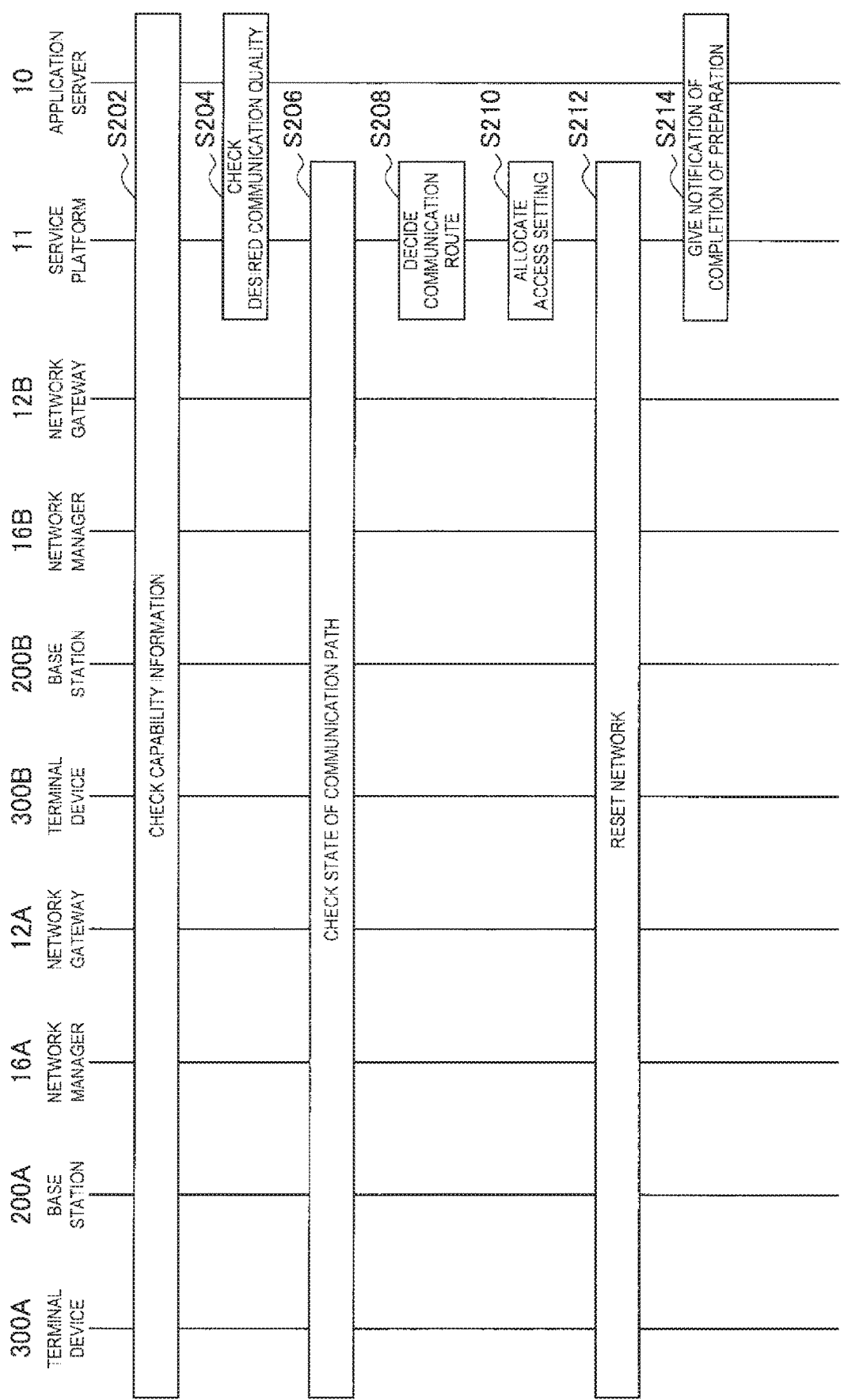
FIG. 10 is a sequence diagram showing an example of the flow of an allocation process executed in the communication system according to the embodiment.

FIG. 10 is a sequence diagram showing an example of the flow of an allocation process executed in the communication system 1 according to the present embodiment. A terminal device 300A, a base station 200A, a network manager 16A, a network gateway 12A, a terminal device 300B, a base station 200B, a network manager 16B, a network gateway 12B, the service platform 11, and the application server 10 are involved in the present sequence. Note that the terminal device 300A, the base station 200A, the network manager 16A, the network gateway 12A, the terminal device 300B, the base station 200B, the network manager 16B, and the network gateway 12B form a different network. In addition, the service platform 11 functions as the communication control device 100 in the present sequence.

As shown in FIG. 10, first, the service platform 11 checks capability information in step S202. For example, the service platform 11 transmits a message requesting capability information to the terminal device 300A, the base station 200A, the terminal device 300B, and the base station 200B to collect capability information of each of the devices. Note that the network gateways 12 and the network managers 16 physically intermediate the exchange of the information.

Next, in Step S204, the service platform 11 and the application server 10 check desired communication quality. For example, the service platform 11 inquires the desired communication quality of the application server 10.

Next, in Step S206, the service platform 11 checks a state of a communication path. For example, the service platform 11 inquires the state of the communication path of the network managers 16A and 16B.

Next, in Step S208, the service platform 11 decides a communication route.

Then, in Step S210, the service platform 11 performs allocation of an access setting.

Next, in Step S212, the service platform 11 performs a resetting of a network. For example, the service platform 11 notifies each base station 200 and each terminal device 300 of access setting information indicating the allocation result of Step S210.

Then, in Step S214, the service platform 11 notifies the application server 10 of completion of preparation. Accordingly, a service provided by the application server 10 is started, and communication according to the access setting information is started between the base station 200A and the terminal device 300A and between the base station 200B and the terminal device 300B.

Note that, although the example in which the service platform 11 functions as the communication control device 100 has been described above, the present technology is not limited thereto. For example, an arbitrary device such as the base station 200 or the like may function as the communication control device 100. In this case, since the base station 200 can directly communicate with the terminal device 300, communication with a device such as the network managers 16, the network gateways 12 can be skipped when checking capability information or a state of a communication path. In addition, when the base station 200 or the terminal device 300 can select desired communication quality such as when desired quality relating to an application is categorized, the communication control device 100 may omit inquiring about desired quality to the application server 10.

3.2. Transmitting Function and Receiving Function

Figure 11:
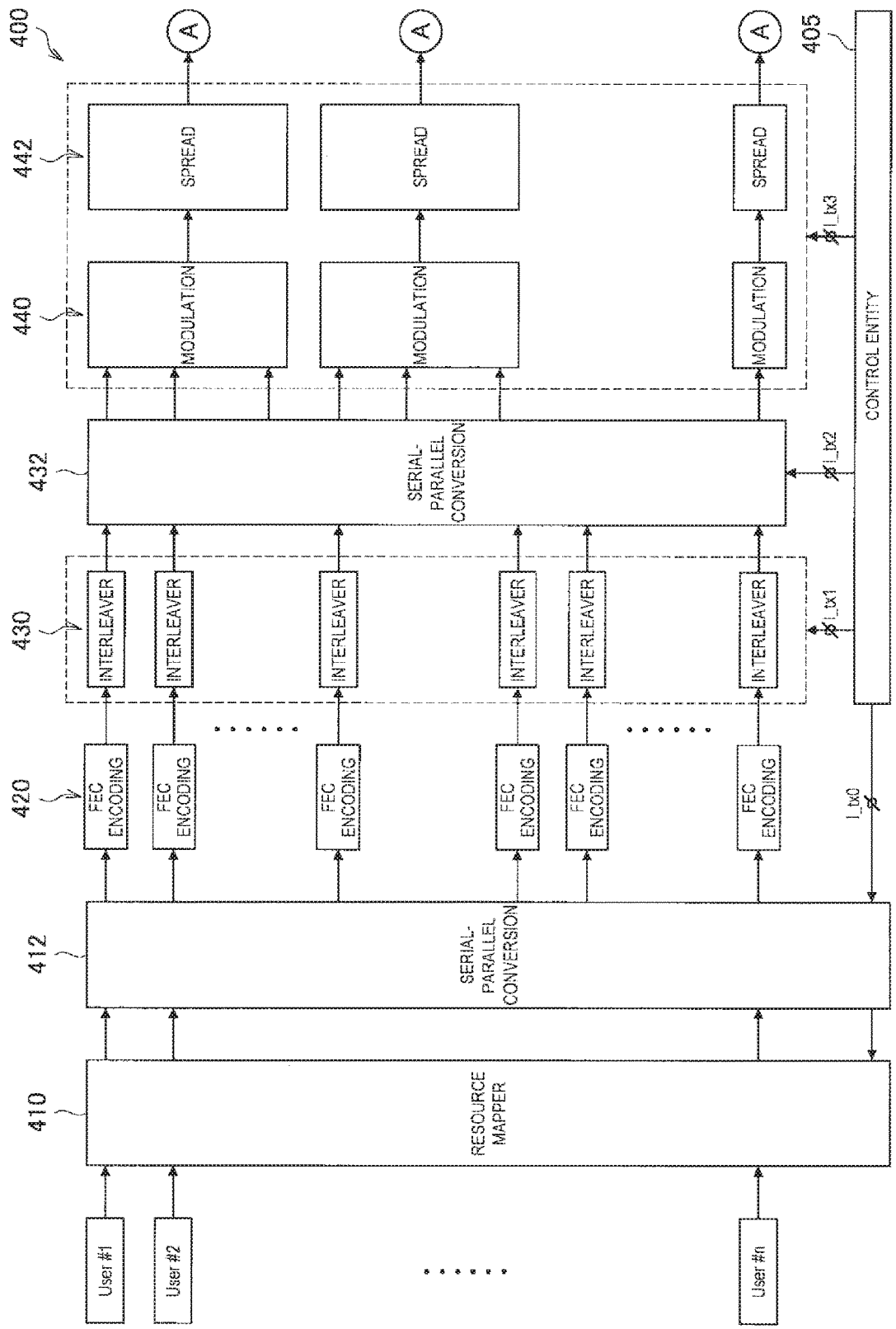
FIG. 11 is a block diagram illustrating a functional configuration of a transmission device according to the embodiment.
Figure 12:
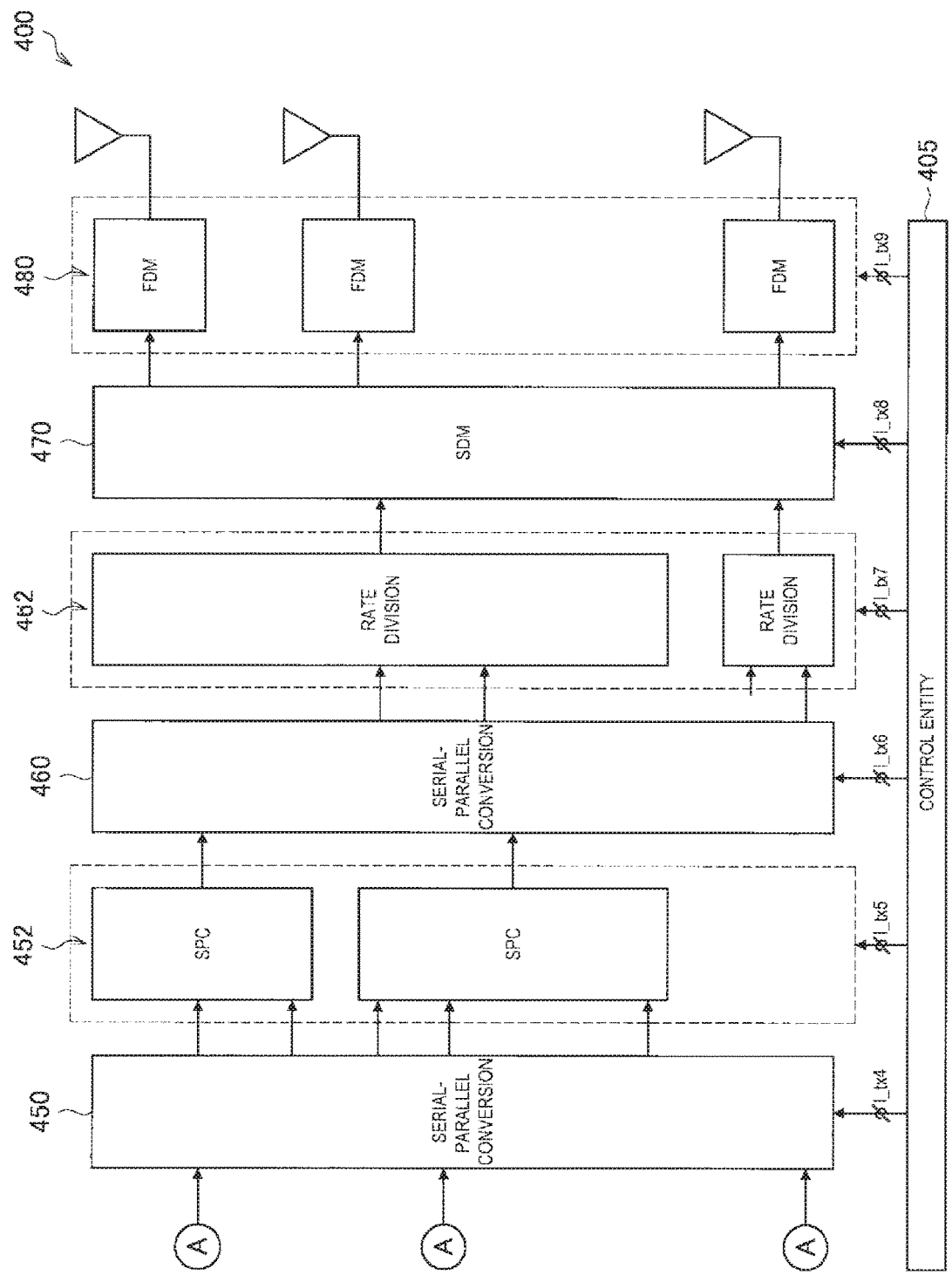
FIG. 12 is a block diagram illustrating a functional configuration of a transmission device according to the embodiment.
Figure 13:
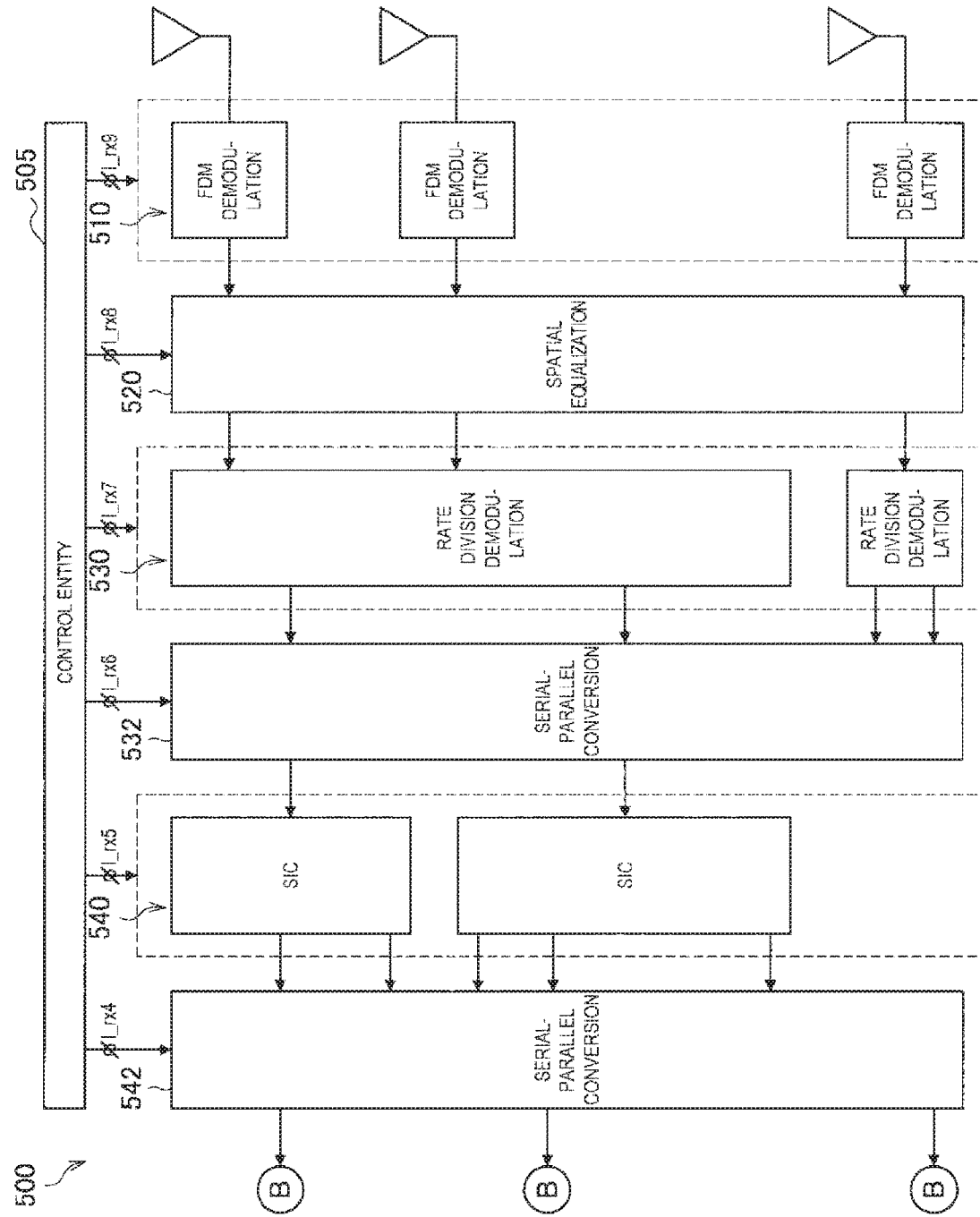
FIG. 13 is a block diagram illustrating a functional configuration of a transmission device according to the embodiment.
Figure 14:
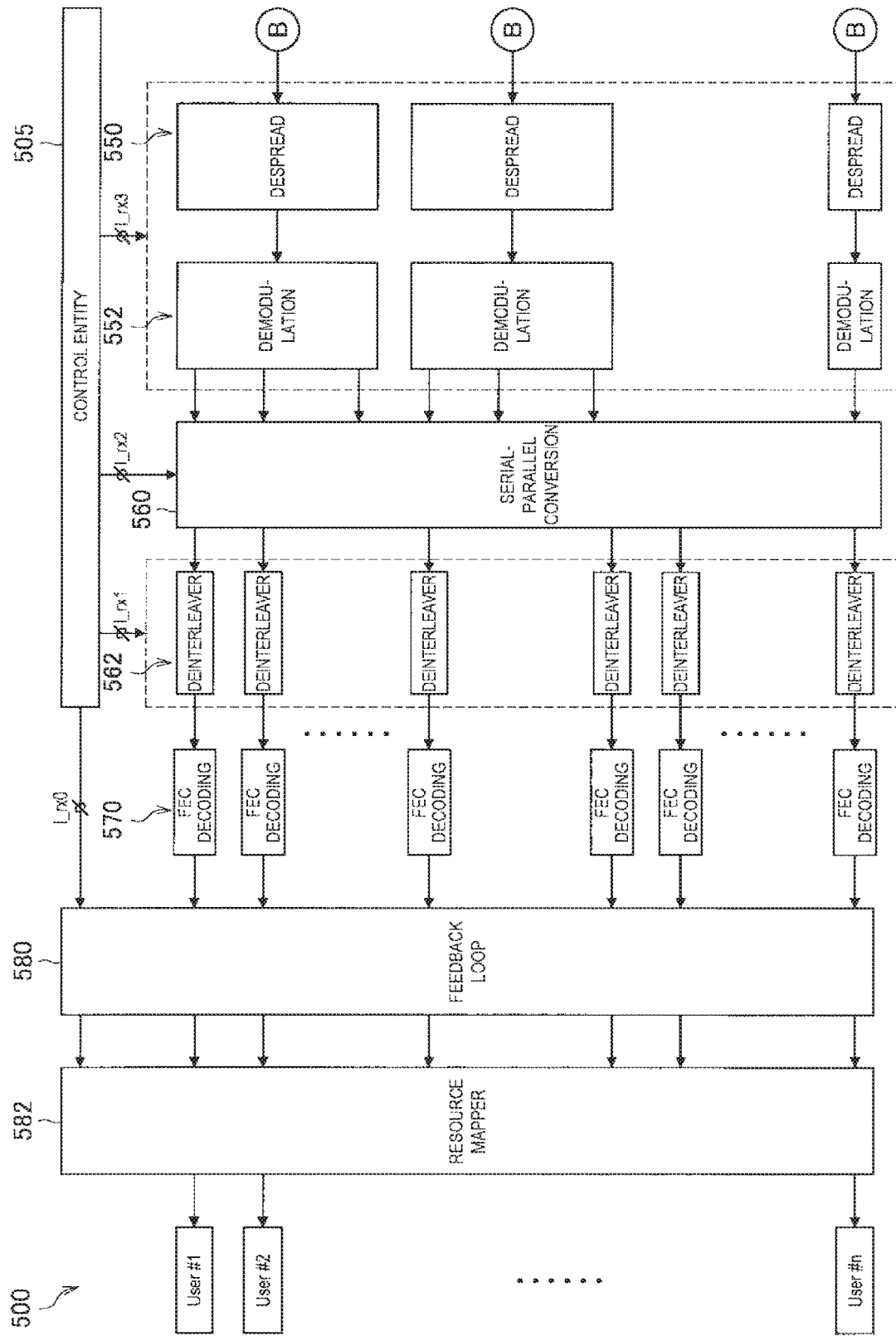
FIG. 14 is a block diagram illustrating a functional configuration of a transmission device according to the embodiment.

Next, more detailed configuration examples of the radio communication device according to the present embodiment will be described with reference to FIGS. 11 to 14. The configuration described below can be common to a radio communication unit 210 of the base station 200 and a radio communication unit 310 of the terminal device 300. FIGS. 11 and 12 illustrate a configuration example of a transmission device (transmitting function), and FIGS. 13 and 14 illustrate a configuration example of a reception device (receiving function). These drawings show configuration examples that can correspond to multiple schemes including Frequency Division Multiplexing (FDM), Interleave Division Multiple Access (IDMA), Space Division Multiple Access (SDMA), Superposition Coding (SPC), Rate Splitting Multiple Access (RSMA), and Sparse Code. Multiple Access (SCMA).

Transmitting Function

FIGS. 11 and 12 are block diagrams illustrating a functional configuration of the transmission device according to the present embodiment. As illustrated in FIG. 11, the transmission device 400 includes a resource mapper 410, a serial-parallel conversion processing unit 412, FEC encoding processing units 420, interleavers 430, another serial-parallel conversion processing unit 432, modulation processing units 440, and spreading processing units 442. In addition, the transmission device 400 further includes another serial-parallel conversion processing unit 450, SPC processing units 452, another serial-parallel conversion processing unit 460, rate division processing units 462, an SDM processing unit 470, and FDM processing units 480 as illustrated in FIG. 12.

The resource mapper 410 as a function of performing resource mapping targeting n user signals. The serial-parallel conversion processing units 412, 432, 450, and 460 output input information to a proper succeeding entity, functioning as arbiters (information arbiters). The FEC encoding processing units 420 have a function of performing error-correction encoding (for example, forward error correction). The interleavers 430 have a function of performing multiplexing using IDMA by interleaving an input series. The modulation processing units 440 have a function of performing digital modulation. The spreading processing units 442 have a function of performing symbol spreading. The modulation processing units 440 and the spreading processing units 442 perform multiplexing using. SCMA. The SPC processing units 452 have a function of performing multiplexing using SPC. The rate division processing unit 462 has a function of performing multiplexing using RSMA. The SDM processing unit 470 has a function of performing multiplexing using SDMA. The FDM processing units 480 have a function of performing multiplexing using FDM.

In addition, the transmission device 400 further includes a control entity 405 for controlling each of the entities described above as illustrated in FIGS. 11 and 12. The control entity 405 turns on or off transmitting functions corresponding to each of the multiplexing schemes by turning on or off operations of each entity, or controls parameters of each entity. The control entity 405 has interfaces I_tx0 to I_tx9 for controlling the transmitting functions and parameters corresponding to each of the multiplexing schemes. This is because a proper multiplexing scheme or parameter can be different in, for example, downlink, uplink, and device-to-device (D2D) communication of a cellular system.

For example, the control entity 405 multiplexes user data with the same resource block via the interface I_tx0. The control entity 405 allocates an interleave pattern for IDMA via the interface I_tx1. The control entity 405 selects a pair of signals to be multiplexed using SCMA via the interface I_tx2. The control entity 405 controls an encoding process and a digital modulation process for SCMA via the interface I_tx3. The control entity 405 selects a pair of signals to be multiplexed using SPC via the interface I_tx4. The control entity 405 controls an SPC process via the interface I_tx5. The control entity 405 selects a pair of signals to be multiplexed using RSMA via the interface I_tx6. The control entity 405 controls a rate division process via the interface I_tx7. The control entity 405 controls an SDM process via the interface I_tx8. The control entity 405 controls an FDM process via the interface I_tx9.

Receiving Function

FIGS. 13 and 14 are block diagrams illustrating a functional configuration of the transmission device according to the present embodiment. As illustrated in FIG. 13, the reception device 500 includes FDM demodulation processing units 510, a spatial equalization processing unit 520, rate division demodulation processing units 530, a serial-parallel conversion processing unit 532, SIC processing units 540, and another serial-parallel conversion processing unit 542. In addition, as illustrated in FIG. 14, the reception device 500 further includes despreading processing units 550, demodulation processing units 552, another serial-parallel conversion processing unit 560, deinterleavers 562, FEC decoding processing units 570, a feedback loop processing unit 580, and a resource mapper 582.

The FDM demodulation processing units 510 have a function of demodulating a signal multiplexed using FDM. The spatial equalization processing unit 520 has a function of demodulating a signal multiplexed using SDMA. The rate division demodulation processing units 530 have a function of demodulating a signal multiplexed using RSMA. The serial-parallel conversion processing units 532, 542, and 560 output input information to a proper succeeding entity, functioning as arbiters. The SIC processing units 540 have a function of demodulating a signal multiplexed using SPC. The despreading processing units 550 have a function of performing despreading of a signal that has undergone symbol spreading. The demodulation processing units 552 have a function of demodulating a signal that has digitally modulated. The despreading processing units 550 and demodulation processing units 552 perform demodulation of a signal multiplexed using SCMA. The deinterleavers 562 have a function of demodulating a signal multiplexed using IDMA. The FEC decoding processing units 570 have a function of decoding a signal that has undergone error-correction encoding. The feedback loop processing unit 580 has a function of repeatedly executing the process from the spatial equalization processing unit 520 to the FEC decoding processing units 570. The resource mapper 582 has a function of acquiring and outputting n user signals from input signals.

In addition, the reception device 500 further includes a control entity 505 for controlling each of the entities described above as illustrated in FIGS. 13 and 14. The control entity 505 turns on or off receiving functions corresponding to each of the multiplexing schemes by turning on or off operations of each entity, or controls parameters of each entity. The control entity 505 has interfaces I_rx0 to I_rx9 for controlling the transmitting functions and parameters corresponding to each of the multiplexing schemes.

For example, the control entity 505 separates user data multiplexed with the same resource block via the interface I_rx0. The control entity 505 allocates a deinterleave pattern for IDMA via the interface I_rx1. The control entity 505 separates a pair of signals multiplexed using SCMA via the interface I_rx2. The control entity 505 controls a despreading process and a demodulation process via the interface I_rx3. The control entity 505 separates a pair of signals multiplexed using SPC via the interface I_rx4. The control entity 505 controls an SIC process via the interface I_rx5. The control entity 505 separates a pair of signals multiplexed using RSMA via the interface I_rx6. The control entity 505 controls a-rate division demodulation process via the interface I_rx7. The control entity 505 controls a spatial equalization process via the interface I_rx8. The control entity 505 controls an FDM demodulation process via the interface I_rx9.

3.3. Details of an Allocation Process of an Access Setting

Details of the allocation process of an access setting executed in the communication system 1 according to the present embodiment will be described below. In the present specification, details of the process with respect to the communication control device 100, the base station 200, and the terminal device 300 will be described focusing on access schemes among access settings.

3.3.1. Regarding the Communication Control Device

Figure 15:
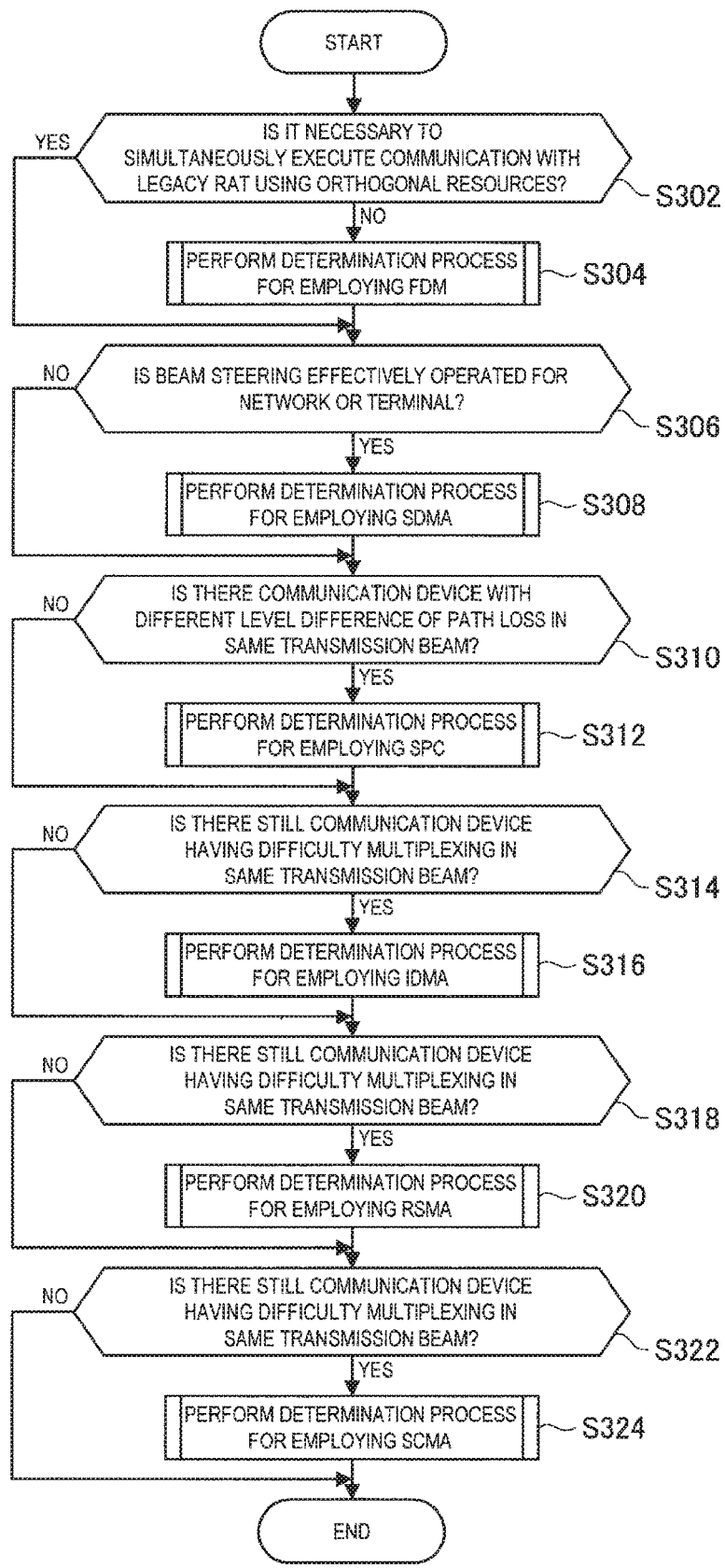
FIG. 15 is a flowchart showing an example of the flow of an allocation process of an access setting executed by the communication control device according to the embodiment.

FIG. 15 is a flowchart showing an example of the flow of an allocation process of an access setting executed by the communication control device 100 according to the present embodiment. In the present flowchart, a case in which there is a possibility of the communication system 1 executing or providing the functions of FDM, SDMA, SPC, IDMA, RSMA, and SCMA is shown as an example.

Steps S302 and S304 are processes for determining whether to allocate (i.e., employ) FDM. Steps S306 to S318 are processes for determining whether to allocate SDMA. Steps S310 and S312 are processes for determining whether to allocate SPC. Steps S314 and S316 are processes for determining whether to allocate DMA. Steps S318 and S320 are processes for determining whether to allocate RSMA. Steps S322 and S324 are processes for determining whether to allocate SCMA. The order of these determination processes is arbitrary. However, since there is a restriction on compatibility of FDM with existing schemes and a restriction on spatial resources of SDMA, it is desirable to determine allocation of the schemes earlier than others.

First, the process of determining whether to allocate FDM is performed as shown in FIG. 15. Specifically, in Step S302, the control unit 130 determines whether or not it is necessary to simultaneously execute communication with a legacy RAT using orthogonal resources. That is, the control unit 130 determines the necessity of compatibility with the legacy RAT. The legacy RAT is set to indicate, for example, OFDMA or SC-FDMA that is the existing 4G RAT. The control unit 130 may refer to capability information of each device for the determination. When communication is performed including the terminal device 300 which is only compatible with the legacy RAT, for example, the control unit 130 determines that it is necessary to simultaneously, execute communication with the legacy RAT (Yes in S302). In this case, FDM is not employed. In other words, the control unit 130 performs allocation to employ the legacy RAT. On the other hand, when communication is performed without including the terminal device 300 which is only compatible the legacy RAT, for example, the control unit 130 determines that it is not necessary to simultaneously execute communication with the legacy RAT (No in S302). In this case, the control unit 130 performs a process of determining employment of FDM in Step S304.

Next, the process of determining whether to allocate SDMA is performed. Specifically, in Step S306, the control unit 130 determines whether beam steering is effectively operated for a network or a terminal. When beam steering is determined to be effectively operated for a network or a terminal (Yes in S306), the control unit 130 performs a process of determining employment of SDMA in Step S308. On the other hand, when beam steering is determined not to be effectively operated for a network or a terminal (No in S306), the control unit 130 determines not to employ SDMA. In SDMA, signals can be transmitted and received from one transmission device to a plurality of reception devices using the same frequency and time. In this case, the transmission device desirably has a plurality of antennas, and transmits a signal to each of the reception devices from the different antennas or transmit respective signals combined using a precoding technology from the plurality of antennas. The signal transmitted as above is in a spatially orthogonal or quasi-orthogonal state, and the reception devices can separate, demodulate, and decode even a signal that has been multiplexed with the same frequency and time resources through spatial filtering, maximum likelihood detection, or a detection scheme equivalent thereto. In addition, in SDMA, signals can be transmitted and received from a plurality of transmission devices to one reception device using the same frequency and time. In this case, the reception device desirably has a plurality of antenna. The plurality of transmission devices transmits signals sharing at least some of frequency resources and time resources. In order to determine whether or not beam steering is effectively operated for a network or terminal, for example, it is desirable for the control unit 130 to discern, for example, an antenna mounting state of each communication device, and a radio propagation state between the base station 200 and respective terminal devices 300. The reason that discerning a radio propagation state is desirable is that, for example, when SDMA is attempted to be executed between two transmission devices and one reception device and radio propagation states between the different transmission devices and the reception device are similar to each, other (for example, when the correlation between channel response coefficients or transfer functions is high), it is difficult even for the reception device having the plurality of antennas to separate, demodulate, and decode signals transmitted from the plurality of transmission devices. The multiplexing method using SDMA can also be understood as multiplexing in a space area.

At the time of the determination with regard to SPC, IDMA, RSMA, and SCMA described above, it is desirable to determine the schemes based on spatial resources (beam) generated through the employment of SDMA. This is because SPC, IDMA, RSMA, and SCMA are basically non-orthogonal multiple access scheme-based technologies, and it is not necessary to perform multiplexing with respect to signals or communication devices that already have been assigned to different beams in the stage of SDMA using non-orthogonal resources. On the other hand, when there is a signal or a communication device that are not assigned even with SDMA (for example, there are a plurality of transmission devices or reception devices which have similar radio propagation states and a high correlation of channel response coefficients), the control unit 130 determines execution of multiplexing using non-orthogonal resources.

Next, the process of determining whether to allocate SPC is performed. Specifically, in Step S310, the control unit 130 determines whether there are communication devices having different level differences of path loss in the same transmission beam. When there are determined to be communication devices having different level differences of path loss in the same transmission beam (Yes in S310), the control unit 130 performs a process of determining employment of SPC in Step S312. On the other hand, when there is no communication device having different level differences of path loss in the same transmission beam (No in S310), the control unit 130 determines not to employ SPC. SPC is a scheme of multiplexing a plurality of signals in a power space on the same frequency, time, and space. During multiplexing, it is desirable to allocate electric power of different levels to the power of respective signals. Accordingly, the reception device can easily use SPC as a detection, demodulation, and decoding scheme. By employing the determination reference of whether or not there are communication devices having different level differences of path loss in radio propagation states, the control unit 130 can take a wide control range of quality of signals to be multiplexed considering both the level difference of the signals to be multiplexed and the level difference of path loss. The multiplexing method using SPC can also be understood as multiplexing in an electric power area.

Next, the process of determining whether to allocate IDMA is performed. Specifically, in Step S314, the control unit 130 determines whether or not there are still communication devices which have difficulty multiplexing in the same transmission beam. When it is determined that there are still communication devices which have difficulty multiplexing in the same transmission beam (Yes in S314), the control unit 130 performs a process of determining employment of IDMA in Step S316. On the other hand, when it is determined that there is no communication device having difficulty multiplexing in the same transmission beam (No in S314), the control unit 130 determines not to employ IDMA. IDMA is also a kind of non-orthogonal multiple access schemes, and basically uses error-correction codes and iterative (turbo) received signal processing. While a plurality of different signal and communication devices use at least some of the same frequency, time, space, and electric power, the transmission devices uses different interleave patterns of interleave to be applied to respective signals. Accordingly, the reception device can easily perform signal separation, demodulation, and decoding. This multiplexing method can also be understood as multiplexing in an interleave area or a bit area. Note that, in IDMA, different interleave patterns may be applied to communication devices or signals allocated to different, spatial resources.

Next, the process of determining whether to allocate RSMA is performed. Specifically, in Step S318, the control unit 130 determines whether or not there are still communication devices having difficulty multiplexing in the same transmission beam. When it is determined that there are still communication devices having difficulty multiplexing in the same transmission beam (Yes in Step S318), the control unit 130 performs a process of determining employment of RSMA in Step S320. On the other hand, when it is determined that there is no communication device having difficulty multiplexing in the same transmission beam (No, in S318), the control unit 130 determines not to employ RSMA. Although having a similar aspect to SPC, RSMA is a non-orthogonal multiple access scheme in which multiplexing is performed while adjusting a communication rate (coding rate, modulation scheme, or the like) so that signals of different communication devices can be received while they interfere with each other. By adjusting a coding rate or modulation scheme, the communication devices can control tolerance with respect to signal quality (for example, SINR, SNR, or the like).

Next, the process of determining whether to allocate SCMA is performed. Specifically, in Step S322, the control unit 130 determines whether or not there are still communication devices having difficulty multiplexing in the same transmission beam. When it is determined that there are still communication devices having difficulty multiplexing in the same transmission beam (Yes in Step S322), the control unit 130 performs a process of determining employment of SCMA in Step S324. On the other hand, when it is determined that there is no communication device having difficulty multiplexing in the same transmission beam (No in S322), the control unit 130 determines not to employ SCMA. Although being a similar scheme to CDMA, SCMA is a method in which sparse codes (signatures) including {0, 1} (in which the ratio of 1 is low) are used instead of spreading codes and multiplexing is performed by allocating signatures of different patterns to different signals. In addition to employing such signatures, in terms of a digital modulation scheme, signal processing such as a unitary transformation of modulation symbols of PSK and QAM, or modulation symbols with non-uniform inter-signal-point distances on a constellation (non-uniform constellation) may be applied. The reception device can separate signature-multiplexed signals using iterative signal processing or turbo signal processing such as a message transmission method (message passing algorithm).

In Steps S304, S308, S312, S316, S320, and S324 described above, allocation or non-allocation of each multiplexing scheme is specifically determined. A multiplexing scheme of an omitted step is set not to be allocated. With this structure of the flowchart, complexity of the determination process can be avoided.

Details of the processes of determining employment of the various multiplexing schemes in Steps S304, S308, S312, S316, S320, and S324 will be described below.

FDM Employment Determination Process

Figure 16:
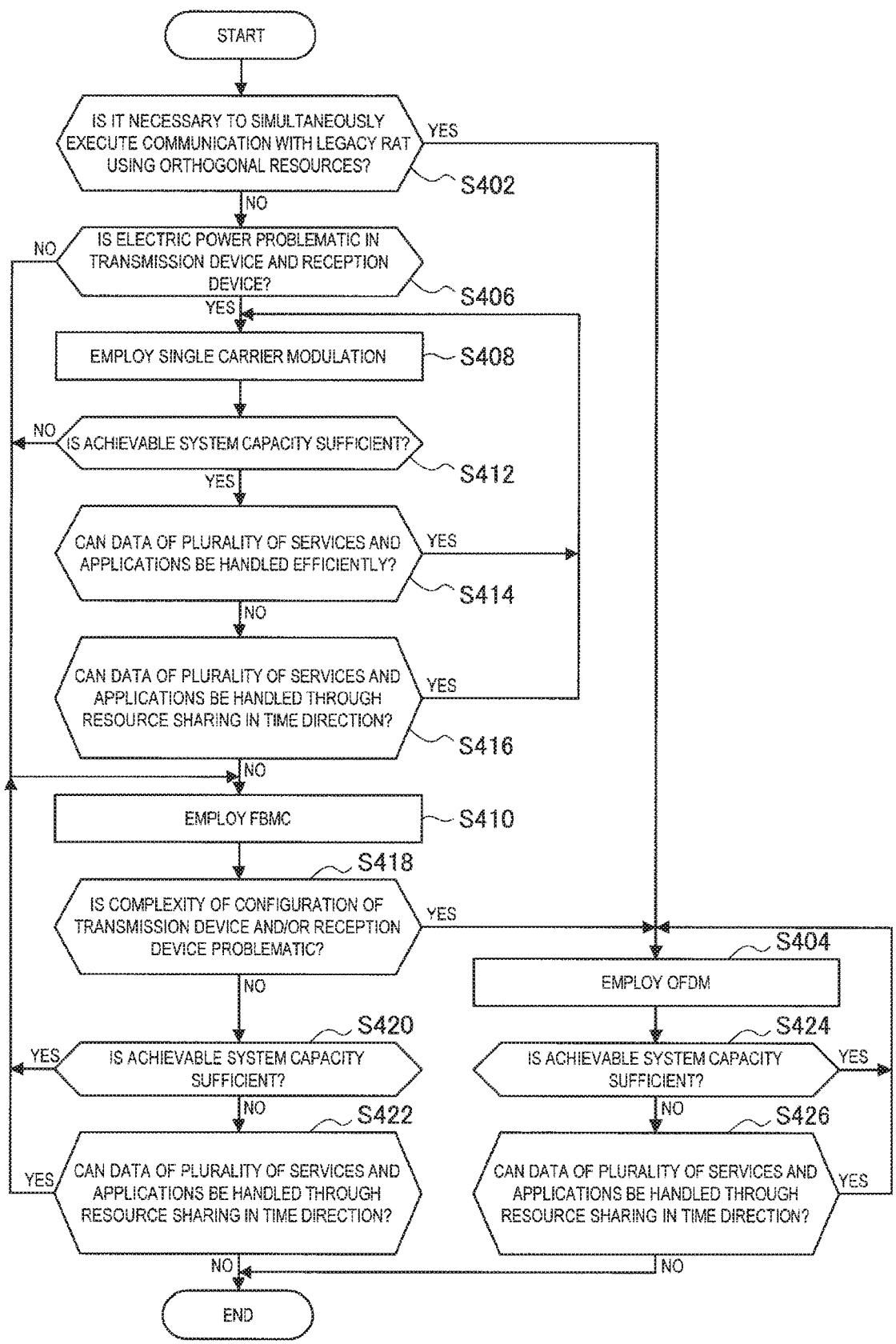
FIG. 16 is a flowchart showing an example of the flow of an FDM employment determination process executed in the communication control device according to the embodiment.

FIG. 16 is a flowchart showing an example of the flow of the FDM employment determination process executed in the communication control device 100 according to the present embodiment.

As shown in FIG. 16, the control unit 130 first determines whether or not it is necessary to simultaneously execute communication with the legacy RAT using orthogonal resources in Step S402. This determination is the same as that of Step S302 in FIG. 15.

When simultaneously executing communication with the legacy RAT using orthogonal resources is determined to be necessary (Yes in Step S402), the control unit 130 employs OFDM as a modulation scheme to be allocated in Step S404. Not employing FDM can be understood as being equivalent to employing OFDM.

When simultaneously executing communication with the legacy RAT using orthogonal resources is determined not to be necessary (No in Step S402), the control unit 130 determines whether or not electric power of a transmission device and reception device is problematic in Step S406. As a problem of electric power, for example, a peak-to-average power ratio (PAPR) is exemplified.

When electric power is determined to be problematic (Yes in S406), the control unit 130 employs single carrier modulation (for example, SC-FDMA) as a modulation scheme to be allocated in Step S408.

On the other hand, when electric power is determined not to be problematic (No in S406), the control unit 130 employs Filter Bank Multi-Carrier (FBMC) as a modulation scheme to be allocated in Step S410. Note that the meaning "not being problematic" includes a trivial problem.

As described above, the control unit 130 can employ multiplexing schemes (modulation schemes) to be allocated through Steps S404, and S408 or S410. The control unit 130 may end the process with the steps, or adopt the following flow (each step from Step S412). A different modulation scheme may be employed through the following flow. In addition, when the same modulation schemes are employed by executing Steps S404 and S408 or S410 again in the following flow, for example, the control unit 130 may execute a process of adjusting a parameter to be used in modulation, in addition to selection of the modulation schemes. In addition, when Steps S404 and S408 or S410 are executed a predetermined number of times, the control unit 130 may employ a modulation scheme selected the predetermined number of times, and end the process. In addition, when the process ends without selecting a scheme the predetermined number of times, the control unit 130 may determine not to employ PDM.

When single carrier modulation is employed, the control unit 130 determines whether or not an achievable system capacity is sufficient in Step S412. For example, the control unit 130 estimates a system capacity (a throughput, a user capacity, a user throughput, or the like) that can be achieved through single carrier modulation, and determines whether or not the result of the estimation reaches a target value.

When the achievable system capacity is determined not to be sufficient (No in S412), the control unit 130 employs FBMC as a modulation scheme to be allocated in Step S410. There is a possibility of FBMC having higher frequency use efficiency than single carrier modulation.

On the other hand, when the achievable system capacity is determined to be sufficient (Yes in S412), the control unit 130 determines in Step S414 whether or not data of a plurality of services and applications can be efficiently handled when single carrier modulation is employed.

When it is determined that the data can be efficiently handled (Yes in S414), the process returns to Step S408 again.

On the other hand, when it is determined that the data will not efficiently handled (No in 414), the control unit 130 determines in Step S416 whether or not the data of a plurality of services and applications can be handled through resource sharing in the time direction when single carrier modulation is employed.

When it is determined that the data can be handled with resource sharing in the time direction (Yes in Step S416), the process returns to Step S408 again.

On the other hand, when it is determined that the data will not be handled with resource sharing in the time direction (No in Step S416), the control unit 130 changes the modulation scheme to be employed to FBMC in Step S410.

When FBMC is employed, the control unit 130 determines in Step S418 whether or not complexity of the configuration of the transmission device and/or the reception device is problematic. This is because FBMC generally involves higher complexity of a configuration than others.

When it is determined that complexity is problematic (Yes in S418), the control unit 130 employs OFDM as a modulation scheme to be allocated in Step S404.

On the other hand, when it is determined that complexity is not problematic (No in S418), the control unit 130 determines in Step S420 whether or not an achievable system capacity using FBMC is sufficient.

When an achievable system capacity is determined to be sufficient (Yes in S420), the process returns to Step S410 again:

On the other hand, when an achievable system capacity is determined not to be sufficient (No in S420), the control unit 130 determines in Step S422 whether or not data of a plurality of services and applications can be handled through resource sharing in the time direction when FBMC is employed.

When it is determined that the data can be handled with resource sharing in the time direction (Yes in Step S422), the process returns to Step S410 again.

On the other hand, when it is determined that the data will not be handled through resource sharing in the time direction (No in S422), the process ends.

When OFDM is employed, the control unit 130 determines in Step S424 whether or not an achievable system capacity using OFDM is sufficient.

When an achievable system capacity is determined to be sufficient (Yes in S424), the process returns to Step S404 again.

On the other hand, when an achievable system capacity is determined not to be sufficient (No in S424), the control unit 130 determines in Step S426 whether or not data of a plurality of services and applications can be handled through resource sharing in the time direction when OFDM is employed.

When it is determined that the data can be handled with resource sharing in the time direction (Yes in Step S426), the process returns to Step S404 again.

On the other hand, when it is determined that the data will not be handled through resource sharing in the time direction (No in S426), the control unit 130 ends the process.

SDMA Employment Determination Process

Figure 17:
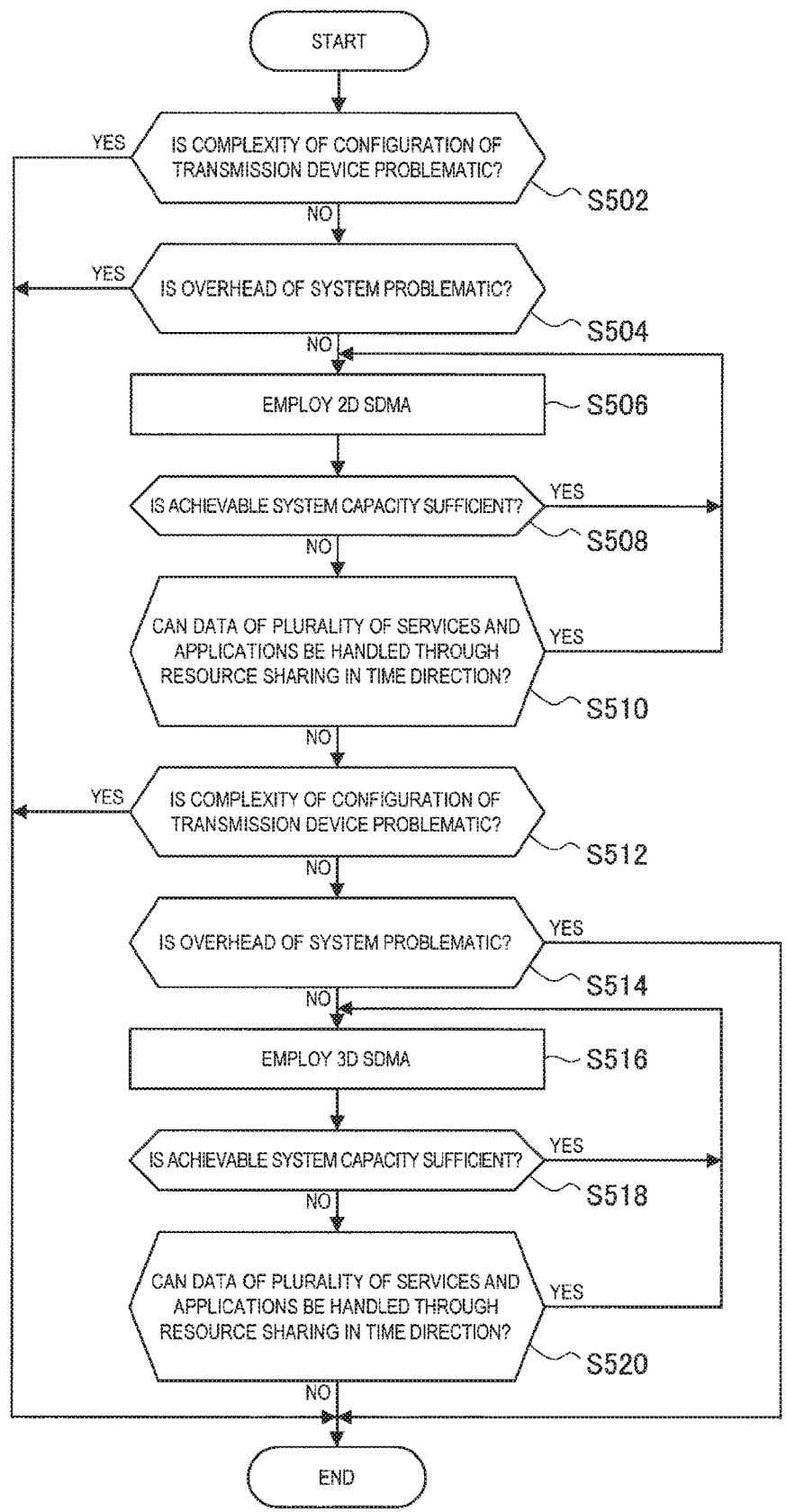
FIG. 17 is a flowchart showing an example of the flow of an SDMA employment determination process executed in the communication control device according to the embodiment.

FIG. 17 is a flowchart showing an example of the flow of the SDMA employment determination process executed in the communication control device 100 according to the present embodiment. In FIG. 17, the flowchart for examining whether to employ SDMA that uses a two-dimensional (2D) space or to employ SDMA that uses a three-dimensional (3D) space is shown. Note that Steps S502 to S510 are a process of determining whether or not SDMA that uses a 2D space is to be employed. In addition, Steps S512 to S520 are a process of determining whether or not SDMA that uses a 3D space is to be employed. Either of the determination processes may be omitted.

As shown in FIG. 17, the control unit 130 first determines in Step S502 whether or not complexity of the configuration of the transmission device is problematic when SDMA using a 2D space is employed.

When complexity is determined to be problematic (Yes in S502), the control unit 130 determines not to employ SDMA and the process ends.

On the other hand, when complexity is determined not to be problematic (No in S502), the control unit 130 determines in Step S504 whether or not overhead of the system is problematic when SDMA using the 2D space is employed.

When overhead is determined to be problematic (Yes in S504), the control unit 130 determines not to employ SDMA and the process ends.

On the other hand, when overhead is determined not to be problematic (No in S504), the control unit 130 determines to employ SDMA using the 2D space as a multiplexing scheme to be allocated.

Next, in Step S508, the control unit 130 determines an achievable system capacity is sufficient when SDMA using the 2D space is employed.

When an achievable system capacity is determined to be sufficient (Yes in S508), the process returns to Step S516 again.

When an achievable system capacity is determined not to be sufficient (No in S508), the control unit 130 determines in Step S510 whether or not data of a plurality of services and applications can be handled through resource sharing in the time direction when SDMA using a 2D space is employed.

When it is determined that the data can be handled with resource sharing in the time direction (Yes in Step S510), the process returns to Step S506 again.

On the other hand, when it is determined that the data will not be handled through resource sharing in the time direction (No in S510), the control unit 130 determines in Step S512 whether or not complexity of the configuration of the transmission device is problematic when SDMA using a 3D space is employed.

When complexity is determined to be problematic (Yes in S512), the process ends.

On the other hand, when complexity is determined not to be problematic (No in S512), the control unit 130 determines in Step S514 whether or not overhead of the system is problematic when SDMA using the 3D space is employed.

When overhead is determined to be problematic (Yes in S514), the process ends.

On the other hand, when overhead is determined not to be problematic (No in S514), the control unit 130 determines in Step S516 to employ SDMA using the 3D space as a multiplexing scheme to be allocated.

Next, in Step S518, the control unit 130 determines an achievable system capacity is sufficient when SDMA using the 3D space is employed.

When an achievable system capacity is determined to be sufficient (Yes in S518), the process returns to Step S506 again.

On the other hand, when an achievable system capacity is determined not to be sufficient (No in S518), the control unit 130 determines in Step S510 whether or not data of a plurality of services and applications can be handled through resource sharing in the time direction when SDMA using a 3D space is employed.

When it is determined that the data can be handled with resource sharing in the time direction (Yes in Step S520), the process returns to Step S516 again.

On the other hand, when it is determined that the data will not be handled through resource sharing in the time direction (No in S520), the process ends.

As described above, the control unit 130 can employ a multiplexing scheme to be allocated through Step S506 or S516. As the description above with respect to FIG. 16, when Step S506 or S516 is executed again and the same multiplexing scheme is employed, for example, the control unit 130 may execute a process of adjusting a parameter to be used for SDMA in addition to selection of 2D or 3D. In addition, when Step S506 or S516 is executed a predetermined number of times, the control unit 130 may employ a multiplexing scheme selected the predetermined number of times and end the process. In addition, when the process ends without the selection of the predetermined number of times, the control unit 130 may determine not to employ SDMA.

SPC Employment Determination Process

Figure 18:
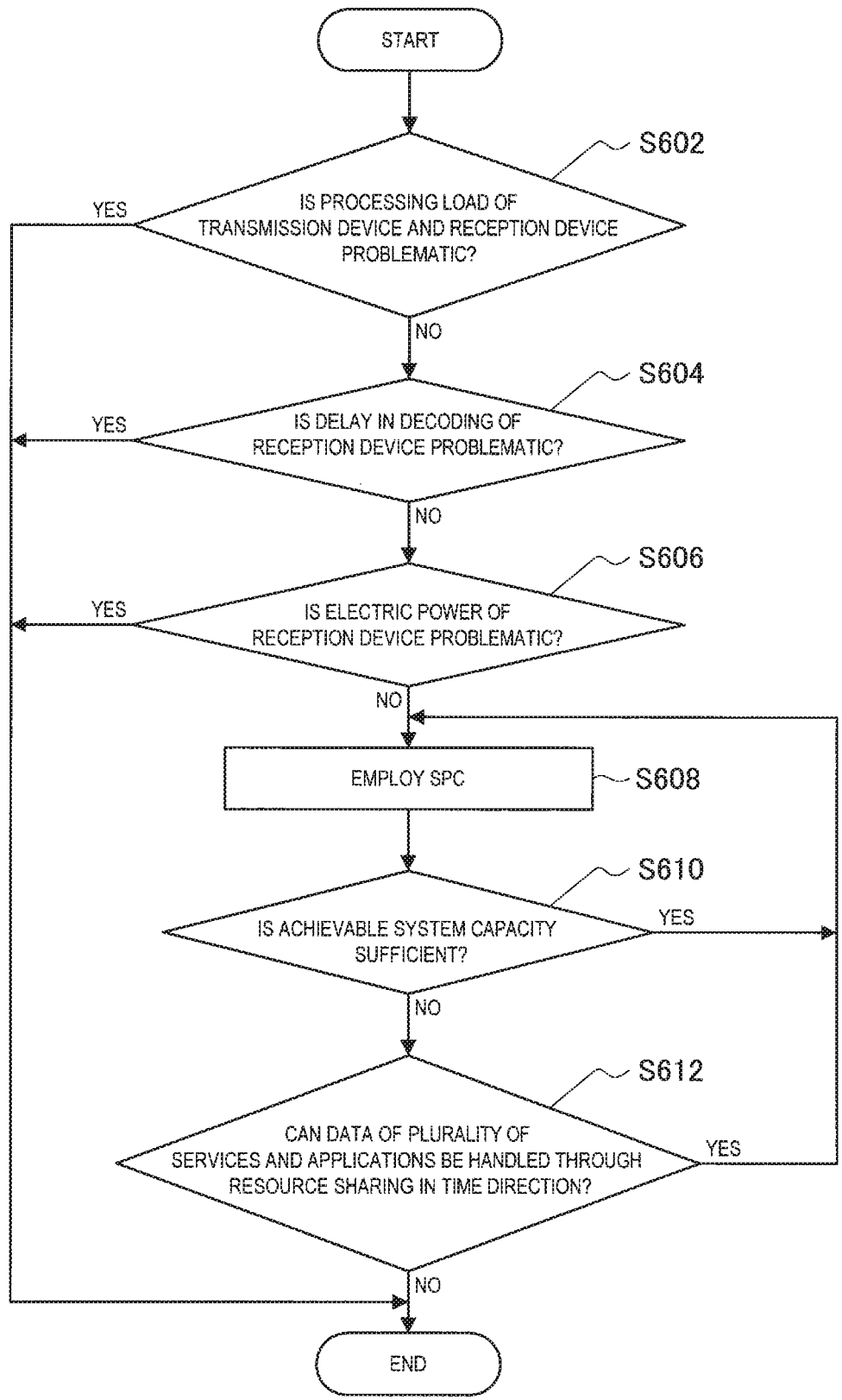
FIG. 18 is a flowchart showing an example of the flow of an SPC employment determination process executed in the communication control device according to the embodiment.

FIG. 18 is a flowchart showing an example of the flow of the SPC employment determination process executed in the communication control device 100 according to the present embodiment.

As shown in FIG. 18, the control unit 130 first determines in Step 602 whether or not a processing load of the transmission device and reception device is problematic when SPC is employed. The control unit 130 may determine whether or not complexity of the configuration of the transmission device and reception device is problematic, instead of or in parallel with a processing load.

When the processing load is determined to be problematic (Yes in S602), the control unit 130 determines not to employ SPC and the process ends.

On the other hand, when a processing load is determined not to be problematic (No in S602), the control unit 130 determines in Step S604 whether or not a delay in decoding of the reception device is problematic when SPC is employed. This is because, since it is desirable for the reception device side in a non-orthogonal multiplexing scheme such as SPC to overcome interference, which is caused by multiplexing performed using non-orthogonal resources, even through signal processing, there is a possibility of a longer delay than in an orthogonal multiplexing scheme occurring.

When the delay in decoding is determined to be problematic (Yes in S604), the control unit 130 determines not to employ SPC and the process ends.

On the other hand, when the delay in decoding is determined not to be problematic (No in S604), the control unit 130 determines in Step S606 whether or not electric power of the reception device is problematic. For example, the control unit 130 determines whether or not consumption power of the reception device is problematic.

When electric power is determined to be problematic (Yes in S606), the control unit 130 determines not to employ SPC and the process ends.

On the other hand, when electric power is determined not to be problematic (No in S606), the control unit 130 employs SPC as a multiplexing scheme to be allocated in Step S608.

Next, in Step S610, the control unit 130 determines an achievable system capacity is sufficient when SPC is employed.

When an achievable system capacity is determined to be sufficient (Yes in S610), the process returns to Step S608 again.

On the other hand, when an achievable system capacity is determined not to be sufficient (No in S610), the control unit 130 determines in Step S612 whether or not data of a plurality of services and applications can be handled through resource sharing in the time direction when SPC is employed.

When it is determined that the data can be handled with resource sharing in the time direction (Yes in Step S612), the process returns to Step S608 again.

On the other hand, when it is determined that the data will not be handled through resource sharing in the time direction (No in S612), the process ends.

As described above, the control unit 130 can employ a multiplexing scheme to be allocated through Step S608. When Step S608 is executed again as described above with respect to FIG. 16, for example, the control unit 130 may execute a process of adjusting a parameter to be used for SPC. In addition, when Step S608 is executed a predetermined number of times, the control unit 130 may employ SPC and end the process. In addition, when the process ends without selection of the predetermined number of times, the control unit 130 may determine not to employ SPC.

IDMA Employment Determination Process

Figure 19:
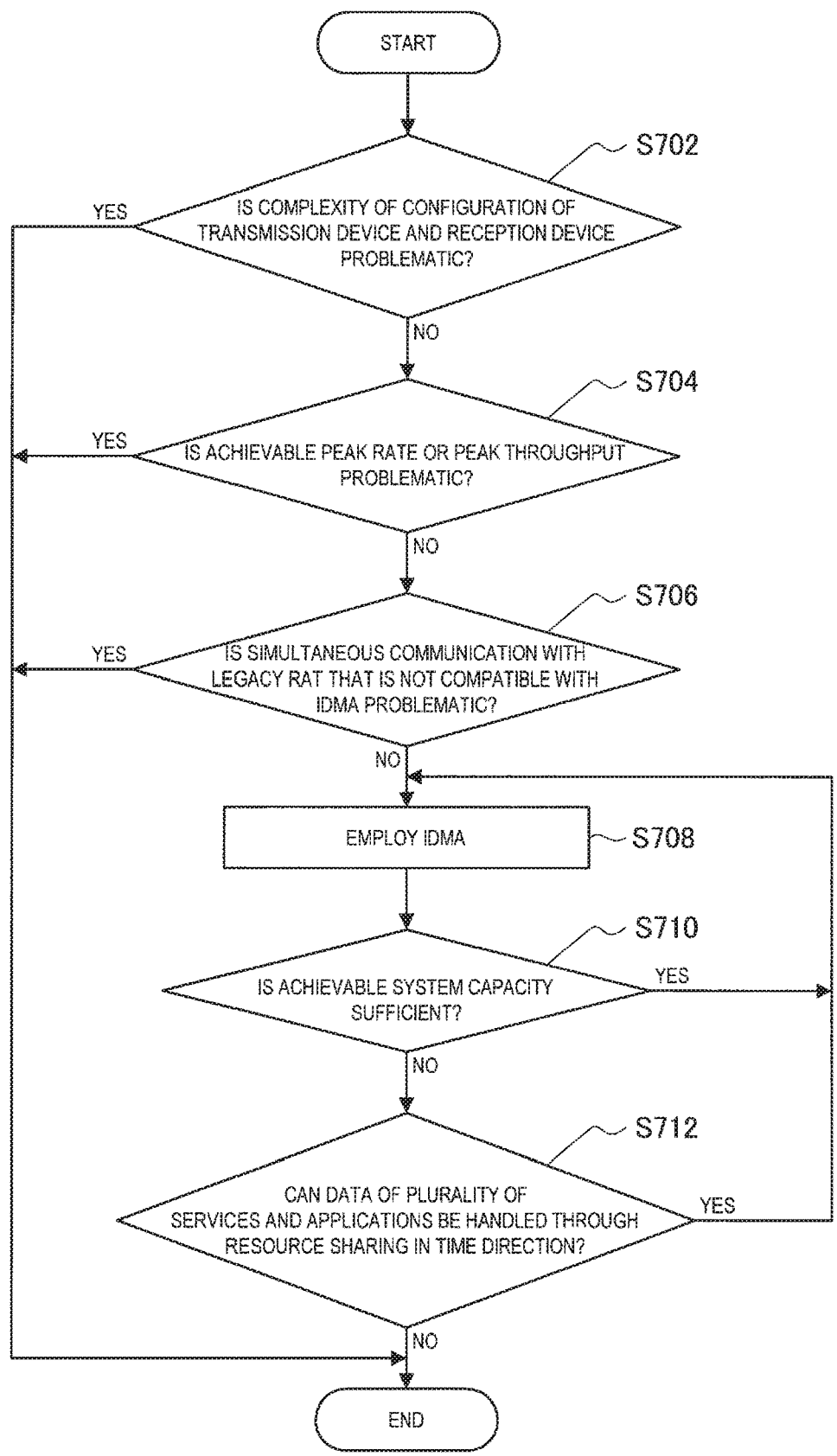
FIG. 19 is a flowchart showing an example of the flow of an DMA employment determination process executed in the communication control device according to the embodiment.

FIG. 19 is a flowchart showing an example of the flow of the IDMA employment determination process executed in the communication control device 100 according to the present embodiment.

The control unit 130 first determines in Step S702 whether or not complexity of the configurations of the transmission device and the reception device is problematic when IDMA is employed.

When complexity is determined to be problematic (Yes in S702), the control unit 130 determines not to employ IDMA and the process ends.

On the other hand, when complexity is determined not to be problematic (No in S702), the control unit 130 determines in Step S704 whether or not an achievable peak rate or peak throughput is problematic when IDMA is employed.

When an achievable peak rate or peak throughput is determined to be problematic (Yes in S704), the control unit 130 determines not to employ IDMA and ends the process.

On the other hand, when an achievable peak rate or peak throughput is determined not to be problematic (No in S704), the control unit 130 determines in Step S706 whether or not simultaneous communication with the legacy RAT that is not compatible with IDMA is problematic when IDMA is employed. Since adjustment of the level of electric power is generally not performed in IDMA as in SPC, interference caused by multiplexing of IDMA can be severer than in SPC. For this reason, there is a possibility of simultaneous multiplexing with a legacy device being difficult. Thus, when it is necessary to simultaneously communicate with a legacy device, it is desirable to avoid employing IDMA.

When simultaneous communication with the legacy RAT that is not compatible with IDMA is determined to be problematic (Yes in S706), the control unit 130 determines not to employ IDMA and the process ends.

On the other hand, when simultaneous communication with the legacy RAT that is not compatible with IDMA is determined not to be problematic (No in S706), the control unit 130 employs IDMA as a multiplexing scheme to be allocated in Step S708.

Next, in Step S710, the control unit 130 determines an achievable system capacity is sufficient when IDMA is employed.

When an achievable system capacity is determined to be sufficient (Yes in S710), the process returns to Step S708 again.

On the other hand, when an achievable system capacity is determined not to be sufficient (No in S710), the control unit 130 determines in Step S712 whether or not data of a plurality of services and applications can be handled through resource sharing in the time direction when IDMA is employed.

When it is determined that the data can be handled with resource sharing in the time direction (Yes in Step S712), the process returns to Step S708 again.

On the other hand, when it is determined that the data will not be handled through resource sharing in the time direction (No in S712), the process ends.

As described above, the control unit 130 can employ a multiplexing scheme to be allocated through Step S708. When Step S708 is executed again as described above with respect to FIG. 16, for example, the control unit 130 may execute a process of adjusting a parameter to be used for IDMA. In addition, when Step S708 is executed a predetermined number of times, the control unit 130 may employ IDMA and end the process. In addition, when the process ends without selection of the predetermined number of times, the control unit 130 may determine not to employ IDMA.

RSMA Employment Determination Process

Figure 20:
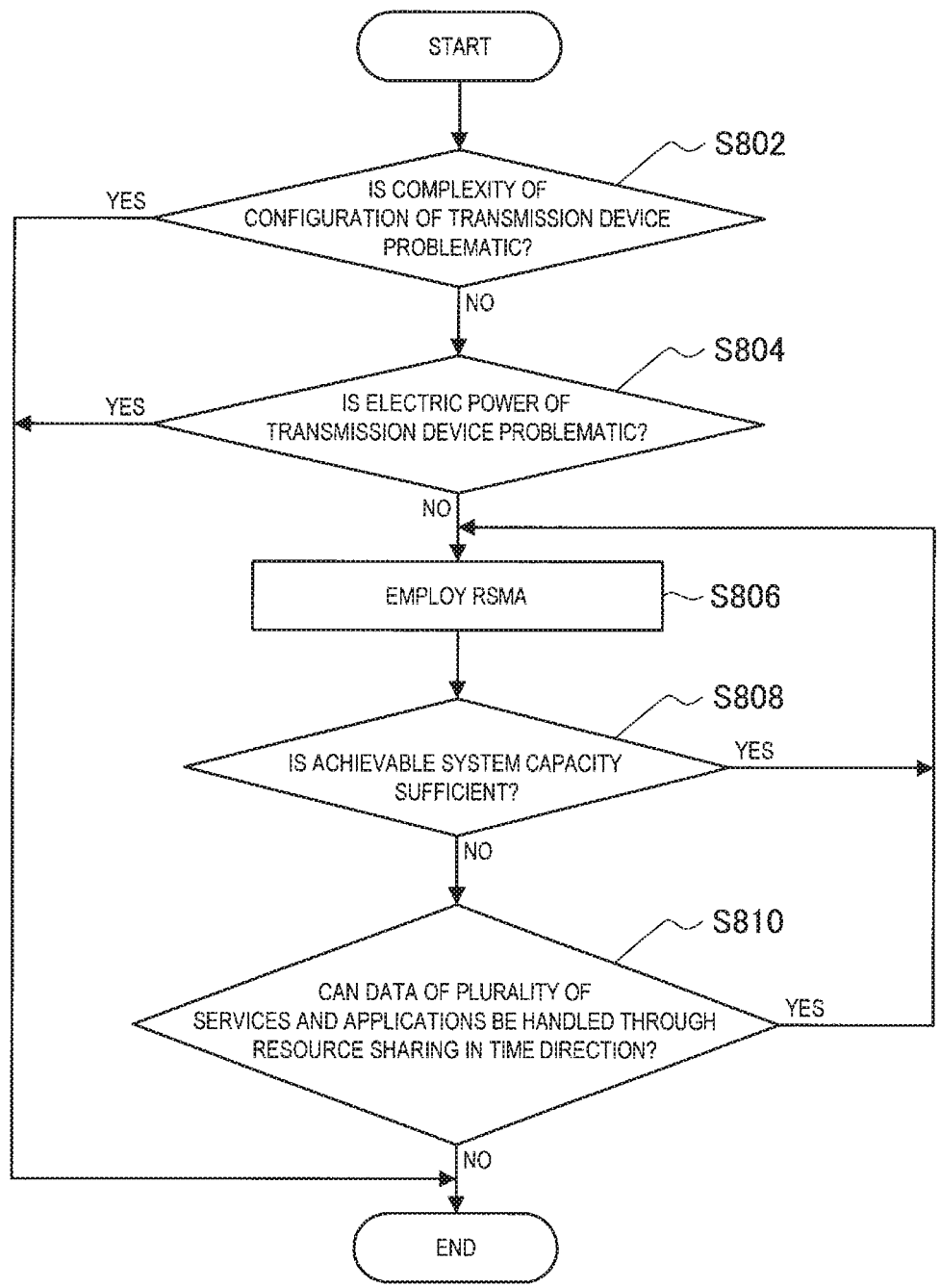
FIG. 20 is a flowchart showing an example of the flow of an RSMA employment determination process executed in the communication control device according to the embodiment.

FIG. 20 is a flowchart showing an example of the flow of the RSMA employment determination process executed in the communication control device 100 according to the present embodiment.

As shown in FIG. 20, the control unit 130 first determines in Step S802 whether or not complexity of the configuration of the transmission device is problematic.

When complexity is determined to be problematic (Yes in S802), the control unit 130 determines not to employ RSMA and the process ends.

On the other hand, when complexity is determined not to be problematic (No in S802), the control unit 130 determines in Step S804 whether or not electric power of the transmission device is problematic when RSMA is employed.

When electric power is determined to be problematic (Yes in S804), the control unit 130 determines not to employ RSMA and the process ends.

On the other hand, when electric power is determined not to be problematic (No in S804), the control unit 130 employs RSMA as a multiplexing scheme to be allocated in Step S806.

Next, in Step S808, the control unit 130 determines an achievable system capacity is sufficient when RSMA is employed.

When an achievable system capacity is determined to be sufficient (Yes in S808), the process returns to Step S806 again.

On the other hand, when an achievable system capacity is determined not to be sufficient (No in S808), the control unit 130 determines in Step S810 whether or not data of a plurality of services and applications can be handled through resource sharing in the time direction when RSMA is employed.

When it is determined that the data can be handled with resource sharing in the time direction (Yes in Step S810), the process returns to Step S806 again.

On the other hand, when it is determined that the data will not be handled through resource sharing in the time direction (No in S810), the process ends.

As described above, the control unit 130 can employ a multiplexing scheme to be allocated through Step S806. When Step S806 is executed again as described above with respect to FIG. 16, for example, the control unit 130 may execute a process of adjusting a parameter to be used for RSMA. In addition, when Step S806 is executed a predetermined number of times, the control unit 130 may employ RSMA and end the process. In addition, when the process ends without selection of the predetermined number of times, the control unit 130 may determine not to employ RSMA.

SCMA Employment Determination Process

Figure 21:
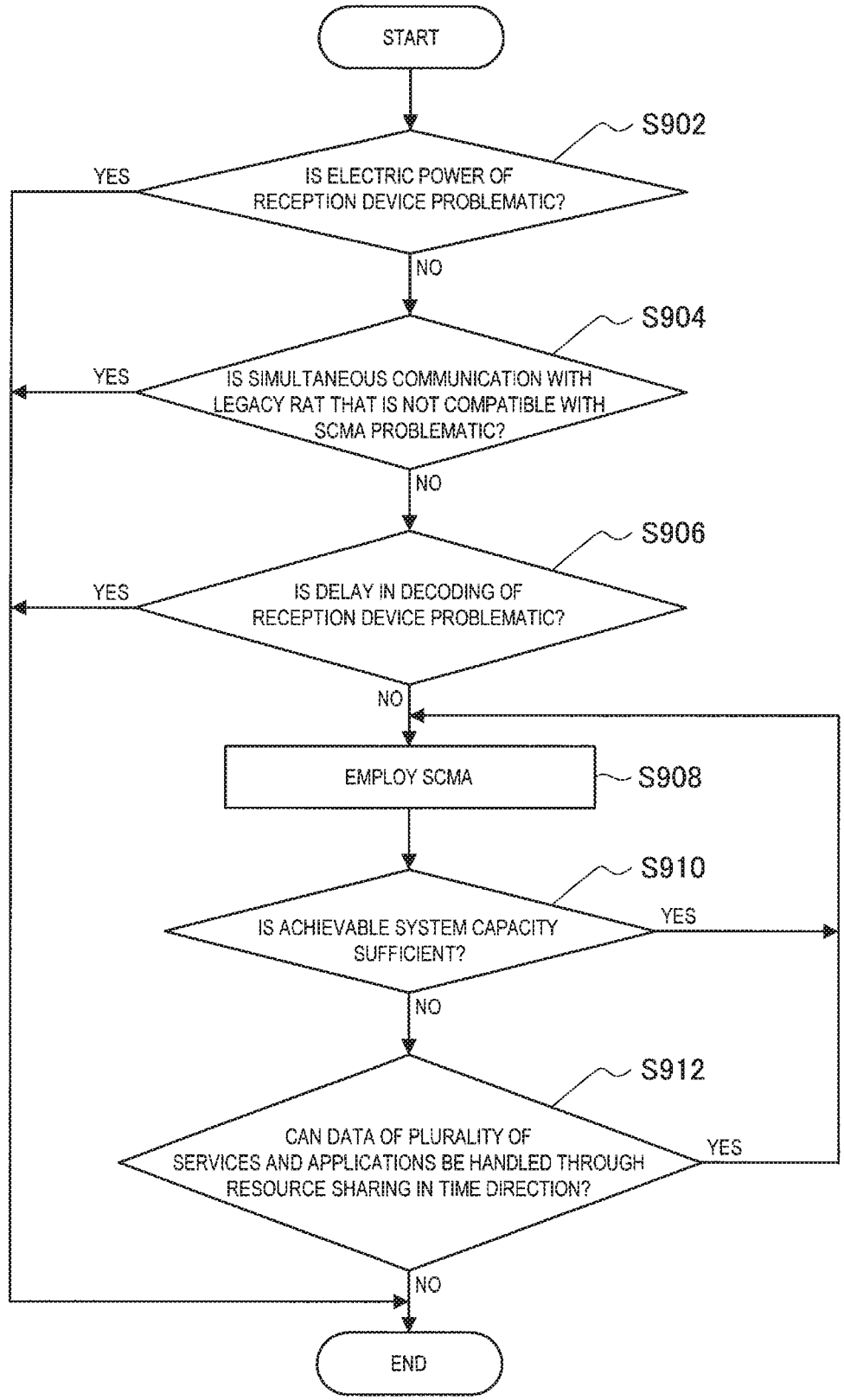
FIG. 21 is a flowchart showing an example of the flow of an SCMA employment determination process executed in the communication control device according to the embodiment.

FIG. 21 is a flowchart showing an example of the flow of the SCMA employment determination process executed in the communication control device 100 according to the present embodiment.

First, in Step S902, the control unit 130 determines whether or not the electric power of the reception device is problematic when SCMA is employed.

When electric power is determined to be problematic (Yes in S902), the control unit 130 determines not to employ SCMA and the process ends.

On the other hand, when electric power is determined not to be problematic (No in S902), the control unit 130 determines in Step S904 whether or not simultaneous communication with the legacy RAT that is not compatible with SCMA is problematic.

When simultaneous communication with the legacy RAT that is not compatible with IDMA is determined to be problematic (Yes in S904), the control unit 130 determines not to employ SCMA and the process ends.

On the other hand, when simultaneous communication with the legacy RAT that is not compatible with SCMA is determined not to be problematic (No in S904), the control unit 130 determines in Step S906 whether or not a delay in decoding of the reception device is problematic.

When the delay in decoding is determined to be problematic (Yes in S906), the control unit 130 determines not to employ SCMA and the process ends.

On the other hand, when a delay in decoding is determined not to be problematic (No in S906), the control unit 130 employs SCMA as a multiplexing scheme to be allocated in Step S908. The control unit 130 may select a digital modulation scheme to be employed in addition to the employment of SCMA. For example, the control unit 130 may determine whether to employ a modulation scheme that has employed non-uniform signal point disposition (Non-Uniform Constellation) or Unbalance Modulation (UBM) for QPSK, 16QAM, 64QAM, 256QAM, and the like. For example, the control unit 130 may employ NUC when SCMA is employed, or employ Uniform Constellation (UC) when SCMA s not employed.

Next, in Step S910, the control unit 130 determines an achievable system capacity is sufficient when SCMA is employed.

When an achievable system capacity is determined to be sufficient (Yes in S910), the process returns to Step S908 again.

On the other hand, when an achievable system capacity is determined not to be sufficient (No in S910), the control unit 130 determines in Step S912 whether or not data of a plurality of services and applications can be handled through resource sharing in the time direction when SCMA is employed.

When it is determined that the data can be handled with resource sharing in the time direction (Yes in Step S912), the process returns to Step S908 again.

On the other hand, when it is determined that the data will not be handled through resource sharing in the time direction (No in S912), the process ends.

As described above, the control unit 130 can employ a multiplexing scheme to be allocated through Step S908. When Step S908 is executed again as described above with respect to FIG. 16, for example, the control unit 130 may execute a process of adjusting a parameter to be used for SCMA. In addition, when Step S908 is executed a predetermined number of times, the control unit 130 may employ SCMA and end the process. In addition, when the process ends without selection of the predetermined number of times, the control unit 130 may determine not to employ SCMA.

3.3.2. Regarding a Base Station and a Terminal Device

Signal Processing on a Transmission Device Side

Signal processing on a transmission device side according to an access setting allocated by the communication control device 100 will be described below. Herein processing when IDMA, SPC, SCMA, SDMA (or SDM), and OFDMA (or SC-FDMA) are allocated will be described as an example. Note that, when there is an access scheme not allocated by the communication control device 100, processing relating to an access scheme not allocated in the processing described below may be skipped. The expression of a vector included in the following description is set to indicate a column vector unless specified otherwise. In addition, description will be provided focusing on signals of a user k unless particularly specified.

In addition, the base station 200 will be described below as a station functioning as a transmission device on the assumption of downlink communication. In uplink, the terminal device 300 functions as a transmission device, and thus performs the same process as described below.

(A) Decision of a Data Size

First, the control unit 240 decides the data size of data that the user k transmits. The body of the data size is equivalent to a packet data size, a frame data size or a transport block size (TBS). This size is desirably decided based on the amount of orthogonal and non-orthogonal resources allocated to the user k, a modulation scheme, a coding rate, or the like. A data size $N_{Bit,TBS,k}$ is computed using, for example, the following Expression 1.

[Math. 1]

$$\overline{N}_{Bit,TBS,k} = \text{floor}\left(\sum_{i \in I_k}\sum_{p \in P_k}\sum_{c \in C_k}\sum_{s \in S_k}\sum_{r \in R_k} N_{RE,i,p,c,s,r} Q_{RE,i,p,c,s,r}\right) \quad \text{Expression 1}$$

Here, $I_k$ indicates an interleaver index group allocated to the user k. $P_k$ indicates an SPC/electric power level layer index group allocated to the user k. $C_k$ indicates a code resource index group of SCMA allocated to the user k. $S_k$ indicates a spatial resource index group allocated to the user k. $R_k$ indicates a resource block index group allocated to the user k. $N_{RE,i,p,c,s,r}$ indicates the number of resource elements per interleaver i, electric power layer p, code c, space s, and resource block r. $Q_{RE,i,p,c,s,r}$ indicates bit efficiency per resource element (roughly, multiplication of the number of bits and a code rate per modulation symbol). In addition, floor(x) in Expression 1 is a function for computing a maximum integer that is equal to or lower than a value x.

As another example, the same modulation scheme and coding rate can also be used between allocated resources.

With this setting, an amount of access setting information can be reduced. In such a case, a data size is calculated using the following Expression 2.

[Math. 2]

$$\overline{N}_{Bit,TBS,k} = \text{floor}\left(Q_{RE}\sum_{i\in I_k}\sum_{p\in P_k}\sum_{c\in C_k}\sum_{s\in S_k}\sum_{r\in R_k} N_{RE,i,p,c,s,r}\right) \quad \text{Expression 2}$$

Further, a data size candidate table may be shared between communication devices.

In such a case, notification of a data size between transmission and reception devices is further simplified, and thus low overhead is achieved. In that case, the final data size is calculated using the following Expression 3.

[Math.3]

$$N_{Bit,TS,k} = \max\{N_{Bit,TBS,cand,m} | \overline{N}_{Bit,TBS,k} \le N_{Bit,TBS,cand,m}\} \quad \text{Expression 3}$$

Here, cand indicates the number of data size candidates. $N_{Bit,TBS,cand,m}$ indicates an m-th data size candidate.

Note that, when the data size candidate table is not shared, the final data size may be calculated using the following Expression 4.

[Math.4]

$$N_{Bit,TBS,k} = \overline{N}_{Bit,TBS,k} \quad \text{Expression 4}$$

Note that the processes described above can be performed by the resource mapper 410 and the serial-parallel conversion processing unit 412 shown in FIG. 11.

(B) Error Correction Code

The control unit 240 controls the radio communication unit 210 to perform error correction using an error correction encoder. A vector including a transmission bit $b_{n,k}$ (n=0, ..., $N_{Bit,TBS,k}-1$) is set to $b_k$. The radio communication unit 210 may encode the transmission series in a mass or in units of radio resources. Note that the configuration example illustrated in FIG. 11 corresponds to the latter configuration.

A coded bit vector $b'_k$ including coding bit $b'_{m,k}$ (m=0, ..., $N_{CodeBit,k}-1$) when the series is coded in a mass is expressed with the following Expression 5.

[Math.5]

$$b'_k = FEC(b_k, M, k) \quad \text{Expression 5}$$

Here, FEC(x) is a function indicating coding, and M indicates a coding rate. As shown in Expression 5 above, error correction coding depends on the user k or may be variable.

As another example, coding per succeeding interleaver is considered. First, it is desirable to sort transmission bits to interleaver resources. For this sorting, for example, a parser, serial-to-parallel conversion, or the like can be used. As an example of a sorting rule to an i-th interleaver, the following Expression 6 is considered.

[Math. 6]

$$b_{n',i',k} = b_{n,k},$$
$$i' = n \bmod N_{I,k},$$
$$n' = \text{floor}(n/N_{I,k}),$$
$$n' = 0, \ldots, \frac{N_{Bit,TBS,k}}{N_{I,k}} - 1 \quad \text{Expression 6}$$

Here, i'=0, ..., $N_{I,k}-1$. $N_{I,k}$ indicates the number of interleavers allocated to the user k.

Attention should be paid to the index i of interleavers for the entire radio communication unit 210 and the index i' for the number of interleavers of the user k because they have different meanings. Attention should also be paid to the relation of indexes of other resources below.

When $N_{Bit,TBS,k}$ is a number that is indivisible by $N_{I,k}$, the radio communication unit 210 may embed a dummy bit, a padding bit, a filler bit, or the like for number-crunching. For example, the radio communication unit 210 may set $b_{n',i',k}$ as a dummy bit for n'=$N_{Bit,TBS,k}/N_{I,k}-1$ of i'=($N_{Bit,TBS,k}$ mod $N_{I,k}$), ..., $N_{I,k}-1$. The radio communication unit 210 executes error correction coding for each sorted transmission bit after the sorting. The vector of a coded bit $b'_{m,i',k}$ (m=0, ..., $N_{CodedBit,i'k}-1$) is expressed with, for example, the following Expression 7.

[Math.7]

$$b'_{i',k} = FEC(b_{i',k}, i, M_i, k) \quad \text{Expression 7}$$

As shown in Expression 7 above, a coded rate may be a variable coded rate $M_i$ according to i.

Note that the above processes can be performed by the FEC encoding processing units 420 shown in FIG. 11.

(C) Interleave

The radio communication unit 210 interleaves the coded rate after the error correction coding. As shown in Expression 5 above, when error correction coding is performed in a mass, the radio communication unit 210 sorts coded bits to each interleaver. As an example of a sorting rule to an i'-th interleaver, the following Expression 8 is considered.

[Math. 8]

$$b'_{n',i',k} = b'_{n,k},$$
$$i' = n \bmod N_{I,k},$$
$$n' = \text{floor}(n/N_{I,k}),$$
$$n' = 0, \ldots, \frac{N_{CodeBit,k}}{N_{I,k}} - 1 \quad \text{Expression 8}$$

When $N_{CodedBit,k}$ is a number that is indivisible by $N_{I,k}$, the radio communication unit 210 may embed a dummy bit, a padding bit, a filler bit, or the like for number-crunching. For example, the radio communication unit 210 may set $b'_{n',i',k}$ as a dummy bit for n'=$N_{CodedeBit,k}/N_{I,k}-1$ of i=($N_{CodedBit,k}$ mod $N_{I,k}$), ..., $N_{I,k}-1$. In addition, the radio communication unit 210 may further insert a dummy bit, considering a digital modulation scheme of the later stage. For example, when $N_{CodedBit,i',k}$ is not an integral multiple of the number of bits $M_B$ per symbol of a modulation scheme of the later stage, the radio communication unit 210 may insert a dummy bit into the shortfall so that it becomes an integral multiple.

Then, the radio communication unit 210 executes interleave with respect to each coded bit series. When an interleave pattern of an interleaver i allocated to the user k is set to $p_i(x)$ and an i'-th series of the user k is set to correspond to the interleaver i, the vector $b''_{i',k}$ of the bit series after the interleave is expressed with the following Expression 9.

[Math.9]

$$b''_{i',k} = \pi_i(b'_{i',k}) \quad \text{Expression 9}$$

Note that the length of the bit series after the interleave may be the same as that before the interleave.

Note that the processes described above can be performed by the interleaver 430 and the serial-parallel conversion processing unit 432 shown in FIG. 11.

(D) Digital Modulation

The radio communication unit 210 maps the bit series to a modulation symbol that is a complex number after interleave. The bit series is mapped to a complex symbol for each $M_B$ according to a modulation scheme. Here, $M_B$ is the number of bits per complex symbol. For example, $M_B=2$ in QPSK, $M_B=4$ in 16QAM, and $M_B=6$ in 64QAM. The type of modulation scheme used by the radio communication unit 210 is controlled by the control unit 240. Note that, when the terminal device 300 is a transmission device, it can be controlled by the base station 200.

When a modulation scheme of UC is used, a vector $s_{i',k}$ of a complex symbol $S_{m,i',k}$ after modulation (m=0, . . . , $N_{symbol,i',k}-1$) is expressed with the following Expression 10.

[Math.10]

$$s_{i',k} = \text{Mapper}_{UC}(b'_{i',k}, M_{B,i'}) \quad \text{Expression 10}$$

On the other hand, when a modulation scheme of NUC is used, the vector $s_{i',k}$ of the complex symbol after modulation is expressed with the following Expression 11.

[Math.11]

$$s_{i',k} = \text{Mapper}_{NUC}(b''_{i',k}, M_{B,i'}) \quad \text{Expression 11}$$

A modulation scheme (the value of $M_B$ and whether UC or NUC is used) may be variable or different with respect to the index i. In addition, average electric power of the complex symbol after modulation is set to be normalized to 1.

Note that the processes described above can be performed by the modulation processing units 440 shown in FIG. 11.

(E) Symbol Spreading

The radio communication unit 210 executes a spreading process after mapping to a complex symbol. A spreading code series c (spreading rate $SF_c$) is set to be allocated to the interleaver resource index i. When the series is set to $x_{c,l}$ (l=0, . . . , $SF_c-1$), a complex symbol series $s'_{l',i',k}$ of a symbol $S_{m,i',k}$ (l'-0, . . . , $N_{Symbol,i',k}SF_c-1$) is expressed with the following Expression 12.

[Math.12]

$$s'_{l',i',k} = s_{\text{floor}(l'/SF_c),i',k} \times c_{l' \bmod sf_c} \quad \text{Expression 12}$$

In addition, this spreading process is expressed by vectors with the following Expression 13.

[Math. 13]

$$s'_{i',k} = X_c s_{i',k}, \quad \text{Expression 13}$$

$$X_c = \begin{bmatrix} x_c & 0_{SF\times 1} & \cdots & 0_{SF\times 1} \\ 0_{SF\times 1} & x_c & 0_{SF\times 1} & \vdots \\ \vdots & 0_{SF\times 1} & \ddots & 0_{SF\times 1} \\ 0 & \cdots & 0_{SF\times 1} & x_c \end{bmatrix}_{(SF\times N_{Symbol,i',k})\times(N_{Symbol,i',k})}$$

Here, $O_{SC'1}$ means a zero vector of a length SF.

If spreading is skipped, the radio communication unit 210 may set $SF_c=1$ and $x_{c,o}=1$. The spreading series used here may take an arbitrary value; however, it is desirable to meet three conditions that zero may be included, the absolute value is 1 when it is not a zero, and the value is +1 or −1 when it is an integer.

Note that the process described above can be performed by the spreading processing units 442 shown in FIG. 11.

(F) Multiplexing and Allocation of Electric Power Using SPC

The radio communication unit 210 executes multiplexing using SPC after spreading. With the processes described above, $N_{I,k}$ complex series are generated. The radio communication unit 210 sorts this complex series to the number of power resource indexes $N_{P,k}$ allocated to the user k again. As a rule of this sorting, for example the following Expression 14 is considered.

[Math. 14]

$$s''_{o',p',k} = s'_{l',i',k}, \quad \text{Expression 14}$$
$$o' = \text{floor}\{(l'N_{I,k} + i')/N_{P,k}\},$$
$$p' = (l'N_{I,k} + i') \bmod N_{P,k},$$
$$o' = 0, \ldots, \frac{\sum_{i'=0}^{N_{I,k}} N_{Symbol,i',k}}{N_{P,k}} - 1,$$
$$p' = 0, \ldots, N_{P,k} - 1$$

After the sorting, the radio communication unit 210 sorts an electric power level $A_p$ corresponding to the p'-th electric power resources to each series $s''_{p',k}$. In this case, each series is expressed as the following expression.

[Math.15]

$$s''_{p',k} = \sqrt{A_p} s''_{p',k} \quad \text{Expression 15}$$

Here, the value of the allocated electric power level $A_p$ is desirably different due to p. After electric power is allocated, the radio communication unit 210 may perform multiplexing (addition) using SPC with respect to a signal of the same user k. In this case, the complex vector $v_k$ after multiplexing is expressed with the following expression.

[Math. 16]

$$v_k = \sum_{p'=0}^{N_{P,k}-1} s''_{p',k} \quad \text{Expression 16}$$

Note, that the processes described above can be performed by the serial-parallel conversion processing unit 450 and the SPC processing units 452 shown in FIG. 12.

(G) SDMA

The radio communication unit 210 executes multiplexing in the orthogonal frequency and space directions for OFDMA and SDMA after multiplexing and allocation of electric power are executed using SPC. As a mechanism of the radio communication unit 210 for assigning a complex symbol in the frequency and space directions, a method of assigning a complex symbol in the order of the frequency direction as the first and the space direction as the second, and a method of assigning a complex symbol in the order of the space direction as the first and the frequency direction as the second are considered.

In the method of assigning a complex symbol in the order of the frequency direction as the first and the space direction as the second, the radio communication unit 210 assigns a complex symbol in the frequency direction first. When $N_{R,k}$ resource blocks are assigned to the user k, the complex symbol $u_{q,r',k}$ of the r'-th resource block is expressed with the following expression.

[Math.17]

$$u_{q,r',k} = v_{o',k},$$

$$q = \text{floor}(o'/N_{R,ki}).$$

$$r' = o' \bmod N_{R,k} \quad \text{Expression 17}$$

Next, the radio communication unit 210 further sorts the series assigned to each resource block in the space direction. The sorted series $u'_{q',s',r',k}$ is expressed with the following expression.

[Math.18]

$$u'_{q',s',r',k} = u_{q,r',k},$$

$$q' = \text{floor}(q/N_{s,k}),$$

$$s' = q \bmod N_{s,k} \quad \text{Expression 18}$$

On the other hand, in the method of assigning a complex symbol in the order of the space direction as the first and the frequency direction as the second, the radio communication unit 210 assigns an SPC multiplexed signal in the space direction first. When $N_{s,k}$ resource blocks are assigned to the user k, the complex symbol $u_{q,s',k}$ of the s'-th space resources is expressed with the following expression.

[Math.19]

$$u_{q,s',k} = v_{o',k},$$

$$q = \text{floor}(o'/N_{s,k}).$$

$$s' = o' \bmod N_{s,k} \quad \text{Expression 19}$$

Next, the radio communication unit 210 further sorts the series assigned to each space resource in the space direction. The sorted series $u'_{q',s',r',k}$ is expressed with the following expression.

[Math.20]

$$u'_{q',s',r',k} = u_{q,s',k},$$

$$q' = \text{floor}(q/N_{R,k}),$$

$$r' = q \bmod N_{R,k}. \quad \text{Expression 20}$$

The mechanism of the radio communication unit 210 for assigning a complex symbol in the frequency and space directions has been described above.

Further, the radio communication unit 210 assigns a series $u'_{q',s',r',k}$ to a subcarrier f for each resource block

[Math.21]

$$u''_{q',s',r',f',k} = u'_{q',s',r',k},$$

$$q'' = \text{floor}(q'/N_{F,k}),$$

$$f' = q' \bmod N_{F,k} \quad \text{Expression 21}$$

Here, $N_{F,k}$ is the number of subcarriers per resource block.

Then, the radio communication unit 210 executes precoding for SDMA with respect to the complex symbol allocated to the space resources. The space symbol vector $y_{q'',r',f',k}$ after precoding is expressed with the following expression.

[Math.22]

$$q_{q',r',f',k} = W_{r',f',k} u''_{q',r',f',k} \quad \text{Expression 22}$$

$W_{r',f',k}$ represents a precoder matrix allocated to the user k. The size of $W_{r',f',k}$ is $N_{TX} \cdot N_{s,k}$, and $N_{TX}$ represents the number of transmission antennas. $u''_{q'',r',f',k}$ represents the vector of a precoded symbol $u''_{q'',s',r',f',k}(s'=0, \ldots, N_{s,k}-1)$.

The radio communication unit 210 may multiplex (add) symbols of users to be simultaneously transmitted and received after precoding. In this case, if the number of users to be multiplexed is set to K, a signal after the multiplexing, is expressed with the following expression.

[Math. 23]

$$y'_{q',r',f'} = \sum_{k=0}^{K-1} y_{q',r',f',k} \quad \text{Expression 23}$$

If the radio communication unit 210 does not perform multiplexing expressed in the Expression 23, it is desirable that transmission signals be assigned to different antenna ports with respect to the user index k.

Note that the processes described above can be performed by the SDM processing unit 470 shown in FIG. 12.

(H) Reference Signal

The radio communication unit 210 stores reference signals (RSs) in transmission signals. An RS is used in channel estimation or the like on a reception device side. It is desirable to dispose RSs in a predetermined subcarrier within a band, and a predetermined symbol within a subframe when OFDMA is employed.

(1) OFDMA

The radio communication unit 210 executes an inverse discrete Fourier transform (IDFT) or an inverse fast Fourier transform (IFFT) for OFDMA. After the transform, the radio communication unit 210 transmits signals from each antenna, by adding cyclic prefixes (CPs) or guard intervals (GIs) thereto, if necessary.

Note that the processes described above can be performed by the FDM processing units 480 shown in FIG. 12.

Signal Processing on a Reception Device Side

Signal processing on a reception device side according to an access setting allocated by the communication control device 100 will be described below. Herein processing when IDMA, SPC, SCMA, SDMA (or SDM), and OFDMA (or SC-FDMA) are allocated will be described as an example. Note that, when there is an access scheme not allocated by the communication control device 100, processing relating to an access scheme not allocated in the processing described below may be skipped. The expression of a vector included in the following description is set to indicate a column vector unless specified otherwise. An objective of a reception device is to decode a bit series $b_k$ transmitted to itself.

In addition, description will be provided on the assumption that the terminal device 300 functions as a reception device in downlink communication below. In uplink, the base station 200 functions as a reception device, and the processes to be described below are performed in the same manner.

(A) Reception Symbol

A reception symbol is transmitted from a transmission antenna at the end of a transmission process of a transmission device described above, passes through a radio propagation path, and then reaches the terminal device 300 functioning as a reception device. Hereinbelow, a reception symbol is also set to be expressed in the form of a vector.

When the transmission device employs OFDMA, the radio communication unit 310 deletes CPs or GIs from signals received from reception antennas, and obtains symbols of each subcarrier of a frequency area by executing a FFT or a DFT. A reception symbol after the transform in the frequency area is expressed with vectors of the following expression.

[Math.24]

$$\hat{y}_{q',r',f'} = H_{q',r',f'} y_{q',r',f'} + n_{q',r',f'} \qquad \text{Expression 24}$$

$H_{q',r',f'}$ represents a channel response matrix of the transmission device and the terminal device 300. A channel, response here means a response for each subcarrier. The size of $H_{q',r',f'}$ is $N_{RX}'N_{TX}$, and $N_{RX}$ represents the number of reception antennas of the radio communication unit 310. $n_{q',r',f'}$ is a vector including noise and other cell interference component. The size of $n_{q',r',f'}$ is $N_{RX}'1$.

(B) Channel Estimation

The terminal device 300 estimates a response of a propagation path through which signals have passed (i.e., a channel response matrix H) in order to equalize, separate, decode, and the like the signals. For this channel estimation, it is desirable to use an RS inserted from the transmission side. By using the RS, the radio communication unit 310 acquires an estimation value of $H_{q',r',f'}$, which is:

[Math.25]

$$\hat{H}_{q',r',f'} \qquad \text{Expression 25}$$

(C) Spatial Equalization (Spatial Filtering)

After performing channel estimation, the radio communication unit 310 generates a reception weighting matrix for spatial equalization corresponding to SDMA, and the matrix is:

[Math.26]

$$\hat{F}_{q',r',f'} \qquad \text{Expression 26}$$

Here, the size of the reception weighting matrix is $N_{s,k}'N_{RX}$. The radio communication unit 310 performs spatial separation by multiplying this reception weighting matrix by a reception symbol. The output of the spatial separation is expressed with the following expression by setting the size as the vector of $N_{s,k}'1$.

[Math.27]

$$\hat{u}'_{q',r',f'} = \hat{F}_{q',r',f'} \hat{y}_{q',r',f'} \qquad \text{Expression 27}$$

Note that, although Expression 27 shows that a linear process based on a weighting matrix is used, the present technology is not limited thereto. For example, a non-linear process such as an iterative separation process may be used. In addition, a process simultaneously performed with the process of (D) to be described next may be employed. As such processes, for example, joint spatial and power filtering and joint spatial and power decomposition are considered.

Note that the processes described above can be performed by the spatial equalization processing unit 520 shown in FIG. 13.

(D) SIC, Symbol Despreading, Digital Symbol Demodulation (or Generation of a Log Likelihood Ratio)

After spatial equalization, the radio communication unit 310 generates a log likelihood ratio (LLR) per bit equivalent to an interleaved code bit series $b''_{i',k}$ from symbols which have undergone digital modulation, symbol spreading, and SPC multiplexing, and the ratio is:

[Math.28]

$$\hat{e}''_{i',k} \qquad \text{Expression 28}$$

As an interference canceller, the radio communication unit 310 may employ a canceller other than an SIC, for example, a parallel interference canceller (PIC). When allocation of electric power is performed and an electric power level difference is made as in SPC, however, an SIC is desirably employed. In addition, when an SIC is executed, the radio communication unit 310 desirably decodes $s''_{p',k}$ corresponding to a descending order of the highest $A_p$ according to the electric power level $A_p$ of SPC.

Note that the processes described above can be performed by, the serial-parallel conversion processing unit 532, the SIC processing units 540, and the serial-parallel conversion processing unit 542 shown in FIG. 13, and the despreading processing units 550, the demodulation processing units 552, and the serial-parallel conversion processing unit 560 shown in FIG. 14.

(E) Deinterleave

After completing generation of the LLR, the radio communication unit 310 restores the order of bits within the series to the original by executing deinterleave corresponding to interleave applied on the transmission side. The series after deinterleave is expressed with the following expression.

[Math.29]

$$\hat{e}'_{i',k} \pi_i^{-1}(\hat{e}''_{i',k}) \qquad \text{Expression 29}$$

Note that the process described above can be performed by the deinterleavers 562 shown in FIG. 14.

(F) Error Correction Decoding

After deinterleave, the radio communication unit 310 acquires the original transmission bit series by executing decoding corresponding to encoding applied on the transmission side. The original transmission bit series is expressed with the following expression.

[Math.30]

$$\hat{b}_k = DEC(\hat{e}', M, k) \qquad \text{Expression 30}$$

Here, DEC(x) is a function representing decoding.

Note that the process described above can be performed by the FEC decoding processing units 570 shown in FIG. 14.

(G) Repetitive Process

The radio communication unit 310 may repeatedly execute the processes relating to (C) to (F) described above. In this case, reception and decoding performance can be enhanced. Particularly, it is desirable to employ a repetitive process for SPC multiplexing and separation of signals multiplexed on non-orthogonal resources.

Note that the process described above can be performed by the feedback loop processing unit 580 shown in FIG. 14.

3.4. Notification of Access Setting Information

Operation Process

A transmission device and a reception device are notified of access setting information indicating a result of allocation by the communication control device 100. An access setting information notification process with respect to the base station 200 and the terminal device 300 in a cellular system will be described below.

Figure 22:
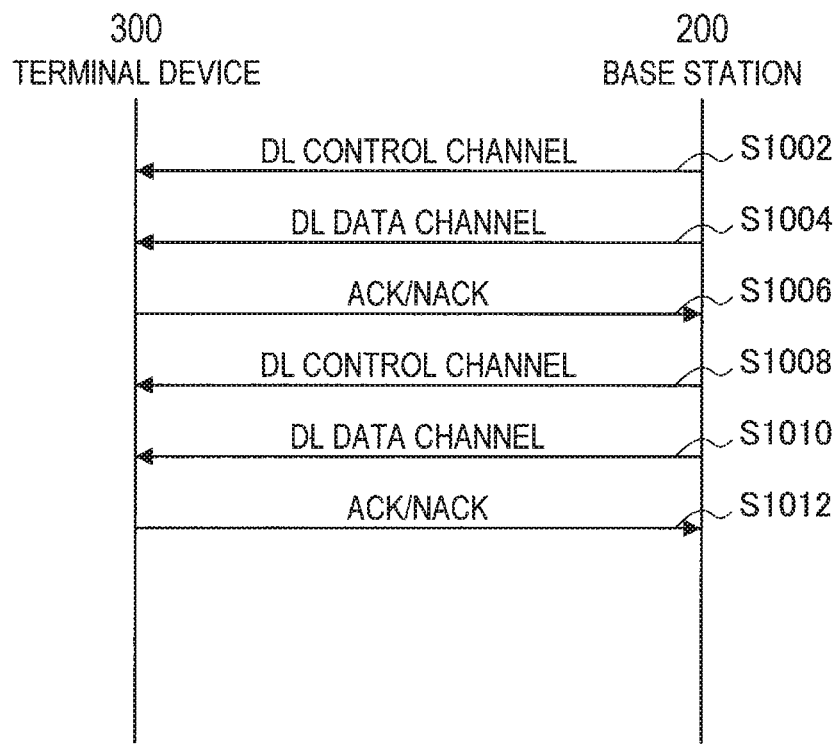
FIG. 22 is a sequence diagram showing an example of the flow of an access setting information notification process in the communication system according to the embodiment.

FIG. 22 is a sequence diagram showing an example of the flow of an access setting information notification process in the communication system 1 according to the present embodiment. The present sequence will be introduced on the assumption of downlink communication in the cellular system.

As shown in FIG. 22, first in Step S1002, the base station 200 transmits a DL control channel storing access setting information to the terminal device 300. In the transmission of the DL control channel, for example, a physical downlink control channel (PDCCH) is used. In addition, the base station 200 may have received access setting information from the communication control device 100 beforehand, or the base station 200 and the communication control device 100 may be integrally formed. The control unit 330 of the terminal device 300 which have received the DL control channel controls the radio communication unit 310 to receive a data channel using allocated resources represented by the access setting information. Accordingly, the terminal device 300 can receive the DL data channel transmitted from the base station 200. Note that the data channel may be a shared data channel.

Next, in Step S1004, the base station 200 transmits the DL data channel to the terminal device 300. At this time, the base station 200 performs the above-described transmission signal processing according to the access setting information transmitted in Step S1002. In addition, the terminal device 300 performs the above-described reception signal processing according to the access setting information received in Step S1002.

Next, in Step S1006, the terminal device 300 transmits a positive response (ACK) or a negative response (NACK) to the base station 200.

Next, in Steps S1008 to 1012, the base station 200 and the terminal device 300 performs the same processes as the above-described Steps S1002 to S1006. Note that, when NACK is transmitted in Step S1006 above, Steps S1008 to S1012 are a retransmission process.

Figure 23:
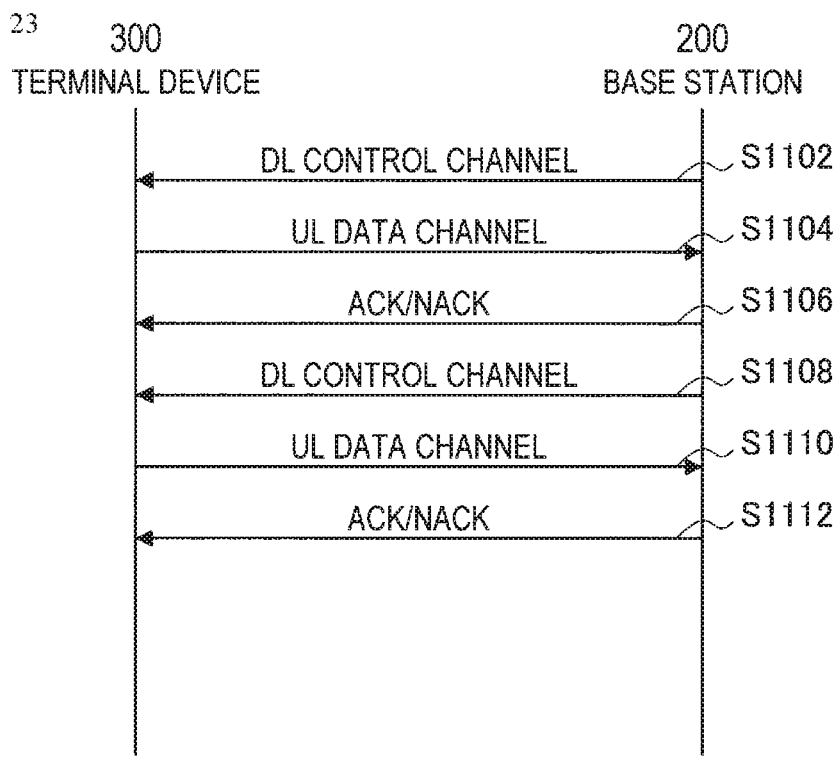
FIG. 23 is a sequence diagram showing an example of the flow of an access setting information notification process in the communication system according to the embodiment.

FIG. 23 is a sequence diagram showing an example of the flow of another access setting information notification process in the communication system 1 according to the present embodiment. The present sequence will be introduced on the assumption of uplink communication in the cellular system.

As shown in FIG. 23, first in Step S1102, the base station 200 transmits a DL control channel storing access setting information to the terminal device 300. In the transmission of the DL control channel, for example, a PDCCH is used. In addition, the base station 200 may have received the access setting information from the communication control device 100 beforehand. The control unit 330 of the terminal device 300 that has received the DL control channel controls the radio communication unit 310 to transmit a data channel or a control channel using allocated resources represented by the access setting information. Accordingly, the terminal device 300 can transmit a UL data channel to the base station 200.

Next, in Step S1104, the terminal device 300 transmits the UL data channel to the base station 200. At this time, the terminal device 300 performs the above-described transmission signal processing according to the access setting information received in Step S1102 above. In addition, the base station 200 performs the above-described reception signal processing according to the access setting information transmitted in Step S1102 above.

Next, in Step S1106, the base station 200 transmits a positive response (ACK) or a negative response (NACK) to the terminal device 300.

Next, in Steps S1108 to S1112, the base station 200 and the terminal device 300 perform the same processes as the above-described Steps S1102 to S1106. Note that, when NACK is transmitted in Step S1106, Steps S1108 to S1112 are a re-transmission process. In addition, Step S1106 and Step S1108 described above may be simultaneously performed in one time of communication.

Note that, although the processing examples have been described above on the assumption of the cellular system, the present technology may be applied to systems other than a cellular system. In that case, a transmission, device functions as the communication control device 100, and the transmission device may notify a reception device of access setting information.

Content of Access Setting Information

Table 1 below shows a list of information that can be included as access setting information. Access setting information includes at least any of the information shown in Table 1.

TABLE 1

| Item | Example for item |
|---|---|
| Information regarding a target device of present information | ID of destination device of this information<br>Radio network temporary identifier (RNTI) of the destination device of this information |
| Information indicating allocated orthogonal resources | Type of resource block<br>Type of subcarrier<br>Type of (orthogonal) frequency hopping pattern<br>Type of subframe |
| Information regarding allocation of non-orthogonal resources | Flag indicating allocation or non-allocation of non-orthogonal resources<br>Flag indicating that information indicating non-orthognnal resources is notified on another control channel<br>Electric power level of a control channel including information indicating non-orthogonal resources (for example, a ratio with respect to an electric power level of a control channel including information indicating orthogonal resources, a ratio with respect to an electric power level or a reference signal, or the like) |

TABLE 1-continued

| Item | Example for item |
| --- | --- |
| Information indicating allocated non-orthogonal resources | Type of spreading code<br>Type of sparse code<br>Type of antenna (antenna port)<br>Type of space stream<br>Type of precoder<br>Type of interleaver<br>Type of electric power level<br>Type of error correction code<br>Type of (non-orthogornal) frequency hopping pattern |
| Information regarding a modulation scheme and coding rate used for allocated orthogonal resources and non-orthogonal resources | BPSK, QPSK, 16QAM, 64QAM, 256QAM, etc.<br>Coding rates of 1/2, 2/3, 3/4, 4/5, 5/6, 6/7, 7/8, etc.<br>Index indicating a pattern of a combination of a modulation scheme and a coding rate (channel quality indicator (CQI)) |
| Information regarding HARQ | Flag of re-transmission or first transmission<br>Chase combining or incremental redundancy flag<br>Redundancy version (RV)<br>HARQ process ID |
| Information regarding a data size transmitted or received using allocated orthogonal resources and non-orthogonal resources | Frame (packet) data size<br>Transport Block Size (TBS) Index<br>Modulation and Coding Set (MCS) Index |
| Direction of communication link | Flag indicating downlink or uplink |
| Transmit Power Control (TPC) command | Path loss compensation factor<br>MCS- or CQ1-dependent factor<br>Offset Factor |
| Information regarding another device multiplexing with non-orthogonal resources | Presence or absence of another multiplexing device<br>ID of another multiplexing device<br>Radio Network Temporary Identifier (RNTI) of another multiplexing device |

Method of Access Setting Information Notification

Various notification methods for notifying the base station 200 and the terminal device 300 of access setting information are considered. Thus, variation in methods of access setting information notification will be described. Description will be provided below on the assumption that a notification source of access setting information is the base station 200 and a notification destination is the terminal device 300; however, a notification source and a notification destination may be arbitrary devices.

(1) Batch Notification of Access Setting Information for Devices

Figure 24:
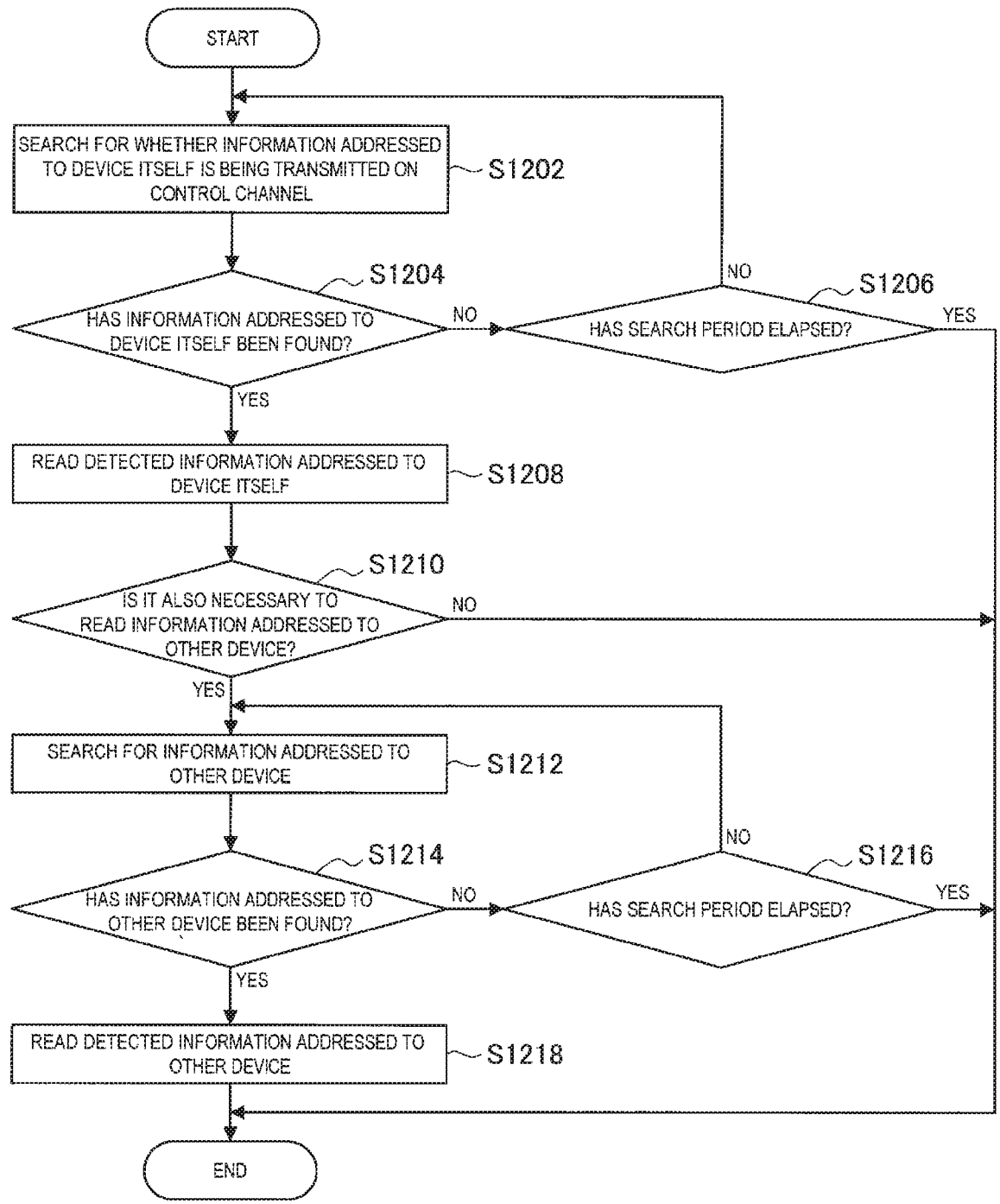
FIG. 24 is a flowchart showing an example of the flow of an access setting information reception process executed by the terminal device according to the embodiment.

In the present notification method, the base station 200 transmits access setting information to each device in a batch. The terminal device 300 receives the access setting information transmitted to itself in a batch through the process shown in FIG. 24. FIG. 24 is a flowchart showing an example of the flow of an access setting information reception process executed by the terminal device 300 according to the present embodiment.

As shown in FIG. 24, first in Step S1202, the control unit 330 searches for whether information addressed to the device itself (the terminal device 300) is being transmitted on a control channel.

When information addressed to the device has not been found (No in S1204), the control unit 330 determines in Step S1206 whether or not a search period has elapsed. When the search period is determined to have elapsed (Yes in S1206), the process ends. On the other hand, when the search period is determined not to have elapsed (No in S1206), the process returns to Step S1202 again. Note that, since the control channel is generally periodically transmitted, the present flow may be executed according to the period.

When the information addressed to the device has been found (Yes in S1204), the control unit 330 reads found information addressed to the device in Step S1208. For example, the control unit 330 decodes a portion of the control channel in which the information addressed to the device is stored to the final, and reads stored access setting information. The access setting information that the control unit 330 has read includes, for example, at least any of the information shown in Table 1 above.

Next, in Step S1210, the control unit 330 determines whether or not it is also necessary to read information addressed to another device. This determination can be performed by referring to, for example, "information regarding another device multiplexing with non-orthogonal resources" included in the access setting information addressed to the device itself. For example, when there is another device multiplexing non-orthogonally, the control unit 330 determines that it is also necessary to read information addressed to the other device. In order to perform this determination easily and at a requisite minimum, it is desirable that a specific ID or RNTI regarding a multiplexing device be included in access setting information. In the present embodiment, there is a possibility of signals addressed to a plurality of terminal devices 300 being multiplexed on non-orthogonal resources. When such signals are transmitted or received, it is desirable for a reception device to know access setting information for another reception device to be multiplexed on non-orthogonal resources. This is particularly advantageous for the terminal device 300 to receive non-orthogonally multiplexed signals.

When reading the information addressed to another device is determined not to be necessary (No in S1210), the process ends.

On the other hand, when reading the information addressed to another device is determined to be necessary (Yes in S1210), The control unit 330 searches in Step S1212 for whether information addressed to another device (another terminal device 300) is being transmitted on the control channel.

When the information addressed to another device has not been found (No in Step S1214), the control unit 330 determines in Step S1216 whether or not a search period has elapsed. When the search period is determined to have elapsed (Yes in S121), the process ends. On the other hand, when the search period is determined not to have elapsed (No in S1216), the process returns to Step S1212 again. This search period may be the same as or different from that of Step S1206 above.

When the information addressed to another device has been found (Yes in S1204), the control unit 330 reads the found information addressed to another device in Step 1218. For example, the control unit 330 decodes the portion of the control channel in which the information, addressed to another device is stored to the final, and reads information of the content. The information that the control unit 330 reads includes, for example, at least any of the information shown in Table 1 above.

(2) Notification of Access Setting Information to Each Device in Stages

In the present notification method, each device is notified of access setting information in a plurality of stages. For example, access setting information including information regarding orthogonal resources (for example, frequency resources or time resources) and access setting information including information regarding non-orthogonal resources (spreading codes, antennas, space streams, electric power levels, interleave, frequency hopping, error correction codes, or the like) can be separately notified.

According to the present notification method, a device which is compatible with a multiple access scheme using non-orthogonal resources can read information regarding non-orthogonal resources, and a device which is not compatible with the multiple access scheme using non-orthogonal resources can omit reading of the information regarding non-orthogonal resources. For this reason, the present notification method is useful for maintaining compatibility when devices which are compatible or incompatible with the multiple access scheme using non-orthogonal resources.

Figure 25:
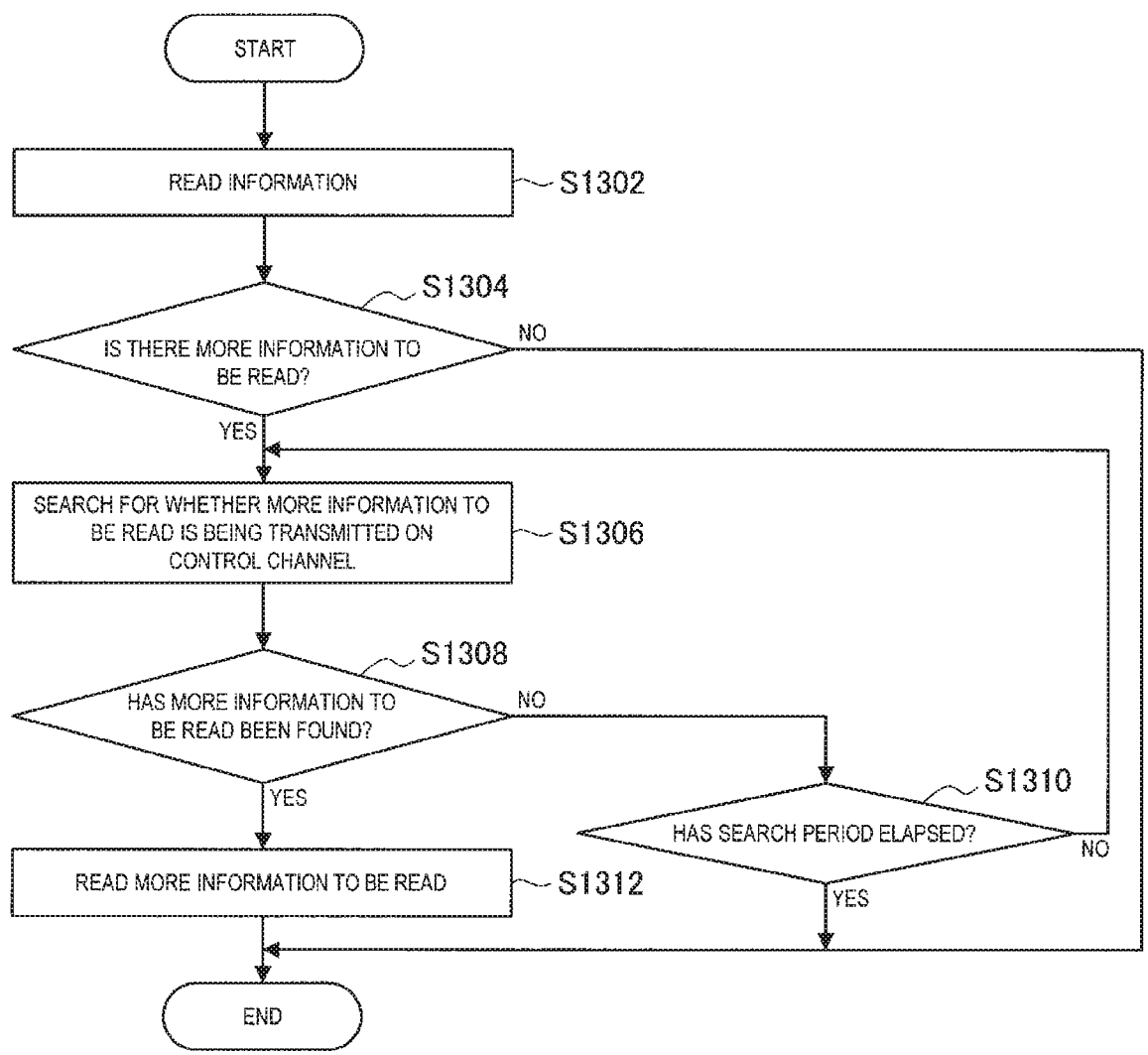
FIG. 25 is a flowchart showing an example of the flow of an access setting information reception process executed by the terminal device according to the embodiment.

The base station 200 transmits access setting information to each device in a plurality of stages. The terminal device 300 gradually receives the access setting information transmitted to itself in a plurality of stages. For example; the terminal device 300 performs processes in Steps S1208 and S1218 according to the flowchart shown in FIG. 25 while receiving the access setting information according to the flowchart shown in FIG. 24 above. FIG. 25 is the flowchart showing an example of the flow of an access setting information reception process executed in the terminal device 300 according to the present embodiment.

As shown in FIG. 25, first in Step S1302, the control unit 330 reads the information.

The information read here includes, for example, information regarding orthogonal resources and other information.

Next, in Step S1304, the control unit 330 determines whether or not there is more information to be read. The more information to be read includes, for example, information regarding non-orthogonal resources and other information. For example, the control unit 330 determines that there is more information to be read when the device itself corresponds to the multiple access scheme using non-orthogonal resources and the "flag indicating allocation or non-allocation of non-orthogonal resources" is a flag indicating allocation.

When it is determined that there is no more information to be read (No in S1344), the process ends.

On the other hand, when it is determined that there is more information to be read (Yes in S1304), the control unit 330 searches for whether more information to be read is being transmitted on a control channel in Step S1306.

When no more information to be read has not been found (No in S1308), the control unit 330 determines whether or not a search period has elapsed in Step S1310. When the search period is determined to have elapsed (Yes in S1310), the process ends. On the other hand, when the search period is determined not to have elapsed (No in S1310), the process returns to Step S1306 again.

On the other hand, when more information to be read has been found (Yes in S1308), the control unit 330 reads the found information to be read in Step S1312. For example, the control unit 330 decodes the portion of the control channel in which the more information to be read is stored to the final, and reads information of the content.

(3) Batch Notification of Access Setting Information to All Devices

The present notification method is to notify all devices of access setting information in a batch. For example, all devices are notified of the list of access setting information indicating access settings allocated to the respective devices. As an example, the present notification method will be described with reference to FIG. 26.

Figure 26:
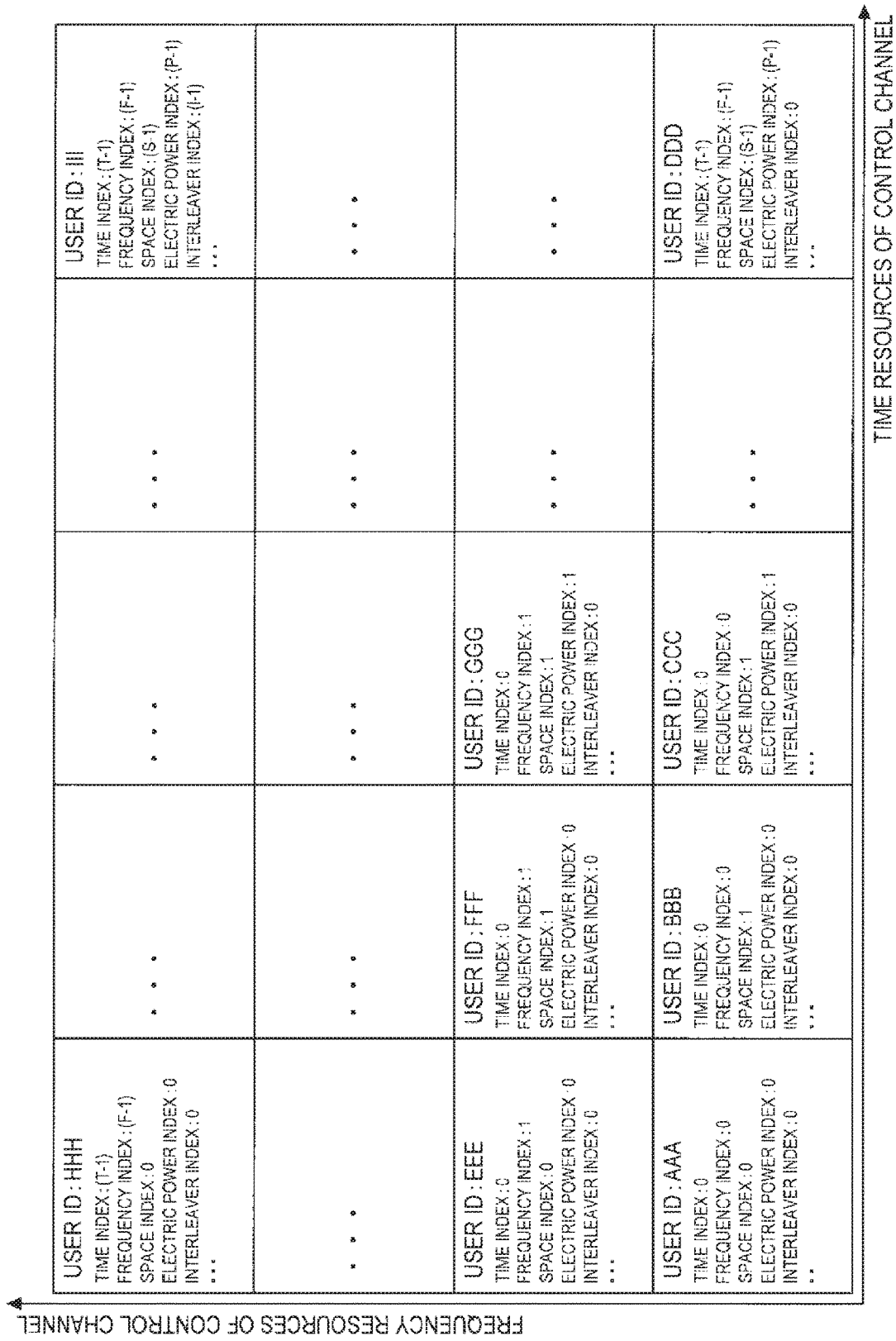
FIG. 26 is an explanatory diagram for describing an access setting information notification process according to the embodiment.

FIG. 26 is an explanatory diagram for describing the access setting information notification process according to the present embodiment. In the example shown in FIG. 26, one piece of access setting information is stored in an area which includes one time resource and one frequency resource (which will also be referred to as, for example, a resource element or a resource block). In addition, all access setting information is stored on a control channel. Each device performs signal processing using access setting information of an area among areas in which its own identification information (user ID) is written. Note that, in the example shown in FIG. 26, access setting information includes user IDs, time indexes, frequency indexes, space indexes, electric power indexes, and interleaver indexes. These indexes correspond to information indicating allocated orthogonal resources or, allocated non-orthogonal resources shown in Table 1. The access setting information can also include other information shown in Table 1.

A merit of the present notification method is that, if the total number of orthogonal resources and non-orthogonal resources is decided, the amount of control channels for carrying the information can also be substantially fixed. In other words, unlike other notification methods, the present notification method can suppress increase of the amount of control channels according to increase of the number of users. However, since access setting information can overlap between users, there is a possibility of overhead being relatively large particularly when the number of users is small. In addition, in order to know what resources have been allocated to a reading device or other devices, the device itself has to read all access setting information and refer to user IDs. An example of an access setting information notification process relating to the present notification method will be described with reference to FIG. 27.

Figure 27:
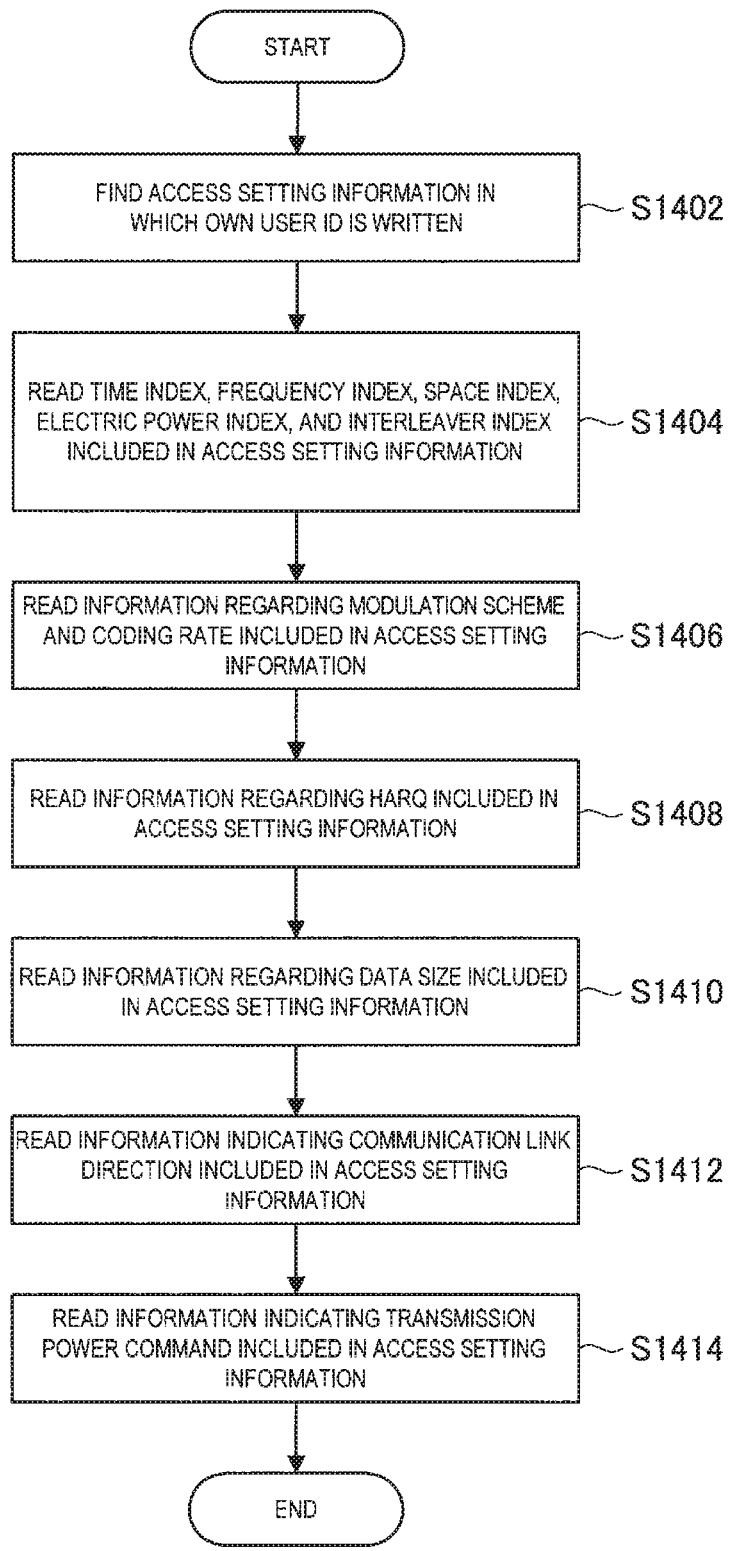
FIG. 27 is a flowchart showing an example of the flow of an access setting information reception process executed by the terminal device according to the embodiment.

FIG. 27 is a flowchart showing an example of the flow of an access setting information reception process executed by the terminal device 300 according to the present embodiment.

As shown in FIG. 27, first in Step S1402, the control unit 330 finds access setting information in which its own user ID is written. Accordingly, the control unit can preferentially read access setting information for the device itself. Of course, the control unit 330 may find access setting information in which the user ID of another terminal device 300 is written and set the information as a reading target. The following steps may be performed in a random order.

Next, in Step S1404, the control unit 330 reads a time index, a frequency index, a space index, an electric power index, and an interleaver index included in the access setting information.

Next, in Step S1406, the control unit 330 reads information regarding a modulation scheme and a coding rate included in the access setting information.

Next, in Step S1408, the control unit 330 reads information regarding a HARQ included in the access setting information.

Next, in Step S1410, the control unit 330 reads information regarding a data size included in the access setting information.

Next, in Step S1412, the control unit 330 reads information indicating a communication link direction included in the access setting information.

Next, in Step S1414, the control unit 330 reads information indicating a transmit power control command included in the access setting information.

3.5. Channel Configuration

An example of a channel configuration according to the present embodiment will be described below with reference to FIGS. 28 to 32. Horizontal axes of each drawing mean orthogonal resources (for example, frequency, time, etc.) and vertical axes thereof mean non-orthogonal resources. When frequencies are considered as orthogonal resources, the orthogonal resources may be subcarriers or resource blocks, or may be component carriers (CC) of when carrier aggregation (CA) is applied. FIGS. 28 to 32 show arrangements of information regarding orthogonal resources and non-orthogonal resources allocated to each device (the base station 200 or the terminal device 300) stored in a control channel. Note that the information regarding orthogonal resources is information which includes an access scheme using the orthogonal resources and information indicating the orthogonal resources used in the access scheme. In addition, the information regarding non-orthogonal resources is information which includes an access scheme using the non-orthogonal resources and information indicating the non-orthogonal resources used in the access scheme.

Figure 28:
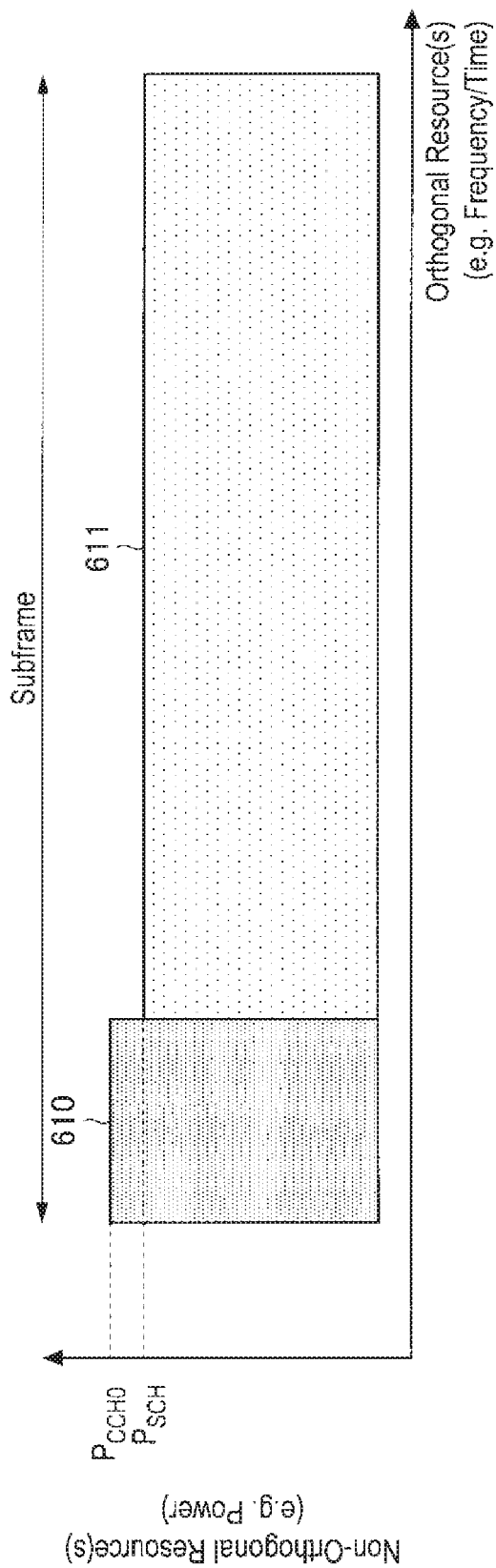
FIG. 28 is a diagram for describing an example of an arrangement of a control channel and a data channel according to the embodiment.

FIG. 28 is a diagram for describing an example of an arrangement of a control channel and a data channel according to the present embodiment. In the example illustrated in FIG. 28, information regarding orthogonal resources and information regarding non-orthogonal resources are included in the same control channel 610. In addition, the control channel 610 and the data channel 611 are multiplexed using resources orthogonal to each other. In the present arrangement example, the arrangement of the control channel is in a form resembling, for example, general LTE.

As will be described with reference to FIGS. 29 to 32 below, the information regarding orthogonal resources and the information regarding non-orthogonal resources may be included in different control channels. In such a case, different control channels have at least either different times or different frequencies, and have predetermined relations with data channels as will be described below.

Figure 29:
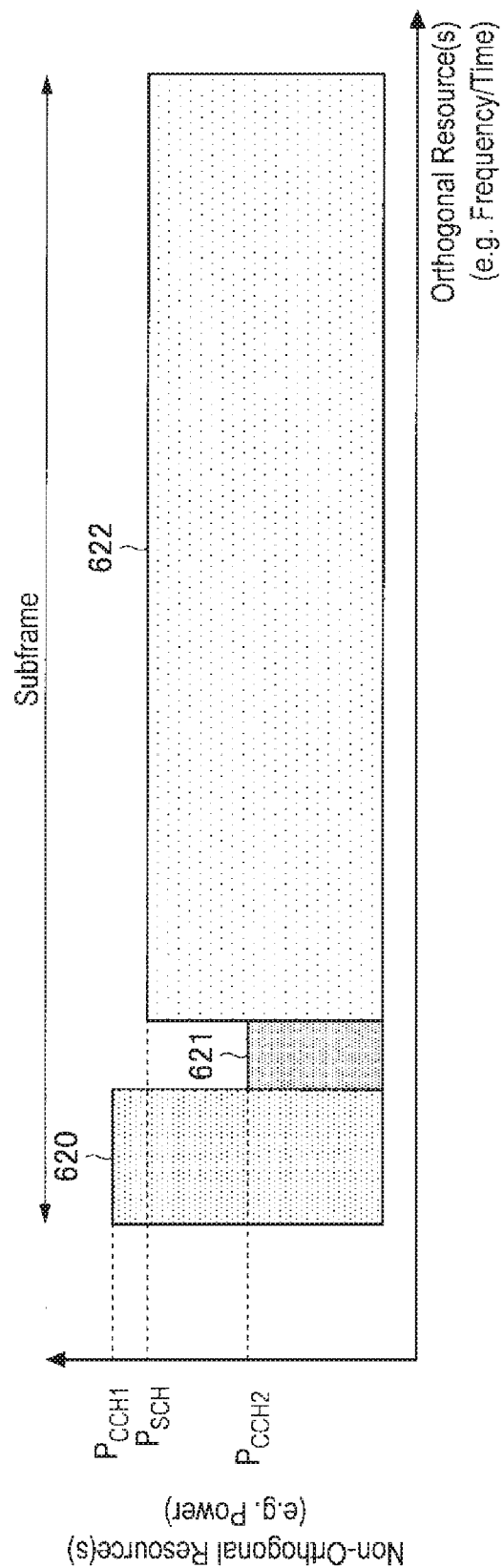
FIG. 29 is a diagram for describing an example of an arrangement of a control channel and a data channel according to the embodiment.

FIG. 29 is a diagram for describing an example of an arrangement of control channels and a data channel according to the present embodiment. In the example illustrated in FIG. 29, the control channel 620 which includes information regarding orthogonal resources and the control channel 621 which includes information regarding non-orthogonal resources are multiplexed using resources orthogonal to each other. In addition, the control channels 620 and 621 and the data channel 622 are multiplexed using resources orthogonal to each other. The present arrangement example is useful when each device is notified of access setting information in stages. According to the present arrangement example, since there is basically no interference between the channels, it is possible to avoid deteriorating accuracy in decoding. In addition, according to the present arrangement example, the communication system 1 can accommodate a legacy device that is not compatible with a multiple access scheme using non-orthogonal resources. In addition, according to the present arrangement example, since the control channel 620 and the control channel 621 are in an orthogonal relation, a legacy device that is not compatible with a multiple access scheme using non-orthogonal resources can read information regarding orthogonal resources without problem.

Figure 30:
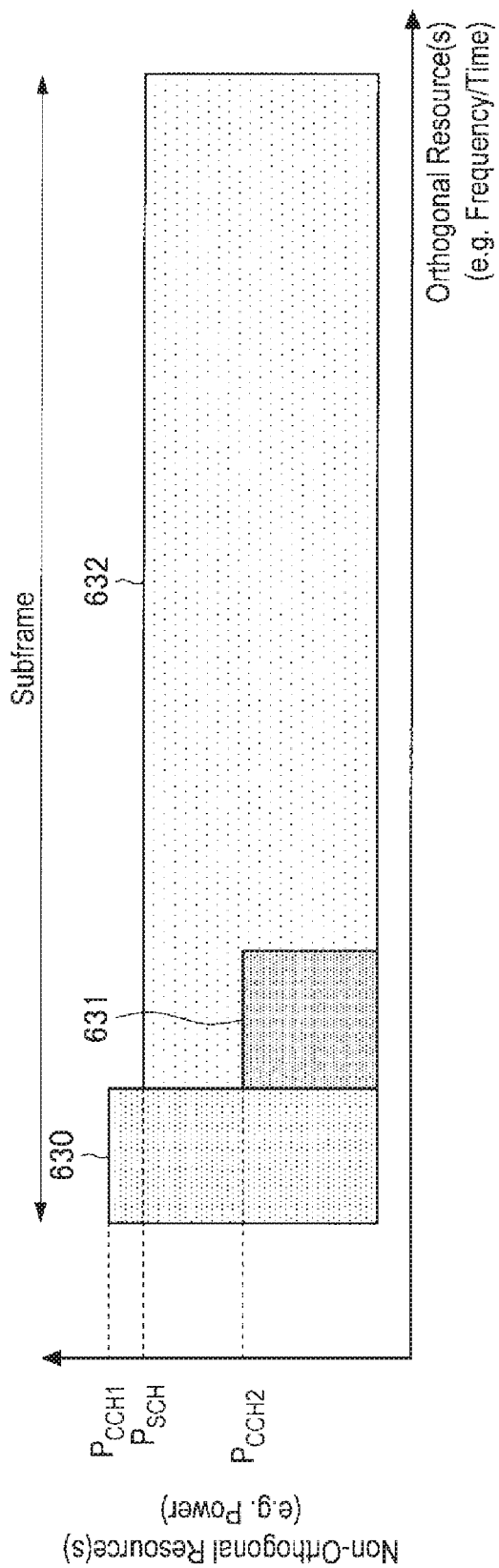
FIG. 30 is a diagram for describing an example of an arrangement of a control channel and a data channel according to the embodiment.

FIG. 30 is, a diagram for describing an example of an arrangement of control channels and a data channel according to the present embodiment. In the example illustrated in FIG. 30, the control channel 630 which includes information regarding orthogonal resources and the control channel 631 which includes information regarding non-orthogonal resources are multiplexed using resources orthogonal to each other. In addition, the control channel 630 is multiplexed with the data channel 632 using resources orthogonal to each other. In addition, the control channel 631 is multiplexed with the data channel 632 using resources at least orthogonal or non-orthogonal to each other. Since the control channel 630 which includes the information regarding non-orthogonal resources is information that is read by a device which is compatible with a multiple access scheme using non-orthogonal resources, the control channel 630 and the data channel 632 may be non-orthogonally multiplexed. In addition, according to the present arrangement example, since the control channel 630 and the control channel 631 are in an orthogonal relation, a legacy device that is not compatible with a multiple access scheme using non-orthogonal resources can read the information regarding orthogonal resources without problem.

Figure 31:
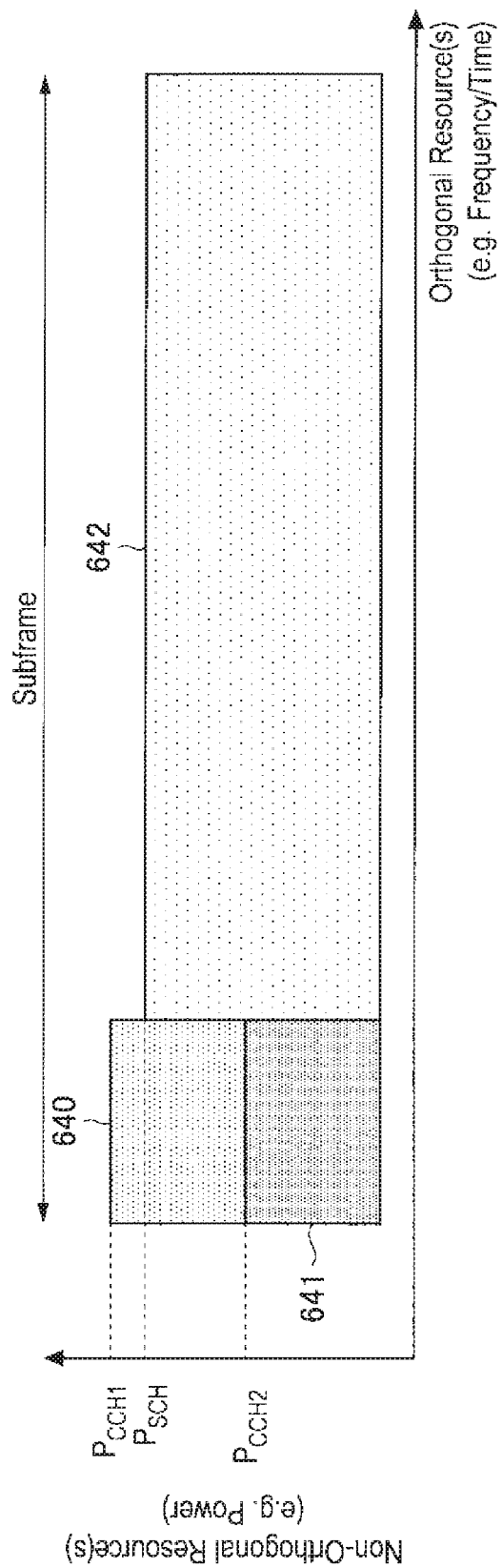
FIG. 31 is a diagram for describing an example of an arrangement of a control channel and a data channel according to the embodiment.

FIG. 31 is a diagram for describing an example of an arrangement of control channels and a data channel according to the present embodiment. In the example illustrated in FIG. 31, the control channel 640 which includes information regarding orthogonal resources and the control channel 641 which includes information regarding non-orthogonal resources are multiplexed using resources non-orthogonal to each other on the same orthogonal resources. In addition, the control channels 640 and 641 are multiplexed with the data channel 642 using resources orthogonal to each other. According to the present arrangement example, the control channel 640 and the control channel 641 can interfere with each other. For this reason, although a result of reading the control channel 640 by a legacy device that is not compatible with a multiple access scheme using non-orthogonal resources can deteriorate, it is not necessary to change a decoding mechanism.

Figure 32:
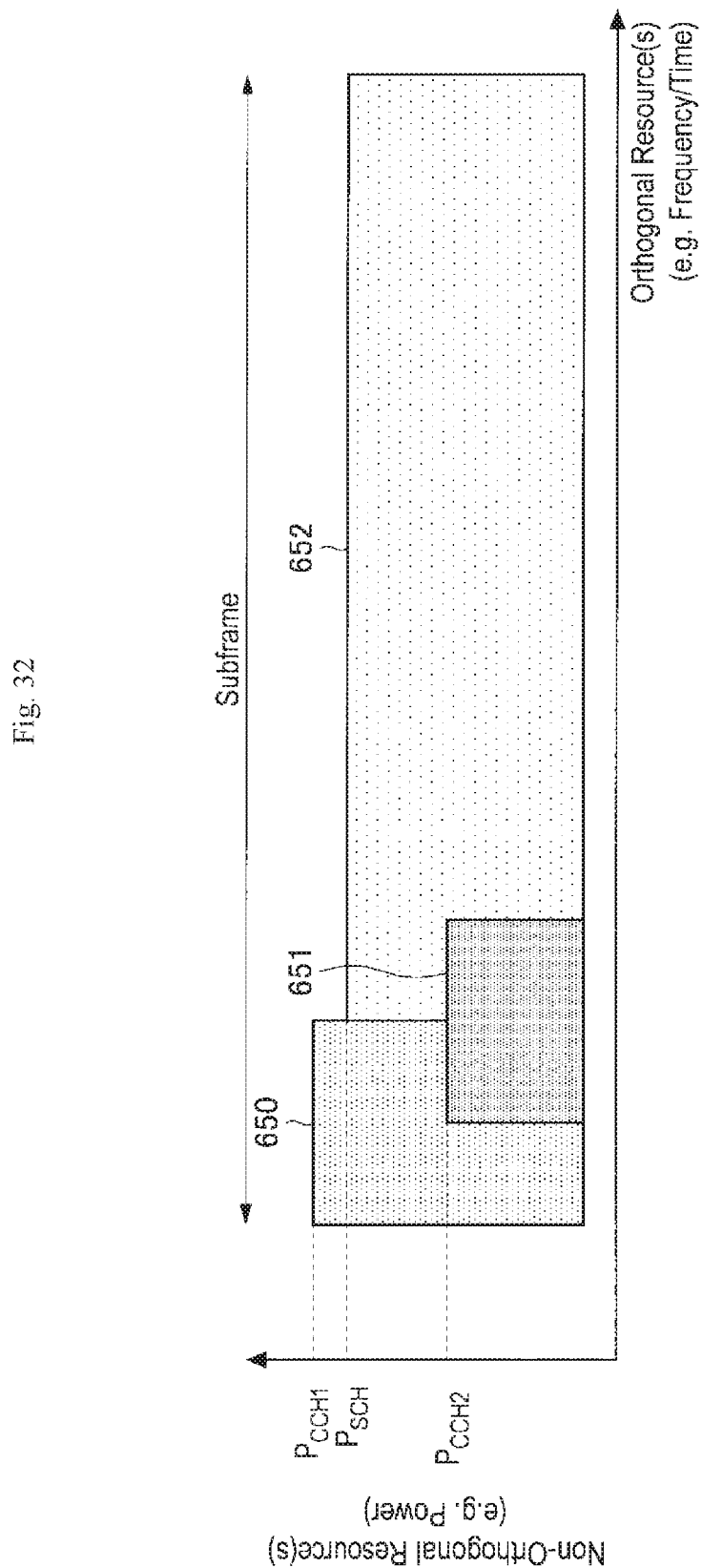
FIG. 32 is a diagram for describing an example of an arrangement of a control channel and a data channel according to the embodiment.

FIG. 32 is a diagram for describing an example of an arrangement of control channels and a data channel according to the present embodiment. In the example illustrated in FIG. 32, the control channel 650 which includes information regarding orthogonal resources and the data channel 652 are multiplexed using resources orthogonal to each other. In addition, the control channel 651 which includes information regarding non-orthogonal resources and the control channel 650 are multiplexed using resources at least orthogonal or non-orthogonal to each other. In addition, the control channel 651 and the data channel 652 are multiplexed using resources at least orthogonal or non-orthogonal to each other.

As an example of the non-orthogonal resources of the vertical, axes in FIGS. 28 to 32, an electric power level is exemplified. In this case, different electric power levels can be allocated to the control channels which include information regarding orthogonal resources, control channels which include information regarding non-orthogonal resources, and data channels. Since the control channels are important for accurately decoding, the subsequent data channels (not necessarily immediately subsequent thereto), electric power levels can be adjusted to enable the control channels to be appropriately decoded first. Note that a magnitude relation of electric power levels allocated to respective channels may coincide with or may be different from the magnitude relations shown in FIGS. 28 to 32.

Here, levels or unit densities of electric power allocated to transmission of respective control channels and data channels may have a predetermined magnitude relation as described below. $P_{CCH0}$ indicates a level or a unit density of electric power of a control channel which includes information regarding orthogonal resources and information regarding non-orthogonal resources. $P_{CCH1}$ indicates a level or a unit density of electric power of a control channel which includes information regarding orthogonal resources. $P_{CCH2}$ indicates a level or a unit density of electric power of a control channel which includes information regarding non-orthogonal resources. In addition, $P_{SCH}$ indicates a level or a unit density of electric power of a data channel per unit, and when a plurality of pieces of data are non-orthogonally multiplexed, indicates a level or a unit density of electric power of the sum of them. Since it is desirable for control channels to be decodable in terms of a stable system operation, it is desirable to satisfy the conditions of the following expression as magnitude relations thereof.

[Math.31]

$$P_{CCH0} \geq P_{SCH}$$

$$P_{CCH1} \geq P_{SCH}$$

$$P_{SCH} \geq P_{CCH2}$$

$$P_{CCH1} \geq P_{CCH2} \quad \text{Expression 31}$$

As shown by Expression 31 above, a level or a unit density of electric power allocated to transmission of a control channel which includes information regarding orthogonal resources is desirably equal to or higher than a level or a unit density of electric power allocated to transmission of a data channel. In addition, as shown by Expression 31 above, a level or a unit density of electric power allocated to transmission of a control channel which includes information regarding orthogonal resources is desirably equal to or higher than a level or a unit density of electric power allocated to transmission of a control channel which includes information regarding non-orthogonal resources.

Furthermore, although not illustrated, a level or a unit density of electric power is considered by being divided into electric power of a data channel transmitted using orthogonal resources $P_{SCH0}$ and electric power of a data channel transmitted using non-orthogonal resources $P_{SCH,NO}$, it is desirable to satisfy the conditions of the following expression.

[Math.32]

$$P_{CCH0} \geq P_{SCH,O}$$

$$P_{CCH0} \geq P_{SCH,NO}$$

$$P_{CCH1} \geq P_{SCH,O}$$

$$P_{CCH1} \geq P_{SCH,NO}$$

$$P_{SCH,O} \geq P_{CCH2}$$

$$P_{CCH2} \geq P_{SCH,NO} \quad \text{Expression 32}$$

3.6. Capability Information

Content of Capability Information

Table 2 below shows an example of capability information.

TABLE 2

| User ID | 3G ((Spreading) Code) | 4G ((Orthogonal) Frequency) | SDMA (Space) | IDMA (Interleaver) | SPC (Power) | RSMA (Rate) | SCMA ((Sparse) Codebook) |
|---|---|---|---|---|---|---|---|
| 0 | OK | OK | OK | OK | OK | NG | NG |

As shown in Table 2 above, capability information includes information indicating whether or not a device is compatible with each of orthogonal resources and non-orthogonal resources. For example, capability information can include information indicating whether a device is compatible (OK) or incompatible (NG) with each access scheme. The information may be realized as bit flags. In addition, capability information can include a user IDs as identification information of a device itself. The terminal device 300 specifies each base station 200 or terminal device 30 using a user ID, and thereby knows with what access scheme the specified device is compatible. Note that "3G" and "4G" in Table 2 above can also be understood as legacy RATs.

Notification of Capability Information

An example of the procedure of notification of capability information will be described below with reference to FIG. 33.

Figure 33:
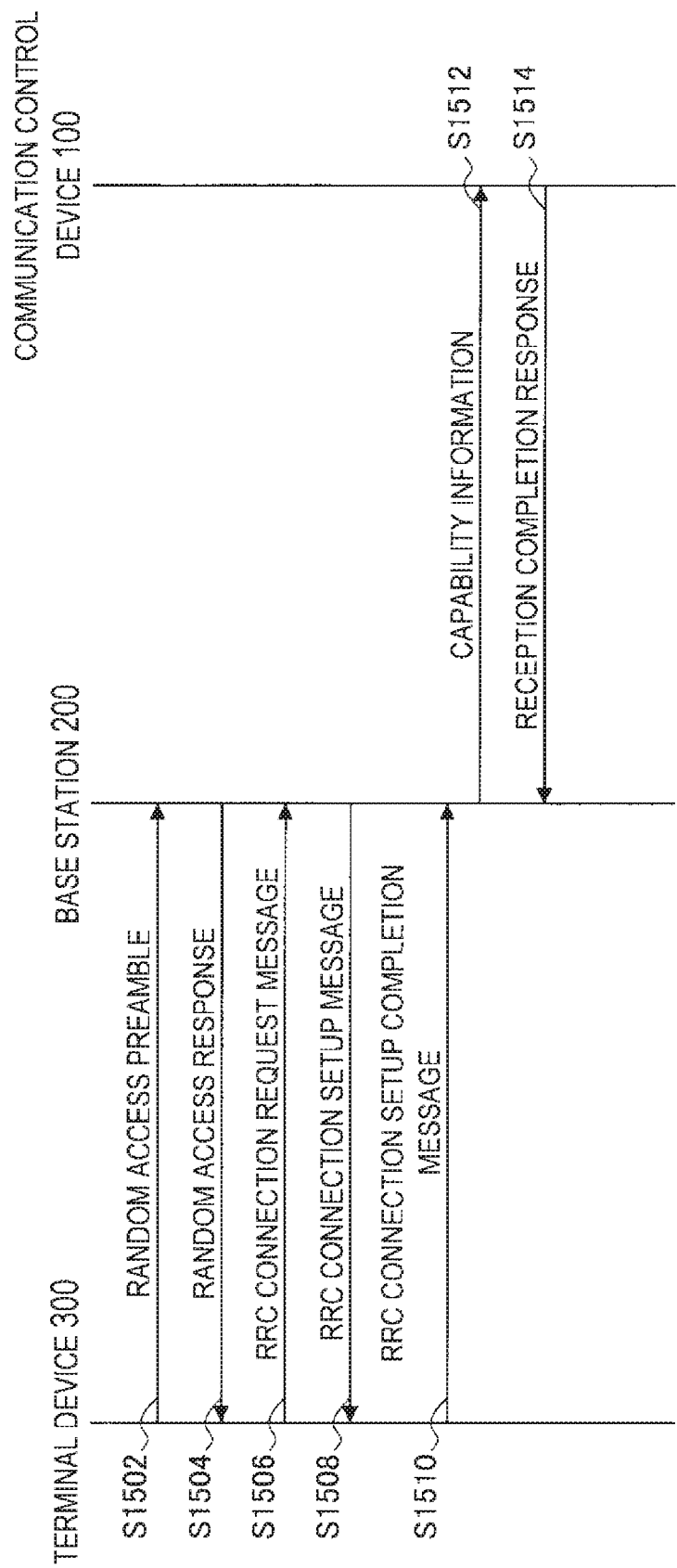
FIG. 33 is a sequence diagram showing an example of the flow of a capability information notification process executed in the communication system according to the embodiment.

FIG. 33 is a sequence diagram showing the example of the flow of a capability information notification process executed in the communication system 1 according to the present embodiment. As shown in FIG. 33, the terminal device 300, the base station 200, and the communication control device 100 are involved in the present sequence.

The processes relating to Steps S1502 to S1510 shown in FIG. 33 are a procedure for establishing radio resource control (RRC) connection. Specifically, in Step S1502, the terminal device 300 transmits a random access preamble to the base station 200. The base station 200 which has succeeded in receiving the random access preamble transmits a random access response to the terminal device 300 in Step S1504. Through this step, the base station 200 recognizes the terminal device 300. Next, in Step S1506, the terminal device 300 transmits an RRC connection request message to the base station 200. The base station 200 which has succeeded in receiving the RRC connection request, message transmits an RRC connection setup message to the terminal device 300 in Step S1508. The terminal device 300 sets a parameter according to setup information included in the RRC connection setup message received from the base station 200, and then transmits an RRC connection setup completion message to the base station 200 in Step S1510.

Through the procedures of random access and RRC connection described above, capability information may be transmitted from the terminal device 300 and received by the base station 200. For example, the terminal device 300 may transmit a message dedicated to notifying the base station 200 of the capability information. In addition, the terminal device 300 may include the capability information in at least any of the messages transmitted to the base station 200 in the procedure relating to Steps S1502 to S1510 above. Specifically, the terminal device 300 may include the capability information in at least any of the random access preamble, the RRC connection request message, any the RRC connection setup message. In this case, overhead can be reduced more than when the capability information is transmitted using a dedicated message. The reason is that there is a possibility of the capability information being settled with several bits as shown in Table 2 above.

Next, in Step S1512, the base station 200 transmits capability information to the communication control device 100. At this time, the base station 200 transmits the capability information received from the terminal device 300. In addition, the base station 200 may transmit its own capability information to the communication control device 100.

Next, in Step S1514, the communication control device 100 transmits a reception completion response to the base station 200. The communication control device 100 may share the capability information collected in Step S1512 above with another communication control device on a core network or another network. In this case, in the procedure of cell selection and handover to be described below, the capability information can be used more effectively.

Table 3 below shows an example of capability information collected from a plurality of devices.

TABLE 3

| User ID | 3G | 4G | SDMA | IDMA | SPC | RSMA | SCMA |
|---|---|---|---|---|---|---|---|
| 0 | OK | OK | OK | NG | OK | NG | NG |
| 1 | OK | OK | OK | NG | NG | OK | NG |
| 2 | OK | OK | NG | OK | NG | OK | NG |
| 3 | OK | OK | NG | OK | NG | NG | OK |
| 4 | OK | OK | OK | OK | OK | OK | OK |
| ... | ... | ... | ... | ... | ... | ... | ... |

It is desirable for the terminal device 300 to store the capability information collected in Step S1512 above with the user ID. Here, as an entity functioning as the terminal device 300 on the core network, for example, a mobility management entity (MME) is exemplified. Since an MME has a function of controlling cell selection and handover of the terminal device 300, it is useful for retaining capability information of the plurality of devices shown in Table 3. In addition, the base station 200 may retain the capability information of the terminal device 300 which belongs to the cell operated by the base station.

As described above, the base station 200 may notify the communication control device 100 of its own capability information. Table 4 below shows an example of the capability information of the base station 200.

TABLE 4

| Cell ID | 3G | 4G | SDMA | IDMA | SPC | RSMA | SCMA |
|---|---|---|---|---|---|---|---|
| 0 | OK | OK | OK | NG | OK | NG | NG |
| 1 | OK | OK | OK | NG | NG | OK | NG |
| 2 | OK | OK | NG | OK | NG | OK | NG |
| 3 | OK | OK | NG | OK | NO | NG | OK |
| 4 | OK | OK | OK | OK | OK | OK | OK |
| ... | ... | ... | ... | ... | ... | ... | ... |

As shown in Table 4, the capability information of the base station 200 may be in the same form as the capability information of the terminal device 300 shown in Table 3 above, and a cell ID may be used as identification information.

In addition, the base station 200 may notify the communication control device 100 of status information indicating what access scheme is being currently used, in addition to its own capability information. Table 5 below shows an example of the status information of the base station 200.

TABLE 5

| Cell ID | 3G | 4G | SDMA | IDMA | SPC | RSMA | SCMA |
|---|---|---|---|---|---|---|---|
| 0 | Enabled | Disabled | Disabled | Disabled | Enabled | Disabled | Disabled |
| 1 | Disabled | Enabled | Enabled | Disabled | Disabled | Enabled | Disabled |
| 2 | Disabled | Enabled | Disabled | Disabled | Disabled | Disabled | Disabled |
| 3 | Disabled | Enabled | Disabled | Enabled | Disabled | Disabled | Enabled |
| 4 | Disabled | Enabled | Enabled | Enabled | Disabled | Enabled | Disabled |
| ... | ... | ... | ... | ... | ... | ... | ... |

In Table 5, an access scheme that is currently being used is marked with "Enabled" and an access scheme that is currently not being used is marked with "Disabled." As shown in Table 5 above, the status information can include information indicating each access scheme being used (Enabled) or not being used (Disabled). The information may be realized as bit flags.

Procedure in Which Capability Information is Used

Next, a procedure in which capability information is used will be described. As an example of the procedure, the procedure of handover and the procedure of admission control using capability information will be described. As will be described below, the communication control device 100 or the base station 200 uses capability information of the terminal device 300 in the procedure of handover of the terminal device 300 or the procedure of admission control. In addition, the communication control device 100 or the base station 200 further uses capability information of the base station 200 that is a handover destination candidate in the procedure of handover of the terminal device 300 or the procedure of admission control.

Figure 34:
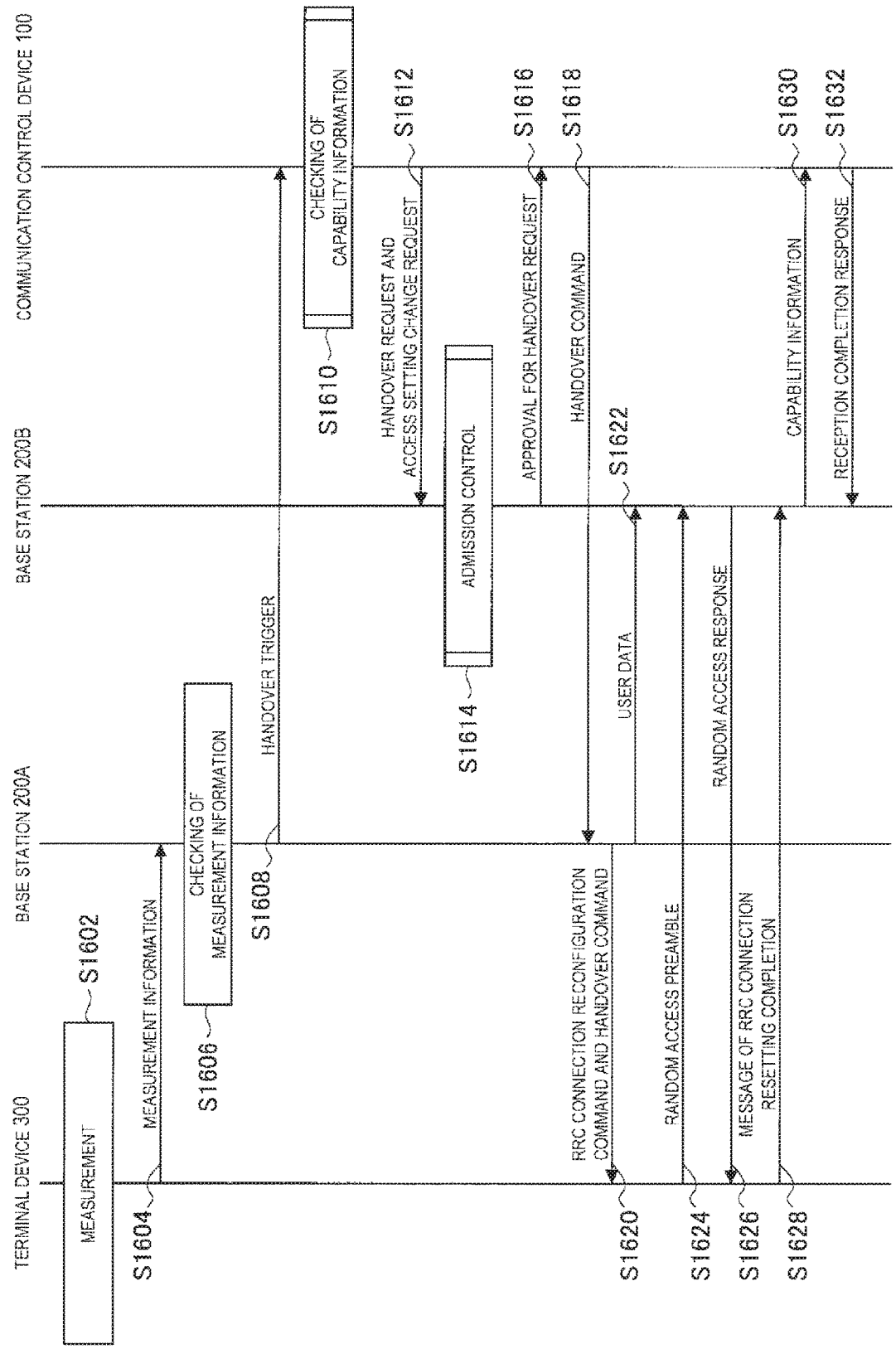
FIG. 34 is a sequence diagram showing an example of the flow of a handover process executed in the communication system according to the embodiment.

FIG. 34 is a sequence diagram showing an example of the flow of a handover process executed in the communication system 1 according to the present embodiment. As shown in FIG. 34, the terminal device 300, base stations 200A and 200B, and the communication control device 100 are involved in the present sequence. Note that the base station 200A is a base station serving as a handover source (for example, a source eNB), and the base station 200B is a base station serving as a handover destination candidate (for example, a target eNB).

First, in Step S1602, the terminal device 300 performs measurement. For example, the terminal device 300 receives, for example, a predetermined reference signal, broadcast signal, synchronizing signal, or the like periodically transmitted from the base station 200. At this time, the terminal device 300 measures a signal intensity (for example, Reference Signal Received Power (RSRP), Received Signal Strength. Indicator (RSSI), or the like), signal quality (for example, Reference Signal Received Quality (RSRQ), and the like), and the like.

Next, in Step S1604, the terminal device 300 transmits the measurement information to the base station 200A to which the device is being connected or which is operating a cell to which the device belongs. The terminal device 300 performs the transmission in a periodic manner or according to an instruction from the base station 200A.

Next, in Step S1606, the base station 200A checks the measurement information. For example, when the measurement information meets a predetermined condition, the base station 200A starts a process of checking feasibility of handover that will be described below.

Next, in Step S1608, the base station 200A transmits a handover trigger (Handover Required) to the communication control device 100.

Next, in Step S1610, the communication control device 100 checks the capability information. For example, when the communication control device 100 collates the capability information of the terminal device 300 and a base station 200 relating to handover of the terminal device 300 and the information meets a predetermined condition, the communication control device starts a process of transiting to execution of handover that will be described below. In addition to the capability information, the communication control device 100 may refer to status information of the base station 200 relating, to the handover. As the base station 200 relating to the handover, the base station 200A that is a handover source to which the terminal device 300 currently belongs and the base station 200B which is a handover destination candidate operating a cell. Note that details of the process of this step will be described below.

Next, in Step S1612, the communication control device 100 transmits a handover request (Handover Request) to the base station 200B which is a handover destination candidate. Further, when an access setting allocated to the base station 200B is to be changed, the communication control device 100 transmits an access setting change request which is a message indicating a change of allocation of the access setting to the base station 200B. For example, the communication control device 100 can change the access setting so that the access setting, which is usable by the terminal device 300 but is not currently being used by the base station 200B, can be newly used. The access setting change request can include, for example, post-change access setting information. The base station 200B can know an access scheme and resources to start using and an access scheme and resources to stop using, by referring to the access setting change request.

Next, in Step S1614, the base station 200B performs admission control (Admission Control). For example, the base station 200B determines whether or not acceptance of handover and a change of the access setting are possible. At this time, the base station 200B can determine the possibility of handover according to the result of the change possibility determination of the access setting. Note that details of the process of this step will be described below. When the base station 200B determines acceptance of handover and a change of the access setting to be possible, for example, the base station starts a process of executing handover that will be described below.

The communication control device 100 receives a message indicating the result of the change possibility determination of the access setting of the base station 200B that is for the access setting change request. For example, when acceptance of handover and the change of the access setting are determined to be possible, for example, the base station 200B transmits a message indicating approval for the handover request to the communication control device 100 in Step S1616. The message indicating approval for the handover request may also serve as a message indicating approval for the access setting change request.

Next, in Step S1618, the communication control device 100 transmits a handover command (Handover Command) to the base station 200A.

Next, in Step S1620, the base station 200 transmits a handover command and an RRC connection resetting command (RRC connection reconfiguration) to the terminal device 300.

Here, if the base station 200A supports so-called seamless handover and data remains to be transmitted and received, the base station 200A transfers the remaining data to the base station 200B in Step S1622.

Next, in Step S1624 the terminal device 300 transmits a random access preamble to the base station 200B. The base station 200B which has succeeded in receiving the random access preamble transmits a random access response to the terminal device 300 in Step S1626. Next, in Step S1628, the terminal device 300 performs a resetting of RRC connection (RRC connection reconfiguration), and transmits a message of RRC connection resetting completion (RRC connection reconfiguration complete) to the base station 200B. Accordingly, handover is completed, and continuation of the communication service starts.

As described above, the terminal device 300 may transmit a message dedicated to notifying the base station 200B of capability information. In addition, the terminal device 300 may include capability information in at least any of the random access preamble and the message of RRC connection resetting completion. Note that when a base station 200 manages capability information, it is desirable that notification of the capability information be made each time a connection destination of the terminal device 300 changes, i.e., each time handover occurs.

Next, in Step S1630, the base station 200B transmits the capability information received from the terminal device 300 to the communication control device 100. In addition, the base station 200B may transmit its own capability information and status information to the communication control device 100.

Next, in Step S1632, the communication control device 100 transmits a reception completion response to the base station 200B.

Although the example in which the communication control device 100 checks the capability information in Step S1610 has been described above, the present technology is not limited thereto. For example, a base station 200 may check the capability information. In addition, although the example in which the base station 200B performs admission control in Step S1614 has been described above, the present technology is not limited thereto. For example, the communication control device 100 may perform admission control. As, an example, a case in which a base station 200 checks capability information will be described with reference to FIG. 35.

Figure 35:
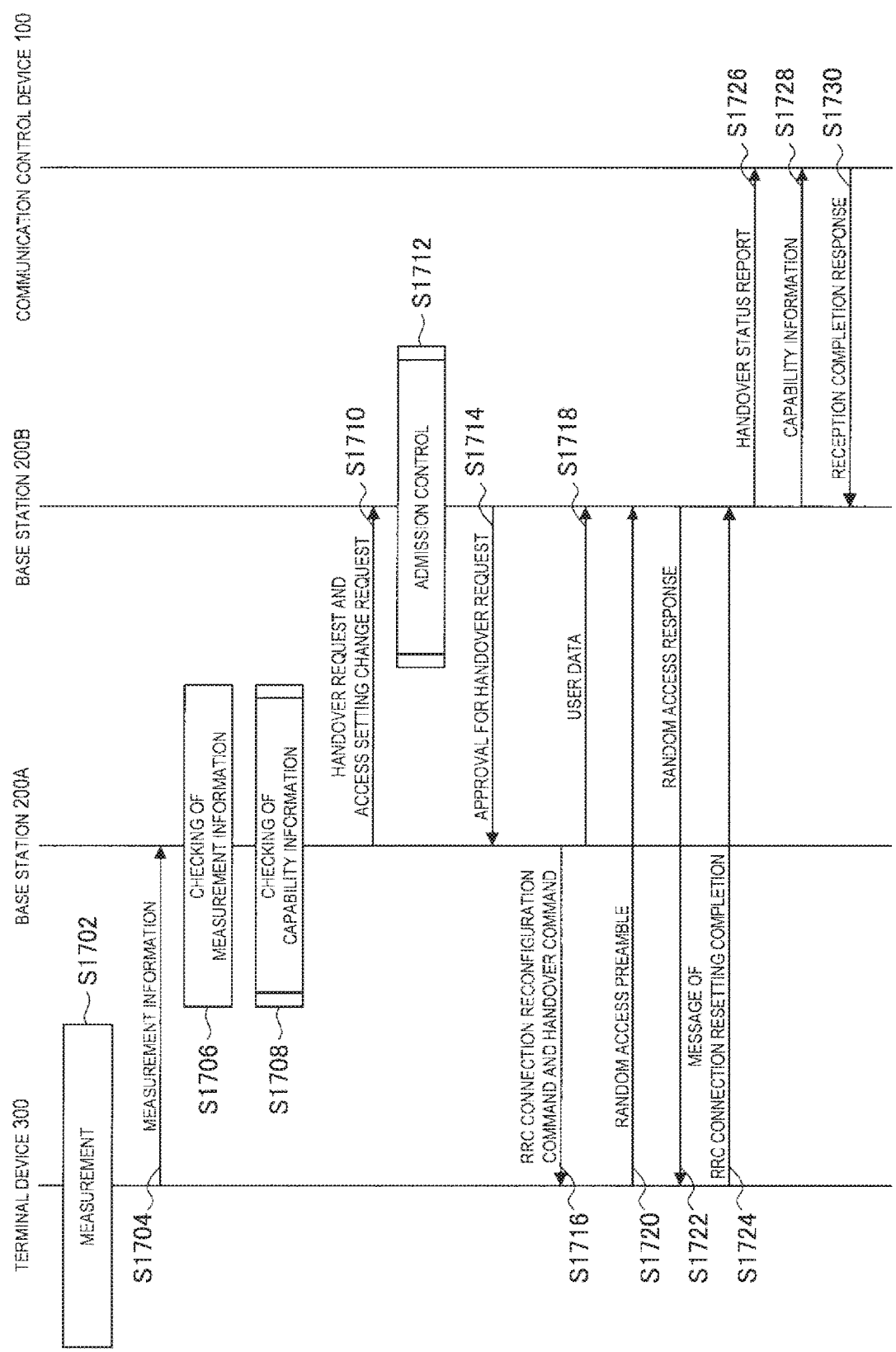
FIG. 35 is a sequence diagram showing an example of the flow of a handover process executed in the communication system according to the embodiment.

FIG. 35 is a sequence diagram showing an example of the flow of a handover process executed in the communication system 1 according to the present embodiment. As shown in FIG. 35, the terminal device 300, base stations 200A and 200B, and the communication control device 100 are involved in the present sequence. Note that the base station 200A is a base station serving as a handover source (for example, a source eNB), and the base station 200B is a base station serving as a handover destination candidate (for example, a target eNB).

First, in Step S1702, the terminal device 300 performs measurement. Next, in Step S1704, the terminal device 300 transmits measurement information to the base station 200A. Next, in Step S1706, the base station 200A checks the measurement information.

Then, in Step S1708, the base station 200A checks capability information. The base station 200A may refer to status information of a base stations 200 relating to handover, in addition to the capability information.

Next, in Step S1710, the base station 200A transmits a handover request to the base station 200B serving as a handover destination candidate. Further, the base station 200A transmits an access setting change request to the base station 200B when a change of an access setting is to be requested.

Next, in Step S1712, the base station 200B performs admission control. When acceptance of handover and a change of an access setting are determined to be possible, the base station 200B transmits a message indicating approval for the handover request to the base station 200A in Step S1714. Since the processes of the following Steps S1716 to S1724, S1728, and S1730 are the same as those of Steps S1620 to S1632 described with reference to FIG. 34, description thereof will be omitted herein. In addition to the processes of Steps S1620 to S1632 described with reference to FIG. 34, the base station 200B transmits a handover status report indicating a handover result to the communication control device 100 in Step S1726.

Although the example in which the predetermined condition is determined to be met through checking of capability information and the process of transiting to execution of handover is started has been describe in FIGS. 34 and 35 above, the converse example will be described below.

Figure 36:
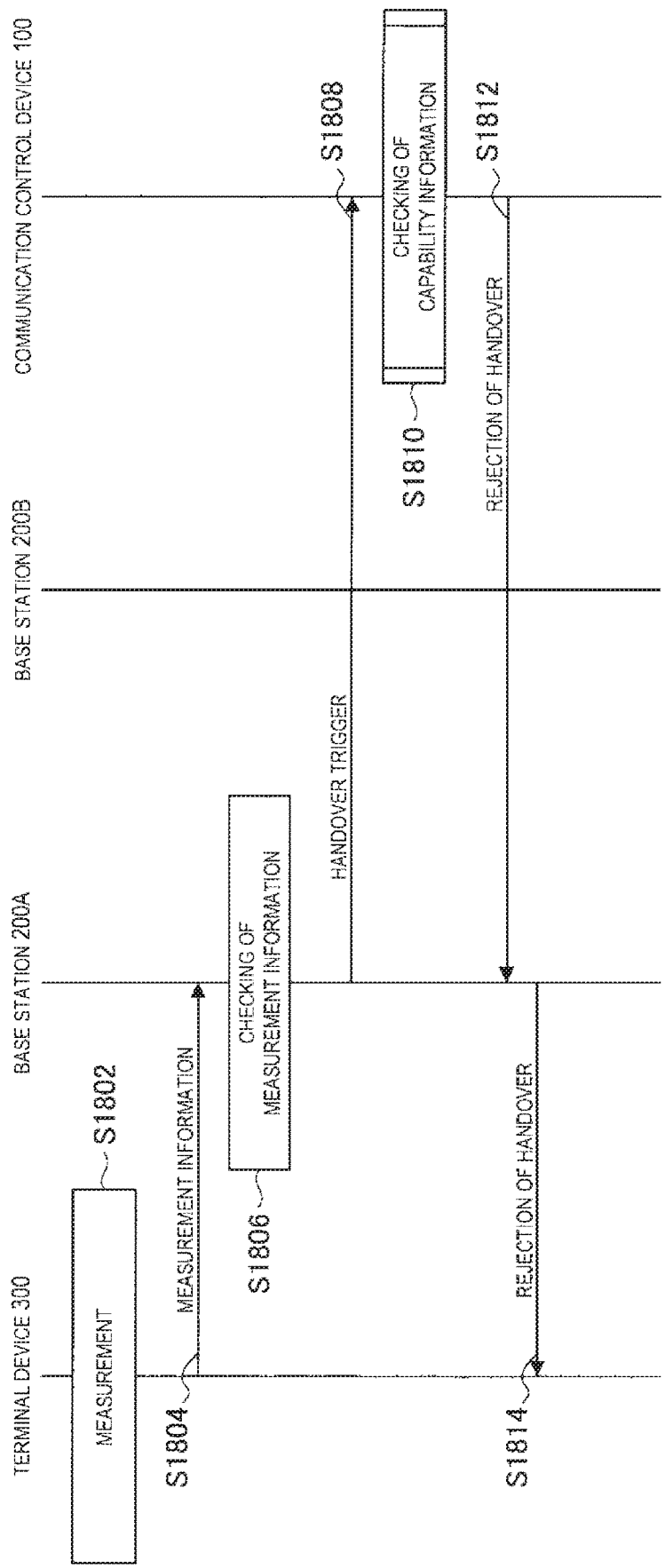
FIG. 36 is a sequence diagram showing an example of the flow of a handover process executed in the communication system according to the embodiment.

FIG. 36 is a sequence diagram showing an example of the flow of a handover process executed in the communication system 1 according to the present embodiment. As shown in FIG. 36, the terminal device 300, the base stations 200A and 200B, and the communication control device 100 are involved in the present sequence. The present sequence corresponds to the sequence shown in FIG. 34.

Since the processes of Steps S1802 to S1810 are the same as those of Steps S1602 to S1610 described with reference to FIG. 34, description thereof will be omitted. Upon determining a predetermined condition not to be met as a result of checking capability information in Step S1810, the communication control device 100 starts a process of rejecting handover that will be described below. For example, when access schemes and resources with which the terminal device 300 is compatible do not overlap access schemes and resources with which the base station 200B is compatible, the communication control device 100 starts the process of rejecting handover.

In Step S1812, the communication control device 100 first transmits a message indicating rejection of handover to the base station 200A. The base station 200A which has received the message does not transmit a handover command to the terminal device 300. Instead, the base station 200A may transmit, for example, a message indicating rejection of handover to the terminal device 300 in Step S1814.

Figure 37:
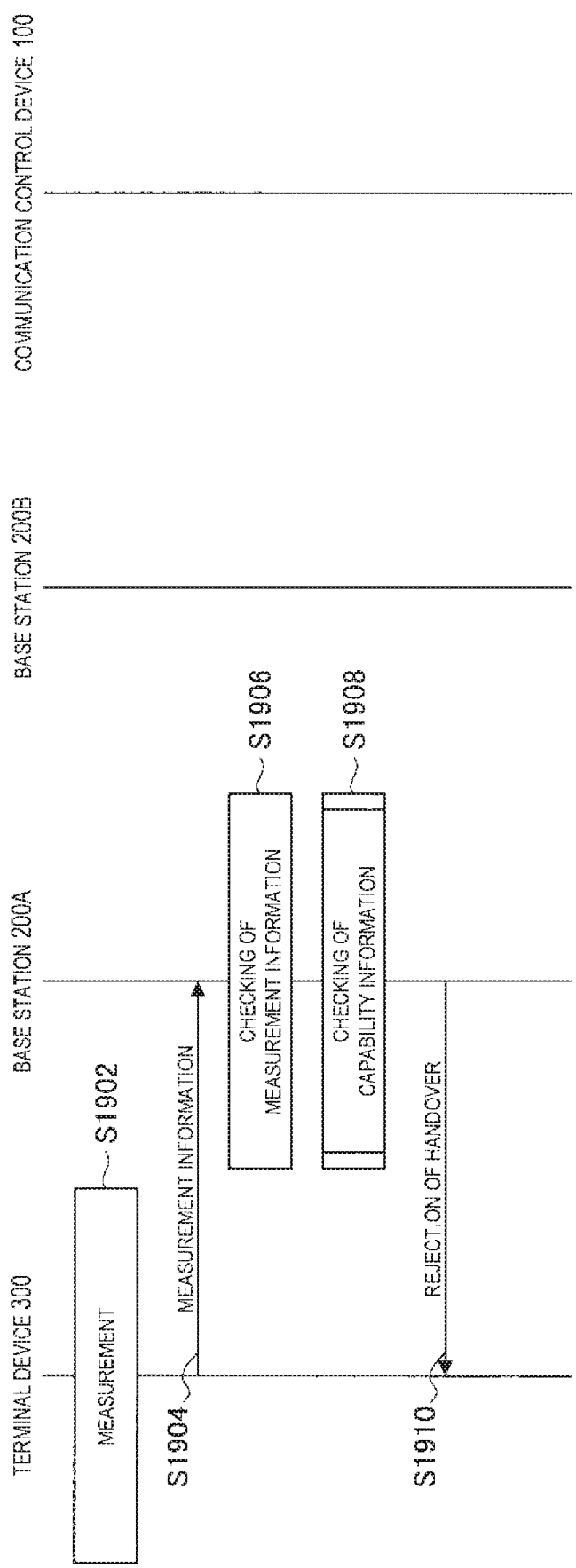
FIG. 37 is a sequence diagram showing an example of the flow of a handover process executed in the communication system according to the embodiment.

FIG. 37 is a sequence diagram showing an example of the flow of a handover process executed in the communication system 1 according to the present embodiment. As shown in FIG. 37, the terminal device 300 and the base station 200A are involved in the present sequence. The present sequence corresponds to the sequence shown in FIG. 35.

Since the processes of Steps S1902 to S1908 are the same as those of Steps S1702 to S1708 described with reference to FIG. 35, description thereof will be omitted. Upon determining a predetermined condition not to be met as a result of checking capability information in Step S1908, the base station 200A rejects handover. For example, the base station 200A does not transmit a handover command to the terminal device 300. Instead, the base station 200A may transmit, for example, a message indicating rejection of handover to the terminal device 300 in Step S1910.

In addition, although the example in which the acceptance of handover and a change of an access setting are determined to be possible and the process of transiting to execution of handover is started in admission control has been describe in FIGS. 34 and 35 above, the converse example will be described below.

Figure 38:
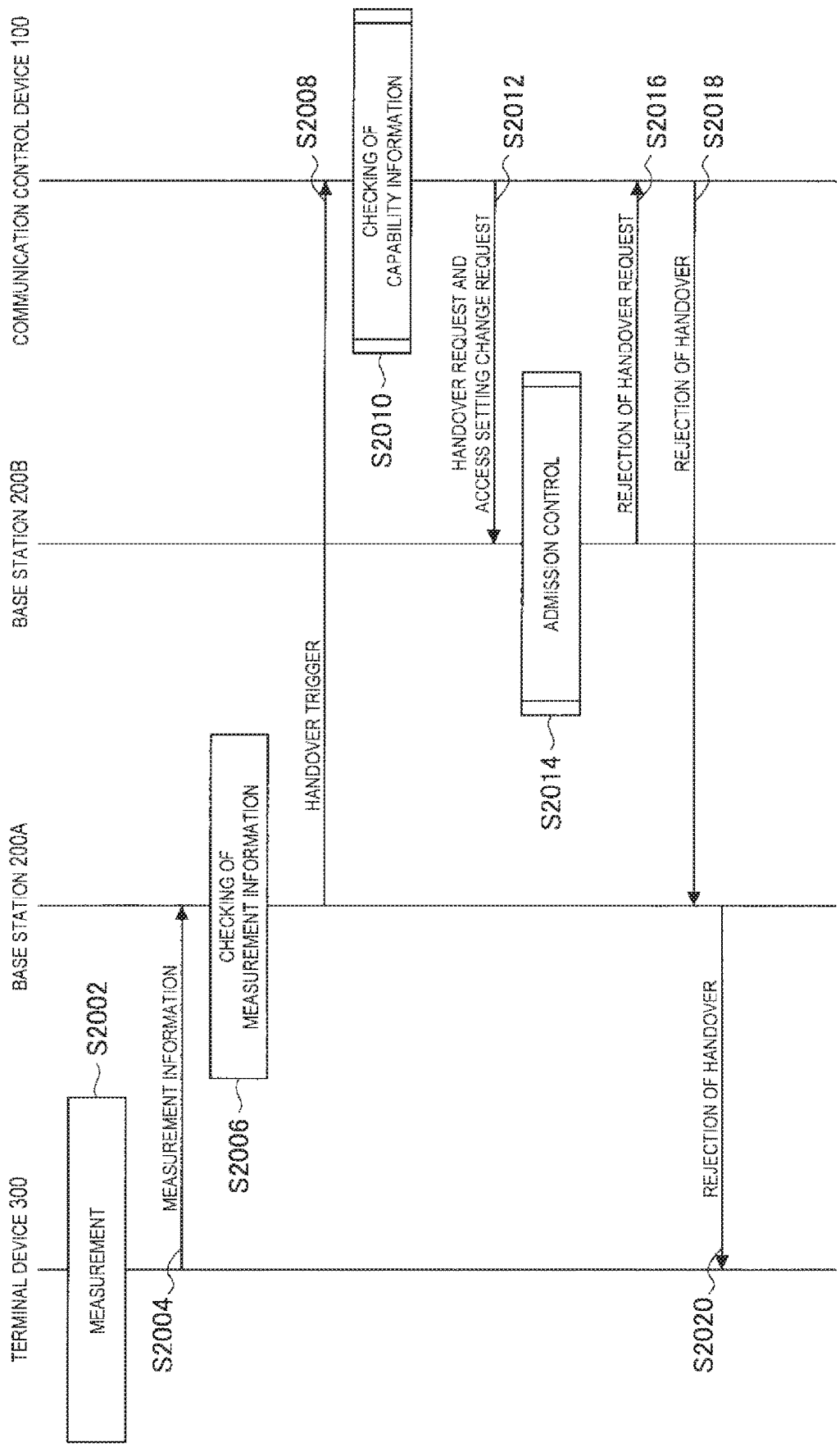
FIG. 38 is a sequence diagram showing an example of the flow of a handover process executed in the communication system according to the embodiment.

FIG. 38 is a sequence diagram showing an example of the flow of a handover process executed in the communication system 1 according to the present embodiment. As shown in FIG. 36, the terminal device 300, the base stations 200A and 200B, and the communication control device 100 are involved in the present sequence. The present sequence corresponds to the sequence shown in FIG. 38.

Since the processes of Steps S2002 to S2014 are the same as those of Steps S1602 to S1614 described with reference to FIG. 34, description thereof will be omitted. When the base station 200B determines acceptance of handover and a change of an access setting are not possible in admission control of Step S2014, the base station starts a process of rejecting handover to be described below.

In Step S2016, the base station 200B first transmits a message indicating rejection of the handover request to the communication control device 100. The message indicating rejection of the handover request also serves as a message indicating rejection of the access setting change request. Then, in Steps S2018 and S2020, the same processes as those of Steps S1812 and S1814 described with reference to FIG. 36 are performed.

Figure 39:
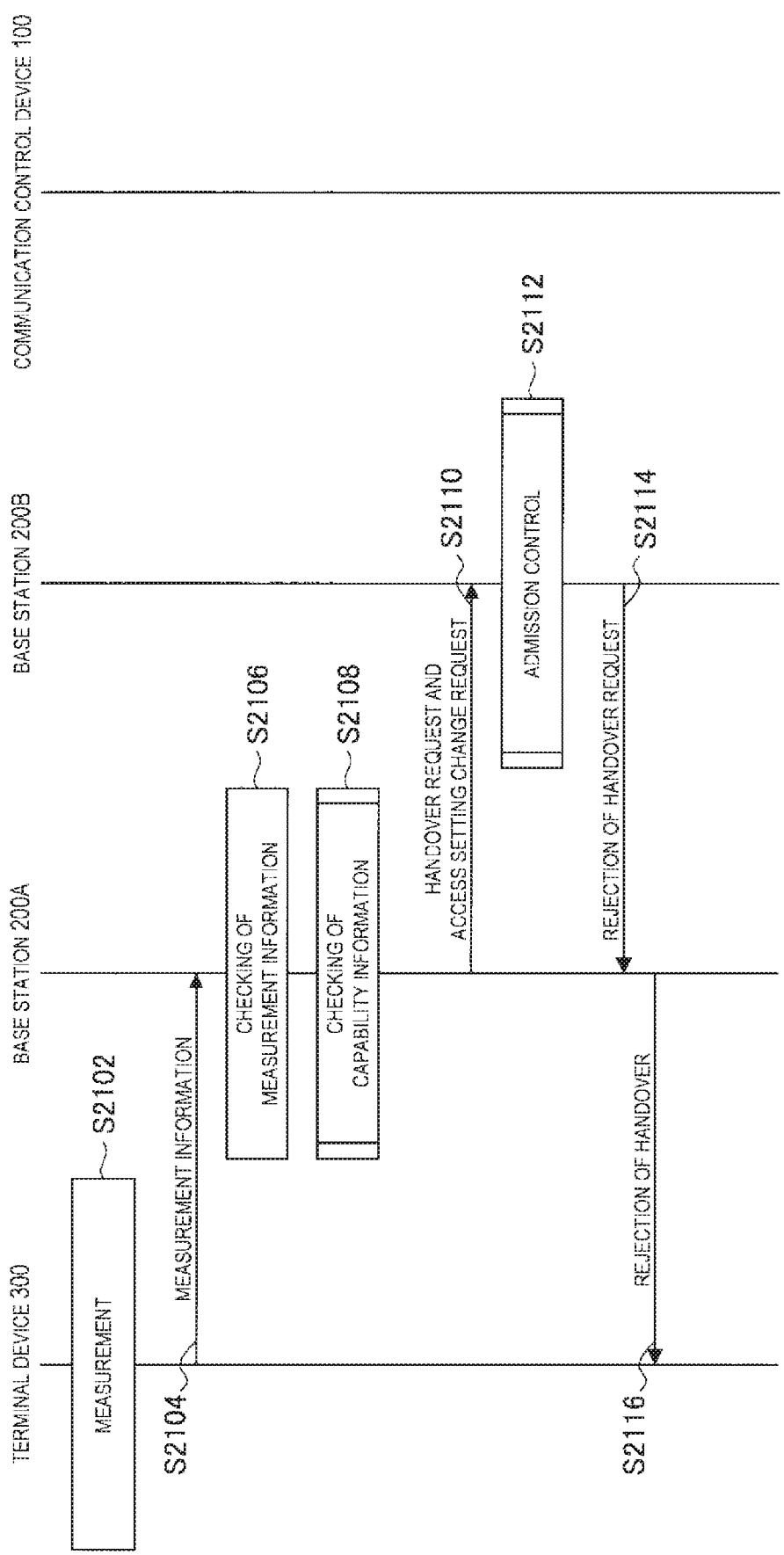
FIG. 39 is a sequence diagram showing an example of the flow of a handover process executed in the communication system according to the embodiment.

FIG. 39 is a sequence diagram showing an example of the flow of a handover process executed in the communication system 1 according to the present embodiment. As shown in FIG. 39, the terminal device 300 and the base stations 200A and 200B are involved in the present sequence. The present sequence corresponds to the sequence shown in FIG. 35.

Since the processes of Steps S2102 to S2112 are the same as those of Steps S1702 to S1712 described with reference to FIG. 35, description thereof will be omitted. When the base station 200B determines acceptance of handover and a change of an access setting are not possible in admission control of Step S2112, the base station starts a process of rejecting handover to be described below.

First, in Step S2114, the base station 200B transmits a message indicating rejection of the handover request to the base station 200A. Then, in Step S2116, the same process as that of Step S1910 described with reference to FIG. 37 is performed.

Details of the processes of checking capability information and admission control described in FIGS. 34 to 39 will be described below.

Figure 40:
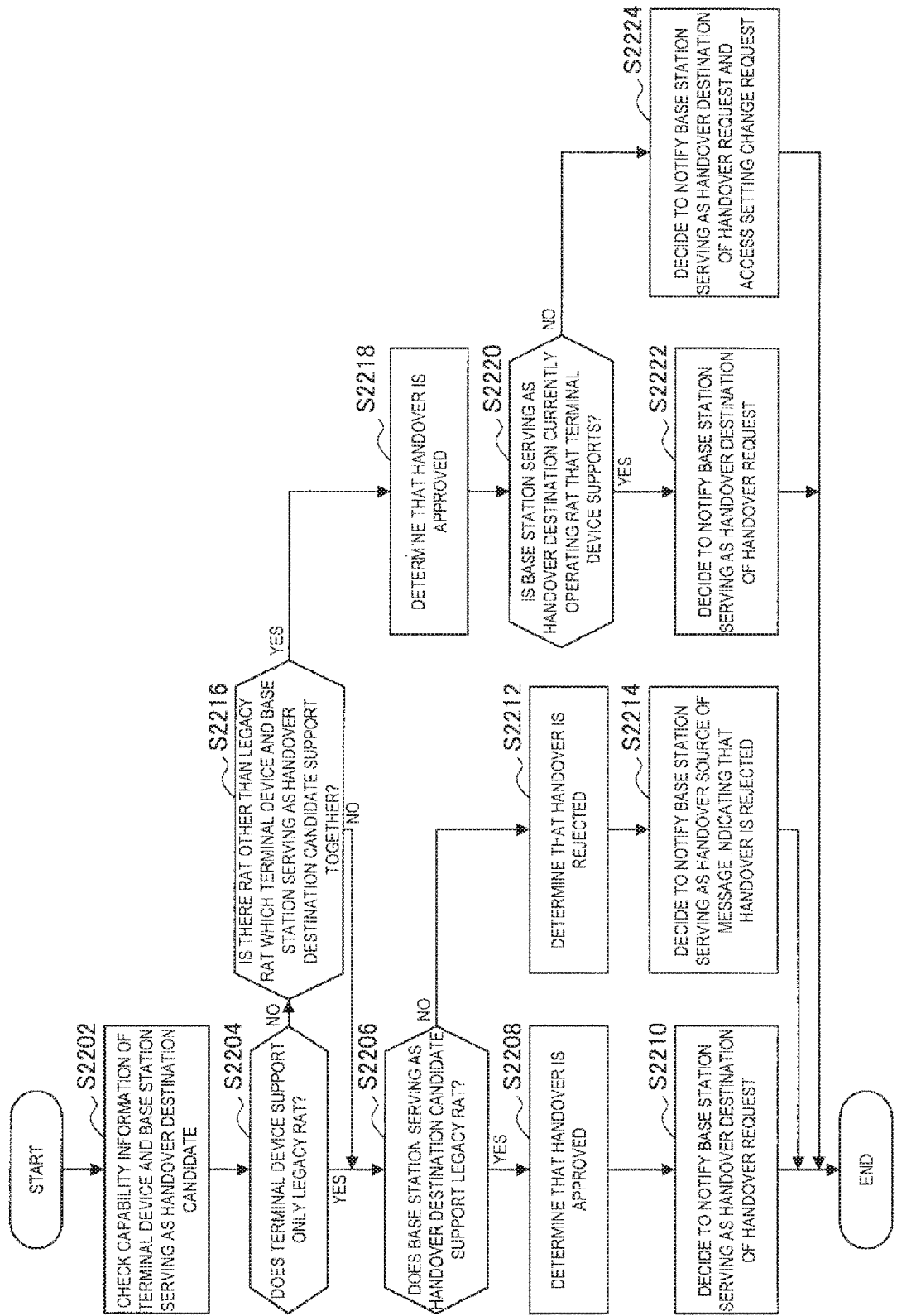
FIG. 40 is a flowchart showing an example of the flow of a capability information confirmation process executed in the communication control device according to the embodiment.

FIG. 40 is a flowchart showing an example of the flow of the capability information checking process executed by the communication control device 100 according to the present embodiment. Note that, as described above, a base station 200 can also check capability information. In this case, the base station 200 is assumed to perform the same process as that described below.

As shown in FIG. 40, first, the control unit 130 checks capability information of the terminal device 300 and the base station 200 that is a handover destination candidate in Step S2202.

When the terminal device 300 supports only a legacy RAT (Yes in S2204), the control unit 130 determines in Step S2206 whether or not the base station 200 serving as a handover destination candidate supports the legacy RAT. When the terminal device 300 supports others rather than the legacy RAT (No in S2204) and there is no RAT other than the legacy RAT which is supported by the terminal device 300 and the base station 200 serving as a handover destination candidate together (No in S2216), the control unit 130 performs the same determination.

When the base station 200 serving as a handover destination candidate supports the legacy RAT. (Yes in S2206), the control unit 130 determines that handover is approved in Step S2208. Then, in Step S2210 the control unit 130 decides to notify the base station 200 serving as a handover destination of a handover request.

On the other hand, when the base station 200 serving as a handover destination candidate does not support the legacy RAT (No in S2206), the control unit 130 determines that handover is rejected in Step S2212. Then, in Step S2214, the control unit 130 decides to notify a base station 200 serving as a handover source of a message indicating that handover is rejected.

In addition, when the terminal device 300 does not support only the legacy RAT (No in S2204) and there is an RAT other than the legacy RAT which is supported by the terminal device 300 and the base station 200 serving as a handover destination candidate together (Yes in S2216), the control unit 130 determines that handover is approved in Step S2218, Then, in Step S2220, the control unit 130 determines whether or not the base station 200 serving as a handover destination is currently operating an RAT that the terminal device 300 supports with reference to status information of the base station 200.

When the base station is determined to be currently operating the RAT (Yes in S2220), the control unit 130 decides to notify the base station 200 serving as a handover destination of a handover request.

On the other hand, when the base station is determined not to be currently operating the RAT (No in S2220), the control unit 130 decides to notify the base station 200 serving as a handover destination of a handover request and an access setting change request.

Figure 41:
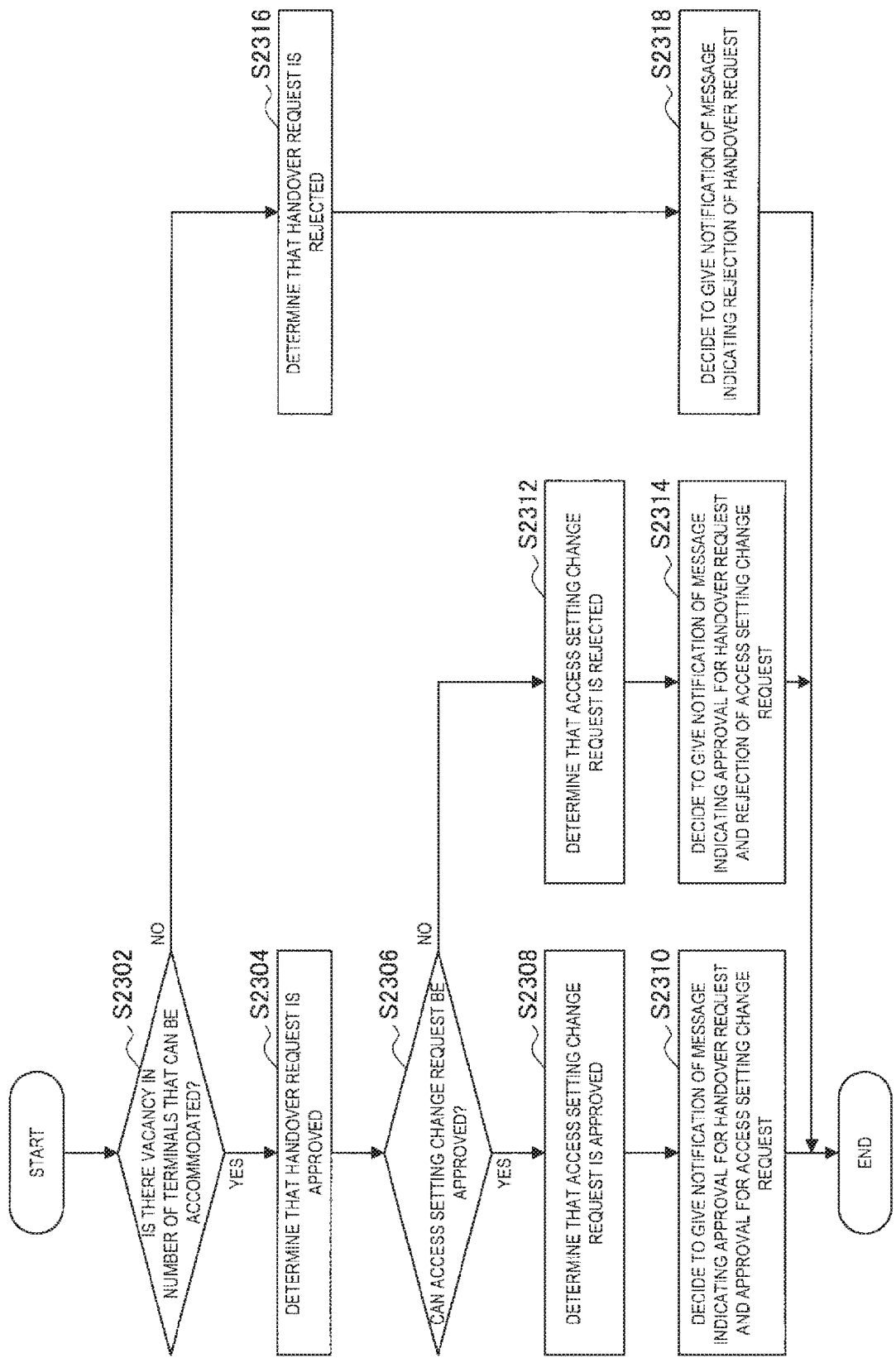
FIG. 41 is a flowchart showing an example of the flow of an admission control process executed in the base station according to the embodiment.

FIG. 41 is a flowchart showing an example of the flow of the admission control process executed in the base station 200 according to the present embodiment.

As shown in FIG. 41, the control unit 240 first determines whether or not there is a vacancy for the number of terminals that can be accommodated in a cell that the base station operates.

When it is determined that there is a vacancy (Yes in S2302), the control unit 240 determines that a handover request is approved in Step S2304.

Next, in Step S2306, the control unit 240 determines whether or not an access setting change request can be approved. For example, the control unit 240 determines whether or not the request can be approved, taking influence of other terminal device 300 that have already been connecting to its own cell when an access scheme to be used in its own cell is changed according to the access setting change request and resources to be used in the access scheme used in its own cell are changed into consideration. Note that, when the base station 200 has not received the access setting change request, the present step may be skipped.

When the request is determined to be approved (Yes in S2306), the control unit 240 determines that the access setting change request is approved in Step S2308. Then, in Step S2310, the control unit 240 decides to give notification of the approval for the handover request and the approval for the access setting change request. The control unit 240 may give the notification by including the approval for the handover request and the approval for the access setting change request in one message, or using separate messages.

On the other hand, when the request is determined not to be approved (No, in S2306), the control unit 240 determines that the access setting change request is rejected in Step S2312. Then, in Step S2314, the control unit 240 decides to give notification of a message indicating the approval for the handover request and rejection of the access setting change request. The control unit 240 may give the notification by including the approval for the handover request and rejection of the access setting change request in one message, or using separate messages.

In addition, when it is determined that there is no vacancy in the number of terminals that can be accommodated in the cell that the base station operates (No in S2302), the control unit 240 determines that the handover request is rejected in Step S2316. Then, in Step S2318, the control unit 240 decides to give notification of a message indicating rejection of the handover request.

4. Application Examples

The technology of the present disclosure is applicable to various products. For example, the communication control device 100 may be realized as any type of server such as a tower server, a rack server, and a blade server. At least a part of elements of the communication control device 100 may be realized in a module (such as an integrated circuit module including a single die, and a card or a blade that is inserted into a slot of a blade server) mounted on a server.

For example, a base station 200 may be realized as any type of evolved Node B (eNB) such as a macro eNB, and a small eNB. A small eNB may be an eNB that covers a cell smaller than a macro cell, such as a pico eNB, micro eNB, or home (femto) eNB. Instead, the base station 200 may be realized as any other types of base stations such as a NodeB and a base transceiver station (BTS). The base station 200 may include a main body (that is also referred to as a base station device) configured to control radio communication, and one or more remote radio heads (RRH) disposed in a different place from the main body. Additionally, various types of terminals to be discussed later may also operate as the base station 100 by temporarily or semi-permanently executing a base station function. Furthermore, at least some of constituent elements of the base station 200 may be realized in the base station device or a module for a base station device.

For example, a terminal device 300 may be realized as a mobile terminal such as a smartphone, a tablet personal computer (PC), a notebook PC, a portable game terminal, a portable/dongle type mobile router, and a digital camera, or an in-vehicle terminal such as a car navigation device. The terminal device 300 may also be realized as a terminal (that is also referred to as a machine type communication (MTC) terminal) that performs machine-to-machine (M2M) communication. Furthermore, at least a part of elements of the terminal device 300 may be realized in a module (such as an integrated circuit module including a single die) mounted on each of the terminals.

4.1. Application Example Regarding a Communication Control Device

Figure 42:
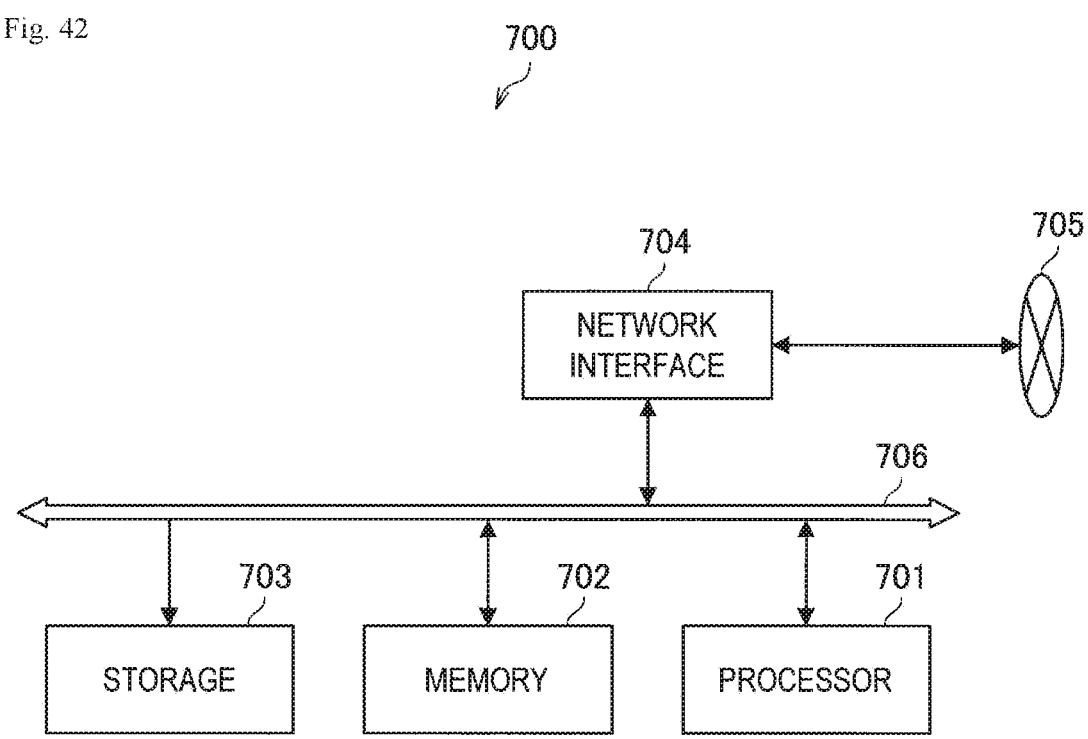
FIG. 42 is a block diagram illustrating an example of a schematic configuration of a server.

FIG. 42 is a block diagram illustrating an example of a schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls functions of the server 700. The memory 702 includes random access memory (RAM) and read only memory (ROM), and stores a program that is executed by the processor 701 and data. The storage 703 may include a storage medium such as a semiconductor memory and a hard disk.

The network interface 704 is a wired communication interface for connecting the server 700 to a wired communication network 705. The wired communication network 705 may be a core network such as an Evolved Packet Core (EPC), or a packet data network (PDN) such as the Internet.

The bus 706 connects the processor 701, the memory 702, the storage 703, and the network interface 704 to each other. The bus 706 may include two or more buses (such as a high speed bus and a low speed bus) each of which has different speed.

In the server 700 shown in FIG. 42, the communication unit 110, the storage unit 120, and the control unit 130 described with reference to FIG. 6 may be implemented by the processor 701. As an example, a program for causing the processor to function as the communication unit 110, the storage unit 120, and the control unit 130 (i.e., a program for causing, the processor to execute the operations of the communication unit 110, the storage unit 120, and the control unit 130) may be installed in the server 700, and the processor 701 may execute the program. As another example, a module which includes the processor 701 and the memory 702 may be mounted in the server 700 and the module may implement the communication unit 110, the storage unit 120, and the control unit 130. In this case, this module may store a program causing the processor to function as the communication unit 110, the storage unit 120, and the control unit 130 in the memory 702, and set the processor 701 to execute this program. As described above, the server 700 or the module may be provided as a device which includes the communication unit 110, the storage unit 120, and the control unit 130, and the program may be provided for causing the processor to function as the communication unit 110, the storage unit 120, and the control unit 130. In addition, a readable recording medium in which the program is recorded may be provided.

4.2. Application Examples Regarding Base Stations

First Application Example

Figure 43:
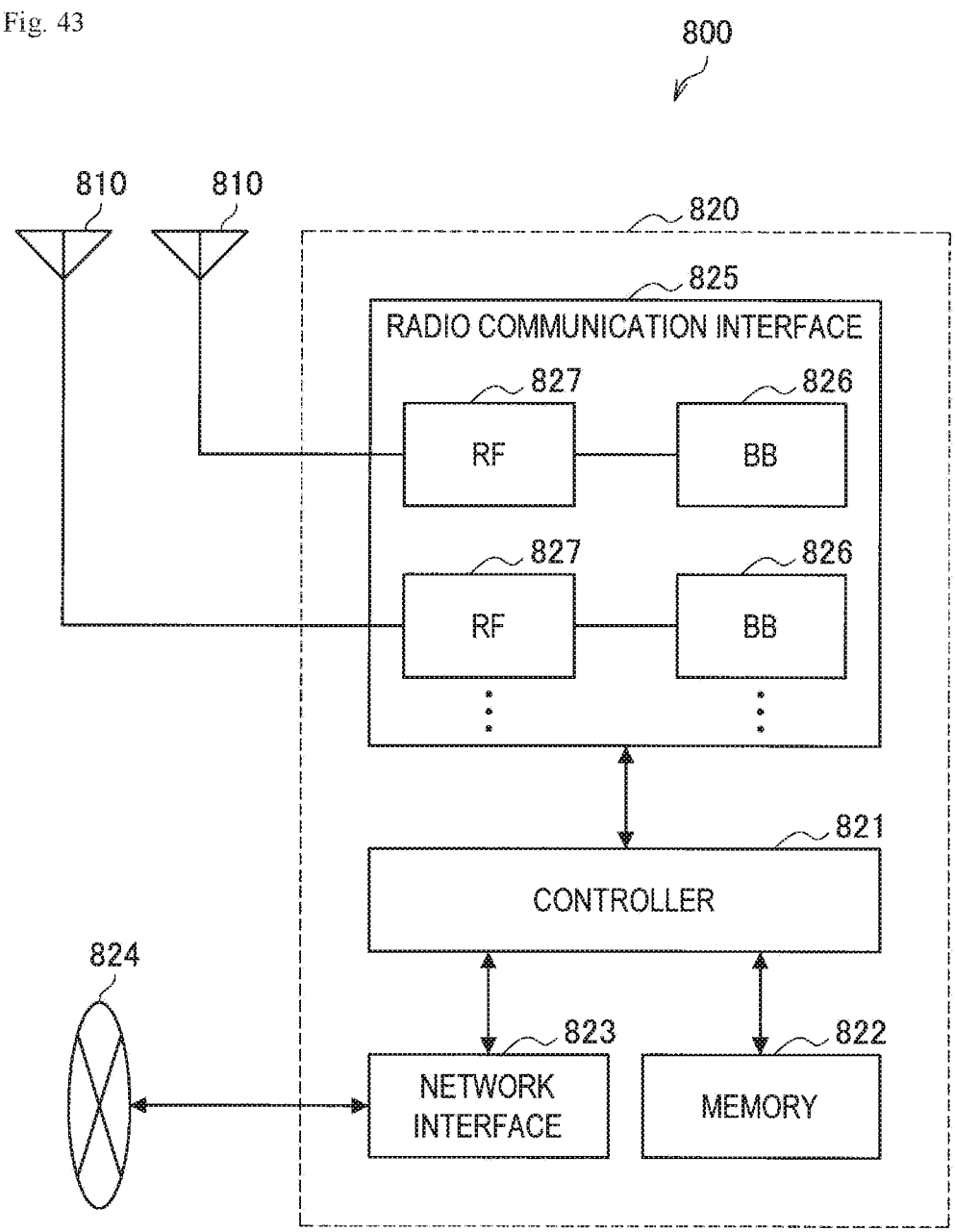
FIG. 43 is a block diagram illustrating a first example of a schematic configuration of an eNB.

FIG. 43 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 43. For example, the multiple antennas 810 may be compatible with multiple frequency bands used by the eNB 800. Although FIG. 43 illustrates the example in which the eNB 800 includes the multiple antennas 810, the eNB 800 may also include a single antenna 810.

The base station device 820 includes a controller 821, a memory 822, a network interface 823, and a radio communication interface 825.

The controller 821 may be, for example, a CPU or a DSP, and operates various functions of a higher layer of the base station device 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related'circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 43. For example, the multiple BB processors 826 may be compatible with multiple frequency bands used by the eNB 800. The radio communication interface 825 may include the multiple RF circuits 827, as illustrated in FIG. 43. For example, the multiple RF circuits 827 may be compatible with multiple antenna elements. Although FIG. 43 illustrates the example in which the radio communication interface 825 includes the multiple BB processors 826 and the multiple RF circuits 827, the radio communication interface 825 may also include a single BB processor 826 or a single RF circuit 827.

In the eNB 800 shown in FIG. 43, the radio communication unit 210, the network communication unit 220, the storage unit 230, and the control unit 240 described with reference to FIG. 7 may be implemented by the radio communication interface 825. Alternatively, at least some of these constituent elements may be implemented by the controller 821. As an example, a module which includes a part (for example, the BB processor 826) or all of the radio communication interface 825 and/or the controller 821 may be mounted in eNB 800, and the radio communication unit 210, the network communication unit 220, the storage unit 230, and the control unit 240 may be implemented by the module. In this case, the module may store a program for causing the processor to function as the radio communication unit 210, the network communication unit 220, the storage unit 230, and the control unit 240 (i.e., a program for causing the processor to execute operations of the radio communication unit 210, the network communication unit 220, the storage unit 230, and the control unit 24) and may execute the program. As another example, the program for causing the processor to function as the radio communication unit 210, the network communication unit 220, the storage unit 230, and the control unit 240 may be installed in the eNB 800, and the radio communication interface 825 (for example, the BB processor 826) and/or the controller 821 may execute the program. As described above, the eNB 800, the base station device 820, or the module may be provided as a device which includes the radio communication unit 210, the network communication unit 220, the storage unit 230, and the control unit 240, and the program for causing the processor to function as the radio communication unit 210, the network communication unit 220, the storage unit 230, and the control unit 240 may be provided. In addition, a readable recording medium in which the program is recorded may be provided.

In addition, in the eNB 800 shown in FIG. 43, the radio communication unit 210 described with reference to FIG. 7 may be implemented by the radio communication interface 825 (for example, the RF circuit 827). In addition, the network communication unit 220 may be implemented by the controller 821 and/or the network interface 823.

Second Application Example

Figure 44:
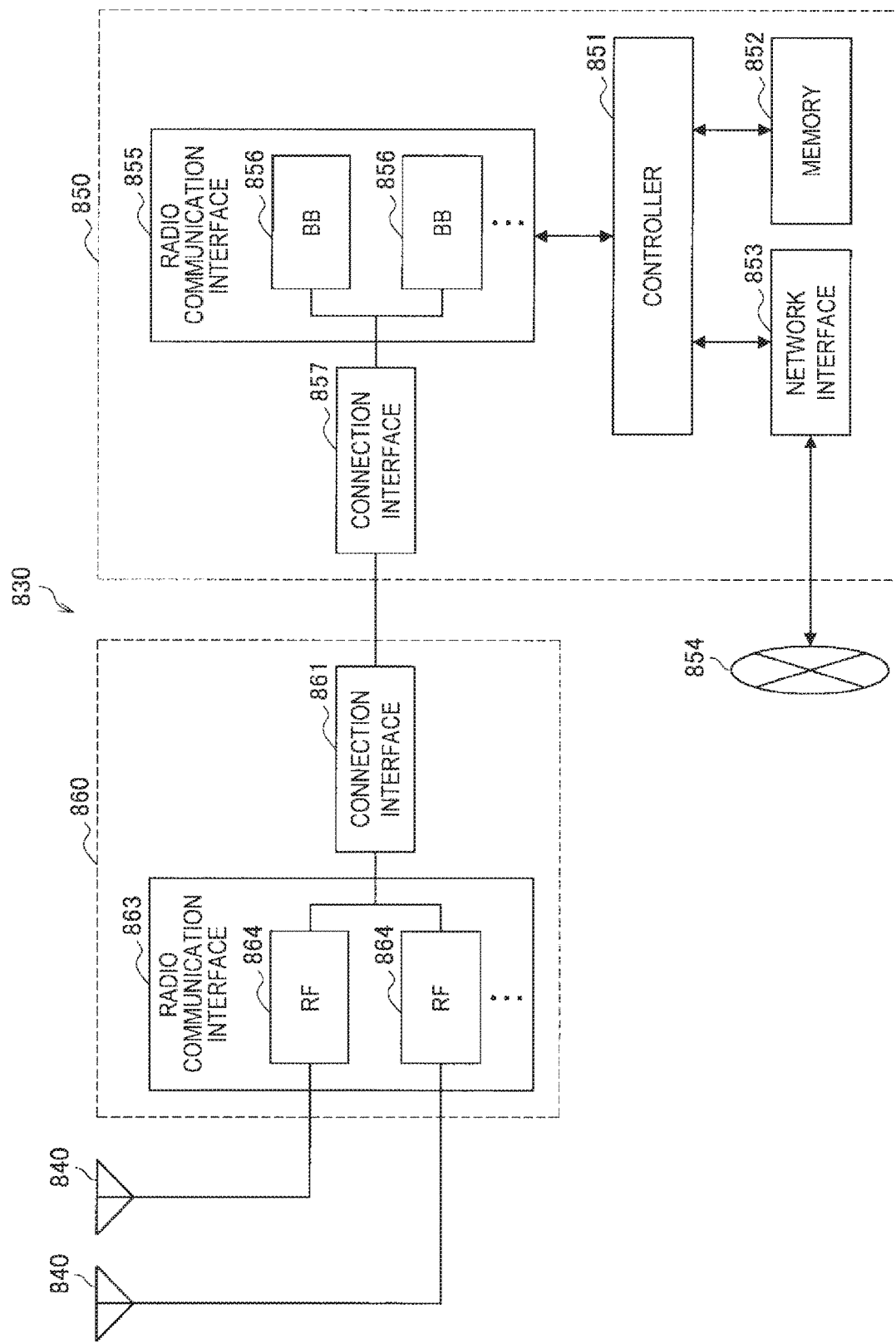
FIG. 44 is a block diagram illustrating a second example of the schematic configuration of the eNB.

FIG. 44 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station, device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 44. For example, the multiple antennas 840 may be compatible with multiple frequency bands used by the eNB 830. Although FIG. 44 illustrates the example in which the eNB 830 includes the multiple antennas 840, the eNB 830 may also include a single antenna 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 43.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 43, except the BB processor 856 is connected to the RF circuit 864 of the RRH 860 via the connection interface 857. The radio communication interface 855 may include the multiple BB processors 856, as illustrated in FIG. 44. For example, the multiple BB processors 856 may be compatible with multiple frequency bands used by the eNB 830. Although FIG. 44 illustrates the example in which the radio communication interface 855 includes the multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high speed line that connects the base station device 850 (radio communication interface 855) to the RRH 860.

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 44. For example, the multiple RF circuits 864 may support multiple antenna elements. Although FIG. 44 illustrates the example in which the radio communication interface 863 includes the multiple RF circuits 864, the radio communication interface 863 may also include a single RF circuit 864.

In the eNB 830 shown in FIG. 44, the radio communication unit 210, the network communication unit 220, the storage unit 230, and the control unit 240 described with reference to FIG. 7 may be implemented by the radio communication interface 855 and/or the radio communication interface 863. Alternatively, at least some of these constituent elements may be implemented by the controller 851. As an example, a module which includes a part (for example, the BB processor 856) or all of the radio communication interface 855 and/or the controller 851 may be mounted in eNB 830, and the radio communication unit 210, the network communication unit 220, the storage unit 230, and the control unit 240 may be implemented by the module. In this case, the module may store a program for causing the processor to function as the radio communication unit 210, the network communication unit 220, the storage unit 230, and the control unit 240 (i.e., a program for causing the processor to execute operations of the radio communication unit 210, the network communication unit 220, the storage unit 230 and the control unit 240) and may execute the program. As another example, the program for causing the processor to function as the radio communication unit 210, the network communication unit 220, the storage unit 230, and the control unit 240 may be installed in the eNB 830, and the radio communication interface 855 (for example, the BB processor 856) and/or the controller 851 may execute the program. As described above, the eNB 830, the base station device 850, or the module may be provided as a device which includes the radio communication unit 210, the network communication unit 220, the storage unit 230, and the control unit 240, and the program for causing the processor to function as the radio communication unit 210, the network communication unit 220, the storage unit 230, and the control unit 240 may be provided. In addition, a readable recording medium in which the program is recorded may be provided.

In addition, in the eNB 830 shown in FIG. 44, the radio communication unit 210 described, for example, with reference to FIG. 7 may be implemented by the radio communication interface 863 (for example, the RF circuit 864). In addition, the network communication unit 220 may be implemented by the controller 851 and/or the network interface 853.

4.3. Application Examples Regarding Terminal Devices

First Application Example

Figure 45:
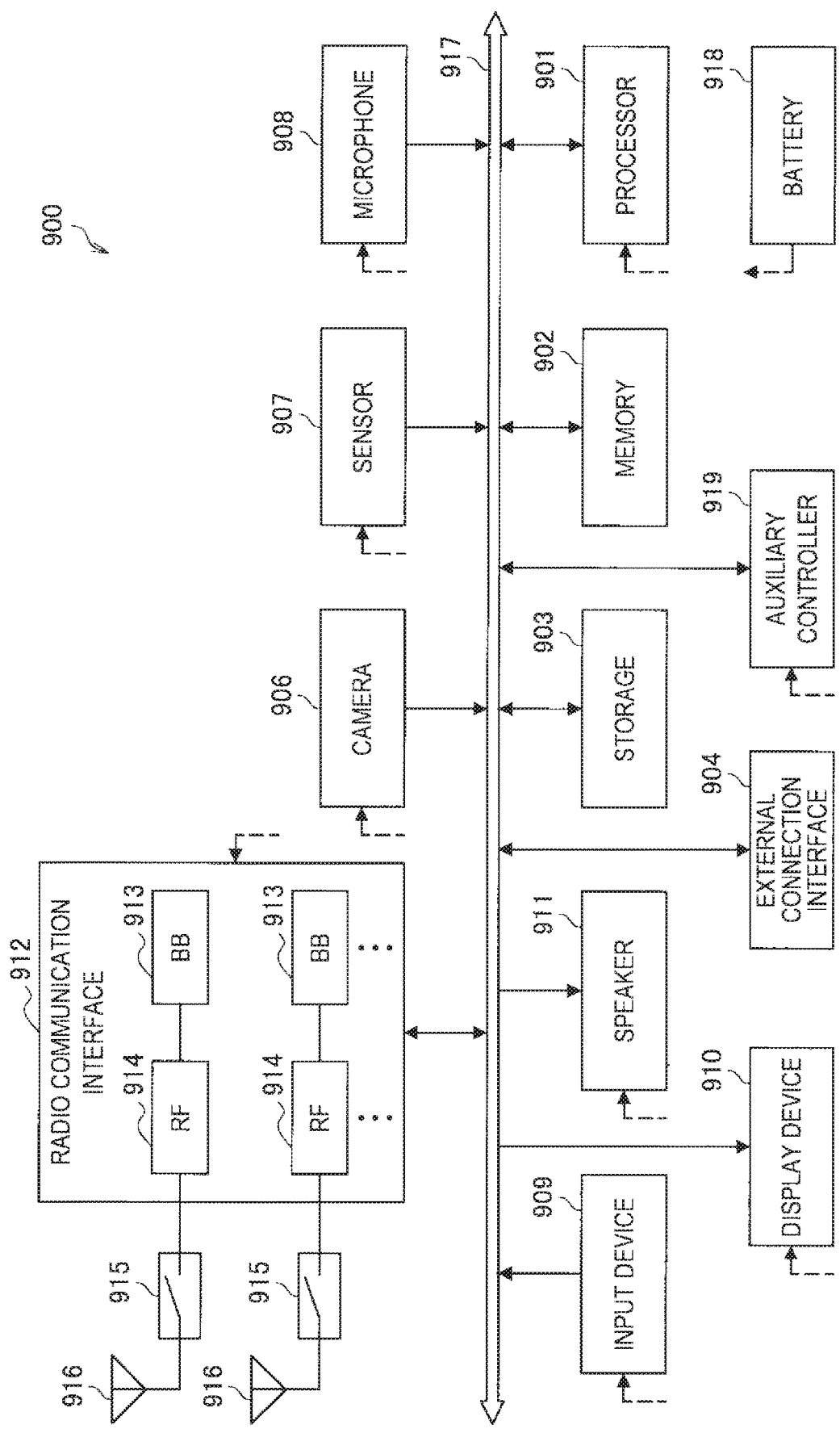
FIG. 45 is a block diagram illustrating an example of a schematic configuration of a smartphone.

FIG. 45 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 913 may also be a one chip module that has the BB processor 913 and the RF circuit 914 integrated thereon. The radio communication interface 912 may include the multiple BB processors 913 and the multiple RF circuits 914, as illustrated in FIG. 45. Although FIG. 45 illustrates the example in which the radio communication interface 913 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among, multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 45. Although FIG. 45 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 45 via feeder lines, which are partially shown as dashed lines in the figure. The auxiliary controller 919 operates a minimum necessary function of the smartphone 900, for example, in a sleep mode.

In the smartphone 900 shown in FIG. 45, the radio communication unit 310, the storage unit 320, and the control unit 330 described with reference to FIG. 8 may be implemented by the radio communication interface 912. Alternatively, at least some of these constituent elements may be implemented by the processor 901 or the auxiliary controller 919. As an example, a module which includes a part (for example, the BB processor 913) or all of the radio communication interface 912, the processor 901 and/or the auxiliary controller 919 may be mounted in the smartphone 900, and the radio communication unit 310, the storage unit 320, and the control unit 330 may be implemented by the module. In this case, the module may store a program for causing the processor to function as the radio communication unit 310, the storage unit 320, and the control unit 330 (i.e., a program for causing the processor to execute operations of the radio communication unit 310, the storage unit 320, and the control unit 330) and may execute the program. As another example, the program for causing the processor to function as the radio communication unit 310, the storage unit 320, and the control unit 330 may be installed in the smartphone 900, and the radio communication interface 912 (for example, the BB processor 913), the processor 901 and/or the auxiliary controller 919 may execute the program. As described above, the smartphone 900 or the module may be provided as a device which includes the radio communication unit 310, the storage unit 320, and the control unit 330, and the program for causing the processor to function as the radio communication unit 310, the storage unit 320, and the control unit 330 may be provided. In addition, a readable recording medium in which the program is recorded may be provided.

In addition, in the smartphone 900 shown in FIG. 45, the radio communication unit 310 described, for example, with reference to FIG. 8 may be implemented by the radio communication interface 912 (for example, the RF circuit 914).

Second Application Example

Figure 46:
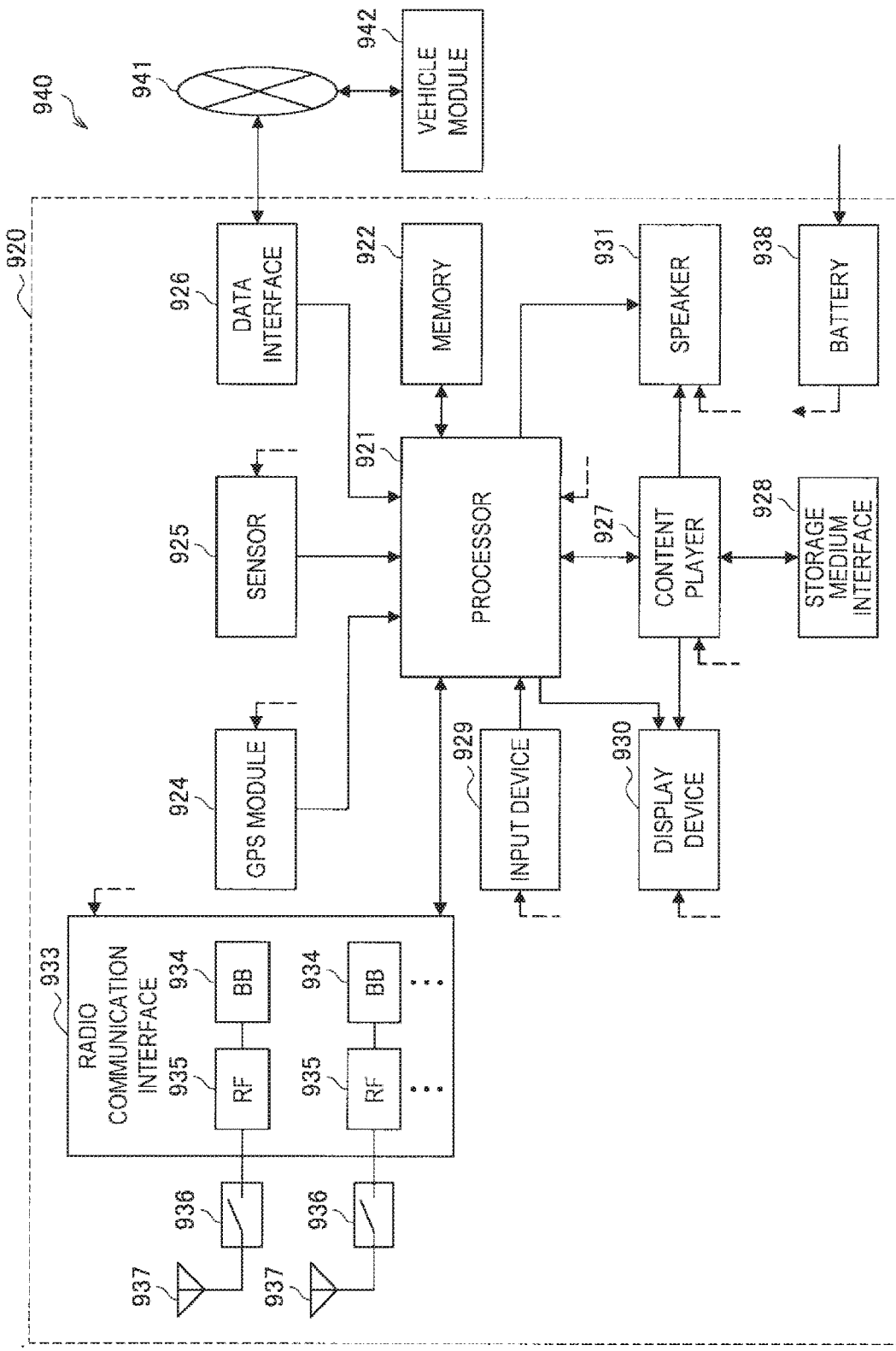
FIG. 46 is a block diagram illustrating an example of a schematic configuration of a car navigation device.

FIG. 46 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 46. Although FIG. 46 illustrates the example in which, the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation device 920 may include the multiple antennas 937, as illustrated in FIG. 46. Although FIG. 46 illustrates the example in which the car navigation device 920 includes the multiple antennas 937, the car navigation device 920 may also include a single antenna 937.

Furthermore, the car navigation device 920 may include the antenna 937 for each radio communication scheme. In that case, the antenna switches 936 may be omitted from the configuration of the car navigation device 920.

The battery 938 supplies power to blocks of the car navigation device 920 illustrated in FIG. T46 via feeder lines that are partially shown as dashed lines in the figure. The battery 938 accumulates power supplied form the vehicle.

In the car navigation device 920 shown in FIG. 46, the radio communication unit 310, the storage unit 320, and the control unit 330 described with reference to FIG. 8 may be implemented by the radio communication interface 933. Alternatively, at least some of these constituent elements may be implemented by the processor 921. As an example, a module which includes a part (for example, the BB processor 934) or all of the radio communication interface 933 and/or the controller 921 may be mounted in the car navigation device 920, and the radio communication unit 310, the storage unit 320, and the control unit 330 may be implemented by the module. In this case, the module may store a program for causing the processor to function as the radio communication unit 310, the storage unit 320, and the control unit 330 (i.e., a program for causing the processor to execute operations of the radio communication unit 310, the storage unit 320, and the control unit 330) and may execute the program. As another example, the program for causing the processor to function as the radio communication unit 310, the storage unit 320, and the control unit 330 may be installed in the car navigation device 920, and the radio communication interface 933 (for example, the BB processor 934) and/or the controller 921 may execute the program. As described above, the car navigation device 920 or the module may be provided, as a device which includes the radio communication unit 310, the storage unit 320, and the control unit 330, and the program for causing the processor to function as the radio communication unit 310, the storage unit 320, and the control unit 330 may be provided. In addition, a readable recording medium in which the program is recorded may be provided.

In addition, in the car navigation device 920 shown in FIG. 46, the radio communication unit 310 described, for example, with reference to FIG. 8 may be implemented by the radio communication interface 933 (for example, the RF circuit 935).

The technology of the present disclosure may also be realized as an in-vehicle system (or a vehicle) 940 including one or more blocks of the car navigation device 920, the in-vehicle network 941, and a vehicle module 942. In other words, the in-vehicle system (or a vehicle) 940 may be provided as a device which includes the radio communication unit 310, the storage unit 320, and the control unit 330. The vehicle module 942 generates vehicle data such as vehicle speed, engine speed, and trouble information, and outputs the generated data to the in-vehicle network 941.

5. Conclusion

Details of the embodiments of the present disclosure have been described above in detail with reference to FIGS. 1 to 46. As described above, the communication control device 100 communicates with the base station 200 or the terminal device 300 of the (radio communication system 1 in which communication is possible using a plurality of access schemes including at least one of the access schemes of a multiple access scheme that uses orthogonal resources and a multiple access scheme that uses non-orthogonal resources, and allocates resources relating to an access scheme that the base station 200 or the terminal device 300 uses. Through control by the communication control device 100, the base station 200 and the terminal device 300 can perform communication selectively using orthogonal resources and non-orthogonal resources. Accordingly, a high user throughput and area throughput can be achieved even in an environment of an RAT that only uses a single non-orthogonal resource in which there is a restriction due to a circumstance such as radio propagation, a position of a user, or the like.

In addition, the communication control device 100 may allocate an access scheme that the base station 200 or the terminal device 300 uses. Accordingly, the base station 200 and the terminal device 300 can perform communication more flexibly.

In addition, the communication control device 100 may receive capability information from the base station 200 or the terminal device 300. Accordingly, the communication control device 100 can perform allocation according to the capability information.

In addition, the communication control device 100 may transfer capability information from the base station 200 or the terminal device 300 to another device. Accordingly, the entire communication system 1 can share capability information of each device.

In addition, the communication control device 100 may use capability information from the base station 200 and the terminal device 300 in the procedure of handover of the terminal device 300 and the procedure of admission control. At this time, the communication control device 100 may further use capability information of the base station 200 serving as a handover destination candidate with respect to the terminal device 300. Accordingly, the communication control device 100 can realize handover according to a result of allocation of an access scheme according to the capability information.

In addition, the communication control device 100 may transmit a message indicating a change in allocation of an access setting to the base station 200 or the terminal device 300. In addition, the communication control device 100 may perform second allocation of an access scheme according to passage of time. Accordingly, the communication control device 100 can freely change an access setting used by base station 200 or the terminal device 300.

In addition, as described above, the terminal device 300 performs radio communication according to an access setting allocated by the communication control device 100 which includes at least one of the access schemes of a multiple access scheme that uses orthogonal resources and a multiple access scheme that uses non-orthogonal resources. Accordingly, the terminal device 300 can perform communication with the base station 200 selectively using orthogonal resources and non-orthogonal resources.

In addition, the terminal device 300 may transmit capability information which includes at least any of information indicating compatibility with non-orthogonal resources and information indicating compatibility with orthogonal resources to the communication control device 100 via the base station 200. Accordingly, the communication control device 100 can allocate an access scheme and resources with which the terminal device 300 is compatible.

In addition, the terminal device 300 may transmit capability information in the procedure of random access or the procedure of RRC connection. Accordingly, the terminal device 300 can reduce overhead taken in transmission of capability information.

It should be understood by those skilled in the art that various modifications, combinations, sub-combinations and alterations may occur depending on design requirements and other factors insofar as they are within the scope of the appended claims or the equivalents thereof.

Note that it is not necessary for the processing described in this specification with reference to the flowchart to be executed in the order shown in the flowchart. Some processing steps may be performed in parallel. Further, some of additional steps can be adopted, or some processing steps can be omitted.

In addition, the effects described in the present specification are merely illustrative and demonstrative, and not limitative. In other words, the technology according to an embodiment of the present disclosure can exhibit other effects that are evident to those skilled in the art along with or instead of the effects based on the present specification.

Additionally, the present technology may also be configured as below.

(1)

A communication control device including:

a communication unit configured to perform communication with a radio communication device of a radio communication system in which communication is possible using a plurality of access schemes including at least one of the access schemes of a multiple access scheme that uses orthogonal resources and a multiple access scheme that uses non-orthogonal resources; and a control unit configured to perform allocation of resources relating to the access schemes to be used by the radio communication device.

(2)

The communication control device according to (1), wherein the control unit performs allocation of the access schemes to be used by the radio communication device.

(3)

The communication control device according to (1) or (2), wherein information regarding the orthogonal resources and the non-orthogonal resources to be allocated to the radio communication device is included in control channels that are the same or different from each other.

(4)

The communication control device according to (3), wherein the control channels different from each other have at least either different times or different frequencies, and have a predetermined relation with data channels.

(5)

The communication control device according to (4), wherein levels or unit densities of electric power allocated to transmission of the respective control channels and the respective data channels have a predetermined magnitude relation.

(6)

The communication control device according to (5), wherein the level or the unit density of electric power allocated to transmission of the control channel which includes information regarding the orthogonal resources is equal to or higher than the level or the unit density of electric power allocated to transmission of the data channel.

(7)

The communication control device according to (5) or (6), wherein the level or the unit density of electric power allocated to transmission of the control channel which includes information regarding the orthogonal resources is equal to or higher than a level or a unit density of electric power allocated to transmission of the control channel which includes information regarding the non-orthogonal resources.

(8)

The communication control device according to any one of (1) to (7), wherein the communication unit receives capability information from the radio communication device.

(9)

The communication control device according to (8), wherein the communication unit receives the capability information in a procedure of random access or a procedure of RRC connection.

(10)

The communication control device according to (8) or (9), wherein the communication unit transfers the capability information of the radio communication device to another device.

(11)

The communication control device according to any one of (8) to (10), wherein the control unit uses the capability information of the radio communication device in a procedure of handover of the radio communication device or a procedure of admission control.

(12)

The communication control device according to (11), wherein the control unit further uses the capability information of a base station serving as a handover destination candidate with respect to the radio communication device.

(13)

The communication control device according to any one of (8) to (12), wherein the capability information includes a bit flag indicating whether or not a device is compatible with each of the orthogonal resources and the non-Orthogonal resources.

(14)

The communication control device according to any one of (1) to (13), wherein the communication unit transmits a message indicating a change in allocation to the radio communication device.

(15)

The communication control device according to (14), wherein the communication unit receives a message indicating a result of change possibility determination with respect to the radio communication device according to the message indicating a change in allocation.

(16)

The communication control device according to (15), wherein the control unit determines a possibility of handover according to the result of the change possibility determination.

(17)

The communication control device according to any one of (1) to (16), wherein the communication unit transmits information indicating a result of allocation by the control unit to the radio communication device.

(18)

The communication control device, according to any one of (1) to (17), wherein the control unit allocates the different or shared resources to the one or more radio communication devices.

(19)

The communication control device according to any one of (1) to (18), wherein the control unit allocates the shared resources to the one or more other radio communication devices which access one or more cells formed by the radio communication device.

(20)

The communication control device according to any one of (1) to (19), wherein the control unit performs second allocation of the resources according to passage of time.

(21)

The communication control device according to any one of (1) to (20), wherein the resources include at least one of a space area, an electric power area, an interleaver area, a data rate area, and a sparse code area.

(22)

A radio communication device including:

a radio communication unit configured to perform radio communication using one or more access schemes of at least either a multiple access scheme that uses orthogonal resources or a multiple access scheme that uses non-orthogonal resources; and a control unit configured to control the radio communication unit to perform radio communication using allocated resources for the access schemes to be used by the radio communication unit.

(23)

The radio communication device according to (22), wherein the radio communication unit transmits capability information of the radio communication device.

(24)
The radio communication device according to (23), wherein the capability information includes information indicating compatibility with the non-orthogonal resources.

(25)
The radio communication device according to (23) or (24), wherein the capability information includes information indicating compatibility with the orthogonal resources.

(26)
The radio communication device according to any one of (23) to (25), wherein the radio communication unit transmits the capability information in a procedure of random access or a procedure of RRC connection.

(27)
The radio communication device according to any one of (22) to (26), wherein the resources include at least one of a space area, an electric power area, an interleaver area, a data rate area, and a sparse code area.

(28)
The radio communication device according to any one of (22) to (27), wherein the radio communication unit transmits information indicating demanded communication quality.

(29)
The radio communication device according to any one of (22) to (28), wherein the control unit controls the radio communication unit to receive a data channel using the allocated resources.

(30)
The radio communication device according to any one of (22) to (29), wherein the control unit controls the radio communication unit to transmit a data channel or a control channel using the allocated resources.

(31)
A communication control method including:
performing communication with a radio communication device of a radio communication system in which communication is possible using a plurality of access schemes including at least one of the access schemes of a multiple access scheme that uses orthogonal resources and a multiple access scheme that uses non-orthogonal resources; and
performing allocation of resources relating to the access schemes to be used by the radio communication device with a processor.

(32)
The communication control method according to (31), wherein the performing allocation of the resources includes performing allocation of the access schemes to be used by the radio communication device.

(33)
The communication control method according to (31) or (32), wherein information regarding the orthogonal resources and the non-orthogonal resources to be allocated to the radio communication device is included in control channels that are the same or different from each other.

(34)
The communication control method according to (33), wherein the control channels different from each other have at least either different times or different frequencies, and have a predetermined relation with data channels.

(35)
The communication control method according to (34), wherein levels or unit densities of electric power allocated to transmission of the respective control channels and the respective data channels have a predetermined magnitude relation.

(36)
The communication control method according to (35), wherein the level or the unit density of electric power allocated to transmission of the control channel which includes information regarding the orthogonal resources is equal to or higher than the level or the unit density of electric power allocated to transmission of the data channel.

(37)
The communication control method according to (36), wherein the level or the unit density of electric power allocated to transmission of the control channel which includes information regarding the orthogonal resources is equal to or higher than the level or the unit density of electric power allocated to transmission of the control channel which includes information regarding the non-orthogonal resources.

(38)
A radio communication method including:
performing radio communication using one or more access schemes of at least either a multiple access scheme that uses orthogonal resources or a multiple access scheme that uses non-orthogonal resources; and
controlling, with a processor, the radio communication to be performed using allocated resources for the access schemes to be used during the radio communication.

(39)
The radio communication method according to (38), wherein the performing the radio communication includes transmitting capability information.

(40)
The radio communication method according to (39), wherein the capability information includes information indicating compatibility with the non-orthogonal resources.

(41)
The radio communication method according to (39) or (40), wherein the capability information includes information indicating compatibility with the orthogonal resources.

(42)
The radio communication method according to any one of (39) to (41), wherein the performing the radio communication includes transmitting the capability information in a procedure of random access or a procedure of RRC connection.

(43)
The radio communication method according to any one of (39) to (42), wherein the resources include at least one of a space area, an electric power area, an interleaver area, a data rate area, and a sparse code area.

(44)
A program for causing a computer to function as:
a communication unit configured to perform communication with a radio communication device of a radio communication system in which communication is possible using a plurality of access schemes including at least one of the access schemes of a multiple access scheme that uses orthogonal resources and a multiple access scheme that uses non-orthogonal resources; and
a control unit configured to perform allocation of resources relating to the access schemes to be used by the radio communication device.

(45)
A program for causing a computer to function as:
a radio communication unit configured to perform radio communication using one or more access schemes of at least either a multiple access scheme that uses orthogonal resources or a multiple access scheme that uses non-orthogonal resources; and a control unit configured to control the radio communication unit to perform radio communication using allocated resources for the access schemes to be used by the radio communication unit (46)

A control device comprising circuitry configured to communicate with a radio communication device of a radio communication system equipped to use a plurality of alternative access schemes, the plurality of alternative access schemes including at least one of a multiple access scheme that uses orthogonal resources and a multiple access scheme that uses non-orthogonal resources, and allocate resources according to a selected access scheme of the plurality of alternative access schemes.

(47)

The control device according to (46), wherein the control unit specifies which of the plurality of alternative access schemes the radio communication device is to use.

(48)

The control device according to (46), wherein the circuitry is further configured to include one or more control channels information regarding the orthogonal resources and the non-orthogonal resources to be allocated to the radio communication device.

(49)

The control device according to (48), wherein the one or more control channels include at least two different control channels with at least different times and/or different frequencies, and having different predetermined respective relationships with data channels.

(50)

The control device according to (49), wherein, levels or unit densities of electric power allocated to transmission, of the at least two different control channels and corresponding data channels have a predetermined magnitude relation.

(51)

The control device according to (50), wherein a level or unit density of electric power allocated to transmission a control channel of the two different control channels which includes information regarding the orthogonal resources is equal to or higher than a level or unit density of electric power allocated to transmission of a corresponding data channel.

(52)

The control device according to (50), wherein the level or the unit density of electric power allocated to transmission of a control channel of the two different control channels which includes information regarding the orthogonal resources is equal to or higher than a level or a unit density of electric power allocated to transmission of a control channel of the two different control channels which includes information regarding the non-orthogonal resources.

(53)

The control device according to (46), wherein the circuitry is configured to receive capability information from the radio communication device.

(54)

The control device according to (53), wherein the circuitry is configured to receive the capability information in a random access protocol scheme or a RRC connection scheme.

(55)

The control device according to (53), wherein the circuitry is configured to transfer the capability information of the radio communication device to another device.

(56)

The control device according to (53), wherein the circuitry is configured to use the capability information of the radio communication device in a handover procedure of the radio communication device or admission control procedure.

(57)

The control device according to (56), wherein the circuitry is further configured to use the capability information of a base station serving as a handover destination candidate with respect to the radio communication device.

(58)

The control device according to (53), wherein the capability information includes a bit flag indicating whether or not a device is compatible with each of the orthogonal resources and the non-orthogonal resources.

(59)

The control device according to (46), wherein the circuitry is configured to transmit a message indicating a change in allocation to the radio communication device.

(60)

The control device according to (59), wherein the communication unit receives a message indicating a result of change possibility determination with respect to the radio communication device according to the message indicating a change in allocation.

(61)

The control device according to (60), wherein the circuitry is configured to determine a handover possibility according to the result of the change possibility determination.

(62)

The control device according to (46), wherein the circuitry is configured to transmit information indicating an allocation result by the circuitry to the radio communication device.

(63)

The control device according to (46), wherein the circuitry is configured to allocate different or shared resources to one or more radio communication devices.

(64)

A radio communication device comprising circuitry configured to perform radio communications using a plurality of alternative access schemes, the plurality of alternative access schemes including at least one of a multiple access scheme that uses orthogonal resources and a multiple access scheme that uses non-orthogonal resources, and control a radio communication unit to perform radio communication using allocated resources for the access schemes selected for use by the radio communication unit.

(65)

A communication control method comprising using circuitry to perform communications with a radio communication device of a radio communication system equipped to use a plurality of alternate access schemes, the plurality of alternate access schemes including at least one of a multiple access scheme that uses orthogonal resources and a multiple access scheme that uses non-orthogonal resources; and allocating with the circuitry resources according to a selected access scheme of the plurality of alternative access schemes.

REFERENCE SIGNS LIST 1 communication system
10 application server
11 service platform
12 network gateway
13 device 14 IP network
15 core network
16 network manager
100 communication control device
110 communication unit
120 storage unit
130 control unit
200 base station
210 radio communication unit
220 network communication unit
230 storage unit
240 control unit
300 terminal device
310 radio communication unit
320 storage unit
330 control unit

The invention claimed is:
1. A control device, comprising:
circuitry configured to
communicate with a radio communication device of a radio communication system equipped to use a plurality of alternative access schemes, the plurality of alternative access schemes including at least one of a first multiple access scheme that uses orthogonal resources and a second multiple access scheme that uses non-orthogonal resources;
allocate resources according to a selected access scheme of the plurality of alternative access schemes, wherein
a first information and a second information are provided to the radio communication device, the first information regarding the orthogonal resources and the second information regarding the non-orthogonal resources; and
transmit the second information regarding non-orthogonal multiple access prior to the first information regarding orthogonal multiple access.
2. The control device according to claim 1, wherein the circuitry is configured to specify which of the plurality of alternative access schemes the radio communication device is to select.
3. The control device according to claim 2, wherein levels or unit densities of electric power allocated to transmission of a control channel and respective data channels have a predetermined magnitude relation.
4. The control device according to claim 3, wherein the level or the unit density of electric power allocated to transmission of the control channel includes the first information regarding the orthogonal resources being equal to or higher than a level or a unit density of electric power allocated to transmission of the second information regarding the non-orthogonal resources.
5. The control device according to claim 1, wherein the circuitry is configured to receive capability information from the radio communication device.
6. The control device according to claim 5, wherein the circuitry is configured to receive the capability information via a random access protocol scheme or a RRC connection scheme.
7. The control device according to claim 5, wherein the circuitry is configured to transfer the capability information of the radio communication device to another device.
8. The control device according to claim 5, wherein the circuitry is configured to use the capability information of the radio communication device in a handover procedure of the radio communication device or admission control procedure.
9. The control device according to claim 8, wherein the circuitry is further configured to use capability information of a base station serving as a handover destination candidate with respect to the radio communication device.
10. The control device according to claim 5, wherein the capability information includes a bit flag indicating whether or not a device is compatible with each of the orthogonal resources and the non-orthogonal resources.
11. The control device according to claim 1, wherein the circuitry is configured to transmit a message indicating a change in allocation to the radio communication device.
12. The control device according to claim 11, wherein the circuitry is configured to receive a message indicating a result of change possibility determination with respect to the radio communication device according to the message indicating a change in allocation.
13. The control device according to claim 12, wherein the circuitry is configured to determine a handover possibility according to the result of the change possibility determination.
14. The control device according to claim 1, wherein the circuitry is configured to transmit information indicating an allocation result by the circuitry to the radio communication device.
15. The control device according to claim 1, wherein the circuitry is configured to allocate different or shared resources to one or more radio communication devices.
16. The control device according to claim 1, wherein the first information indicates frequency resources or time resources of the first multiple access scheme, and the second information indicates a power level or an interleave of the second multiple access scheme.
17. A radio communication device, comprising: circuitry configured to
communicate with a control device of a radio communication system equipped to allocate resources of a plurality of alternative access schemes, the plurality of alternative access schemes including at least one of a first multiple access scheme that uses orthogonal resources and a second multiple access scheme that uses non-orthogonal resources;
receive a first information and a second information, the first information regarding the orthogonal resources and the second information regarding the non-orthogonal resources, wherein the second information regarding non-orthogonal multiple access was transmitted by the control device prior to the first information regarding orthogonal multiple access; and
perform radio communications using a selected access scheme of the plurality of alternative access schemes, wherein
the first information indicates frequency resources or time resources of the first multiple access scheme, and
the second information indicates a power level or an interleave of the second multiple access scheme.
18. A communication control method, comprising:
communicating, by circuitry of a control device, with a radio communication device equipped to use a plurality of alternate access schemes, the plurality of alternate access schemes including at least one of a first multiple access scheme that uses orthogonal resources and a second multiple access scheme that uses non-orthogonal resources;

allocating resources, by the circuitry, according to a selected access scheme of the plurality of alternative access schemes, wherein a first information and a second information are provided to the radio communication device, the first information regarding the orthogonal resources and the second information regarding the non-orthogonal resources; and transmitting the second information regarding non-orthogonal multiple access prior to the first information regarding orthogonal multiple access.

* * * * *